US012469981B2

(12) United States Patent
Minaml

(10) Patent No.: US 12,469,981 B2
(45) Date of Patent: Nov. 11, 2025

(54) READING APPARATUS

(71) Applicant: Toshihiro Minaml, Fujisawa (JP)

(72) Inventor: Toshihiro Minaml, Fujisawa (JP)

( * ) Notice: Subject to any disclaimer, the term of this patent is extended or adjusted under 35 U.S.C. 154(b) by 112 days.

(21) Appl. No.: 18/638,704

(22) Filed: Apr. 18, 2024

(65) Prior Publication Data

US 2025/0132503 A1 Apr. 24, 2025

(30) Foreign Application Priority Data

Oct. 20, 2023 (JP) ................................ 2023-180910

(51) Int. Cl.
*G06K 15/00* (2006.01)
*H01Q 1/42* (2006.01)
*H01Q 1/52* (2006.01)
*H01Q 17/00* (2006.01)

(52) U.S. Cl.
CPC ............... *H01Q 17/00* (2013.01); *H01Q 1/42* (2013.01); *H01Q 1/521* (2013.01)

(58) Field of Classification Search
CPC ........ H01Q 17/00; H01Q 1/526; H01Q 23/00; H01Q 1/42; H01Q 1/521; H01Q 1/2225; H01Q 1/2216
USPC ............................ 235/383, 385, 492, 462.46
See application file for complete search history.

(56) References Cited

U.S. PATENT DOCUMENTS 12,124,912 B2* 10/2024 Uchimura .............. G06Q 20/18
2006/0267843 A1* 11/2006 Sakama ................. H01Q 9/285 343/700 MS
2007/0008228 A1* 1/2007 Yamada ............... H01Q 1/2225 343/702
2008/0012714 A1* 1/2008 Furutani .............. H01Q 1/2225 340/572.7
2015/0227767 A1* 8/2015 Sock .................... H01Q 1/2216 340/10.1
2024/0095476 A1* 3/2024 Sakurai .............. G06K 7/10366

FOREIGN PATENT DOCUMENTS

| | | | | |
|---|---|---|---|---|
| EP | 3367504 | * | 8/2018 | ........... H01Q 1/2216 |
| EP | 3276743 | * | 1/2019 | ............. H01Q 15/24 |
| JP | 2008099266 | A1 | 4/2008 | |
| JP | 2008140216 | * | 6/2008 | ............. G06K 17/00 |
| JP | 2018190255 | A1 | 11/2018 | |
| JP | 7280583 | B1 | 5/2023 | |
| JP | 7429399 | B1 | 2/2024 | |

* cited by examiner

*Primary Examiner* — Daniel St Cyr

(57) ABSTRACT

A housing accommodates an article to which an RF tag is attached. A top portion of the housing has an opening. A left side portion, a back portion, and a right side portion include radio wave absorbing layers, respectively. The upper ends of these portions are higher than the upper end of a front portion. A front housing limiting plate divides the inside of the housing into a first attenuation space near the front portion and a housing space near the back portion. The article can be accommodated only in the housing space. The article cannot be accommodated in the first attenuation space. A bottom antenna is located on the upper surface of a bottom portion. The bottom antenna radiates a radio wave with high intensity toward the housing space and radiates a radio wave with low intensity toward the first attenuation space.

16 Claims, 38 Drawing Sheets

READING APPARATUS

CROSS-REFERENCE TO RELATED APPLICATION

This application is based upon and claims the benefit of priority from Japanese Patent Application No. 2023-180910, filed on Oct. 20, 2023, the entire contents of which are incorporated herein by reference.

FIELD

Embodiments described herein relate generally to an apparatus for reading information from a passive RF (Radio Frequency) tag.

BACKGROUND

Japanese Unexamined Patent Application Publication No. 2018-190255 discloses a stationary reading apparatus that reads information from an RF tag attached to an article. The reading apparatus includes an antenna and a shield portion. The antenna is housed inside the shield portion and radiates a radio wave for communicating with an RF tag. The shield portion surrounds the article. A wider opening than the article is formed at the top of the shield portion. The reading apparatus reads information from the RF tag when the opening is open.

An example of the reading apparatus is shown in FIG. 3 of Japanese Unexamined Patent Application Publication No. 2018-190255. In this example, the reading apparatus has an enclosure with an upward opening. The enclosure consists of four wall plates and a bottom plate. The four wall plates stand vertically from the bottom plate. They are fixed to each edge of the bottom plate. Two horizontal plates are arranged one above the other inside the enclosure. The upper horizontal plate is detachable. The lower horizontal plate is bonded to an inner wall surface of each wall plate. The antenna is located on the lower horizontal plate.

In each wall plate, a radio wave reflecting sheet is stuck to the inner wall surface that extends upward from the lower horizontal plate. The radio wave reflecting sheet functions as a radio wave reflecting layer that reflects radio waves on the surface. A radio wave absorbing sheet is stuck to the entire inner surface of the radio wave reflecting sheet. The radio wave absorbing sheet functions as a radio wave absorbing layer that absorbs radio waves therein. Similarly, a radio wave reflecting sheet is stuck to the upper surface of the lower horizontal plate, and a radio wave absorbing sheet is stuck to the upper surface of the radio wave reflecting sheet.

As described above, in the reading apparatus shown in FIG. 3 of Japanese Unexamined Patent Application Publication No. 2018-190255, the shield portion in which the opening is formed upward is configured by the radio wave reflecting sheet and the radio wave absorbing sheet. In this reading apparatus, the antenna is installed on the bottom of the shield portion. The shield portion and the upper horizontal plate function as a housing space that houses a shopping basket.

In this reading apparatus, the radio wave radiated by the antenna is radiated only upward outside the reading apparatus. Therefore, in this reading apparatus, the communication area with RF tags attached to articles is limited to the inside of the housing space and above the housing space. Japanese Unexamined Patent Application Publication No. 2018-190255 describes that this reading apparatus shown in FIG. 3 does not have the problem of reading information from RF tags attached to articles around the reading apparatus.

Also, Japanese Unexamined Patent Application Publication No. 2008-99266 discloses a communication improvement device. That improves the performance of a communication device equipped with a reader reading information from a transponder (e.g., an IC tag). When each IC tag is present in the communication-capable area of the reader, the IC tag transmits a response signal including information of an article in response to a request signal from the reader. In general, UHF RFID tag systems are designed for long-distance communication, and the communication area is wider.

An article information handling facility described in Japanese Unexamined Patent Application Publication No. 2008-99266 includes a conveyor that conveys each article, a communication device having a reader capable of wirelessly communicating with the IC tags attached to each article, and a communication improvement device for improving a communication environment of the communication device. An antenna of the reader is provided at a fixed position, for example, above the conveyor so as to face the conveyor, for example, by being supported by a supporter. The reader transmits a request signal toward the conveyor and receives a response signal from the IC tag.

The communication improvement device is supported by the supporter and is provided between the IC tag placement region in the conveyor and the antenna of the reader. This communication improvement device combines Frequency Selective Surface (abbreviated as F.S.S) technology with a radio wave absorber or a radio wave shield. This operates a radio wave transmission region as a slot antenna and an IC tag receives a radio wave re-radiated by the antenna portion. For example, this can be realized by cutting a slit in the conductor layer used for the radio wave absorber in accordance with the frequency. However, even if the slit portion is not strictly formed as an antenna, it is possible to communicate by using the radio waves leaking from the gap. The radio wave absorber is an absorber that absorbs radio waves, and also has a function of shielding radio waves.

The communication improvement device is, for example, a radio wave absorber having a radio wave transmission region in a center. The radio wave transmission region is realized by forming a through hole, and the through hole serves as the transmission region. The antenna of the reader and each IC tag are arranged so as to perform wireless communication via the radio wave transmission region. When the radio wave absorber is provided, the reader can communicate only with each IC tag that is placed in a position facing the radio wave transmission region. Japanese Unexamined Patent Application Publication No. 2008-99266 describes that if the transmission region was narrowed too much in order to increase the directivity of the radio wave radiated by the antenna of the reader, a diffracted wave was generated when the radio wave passed through the transmission region, and the directivity could not be controlled in some cases.

As described above, Japanese Unexamined Patent Application Publication No. 2018-190255 describes that this reading apparatus shown in FIG. 3 does not have the problem of reading information from RF tags attached to articles around the reading apparatus.

However, in the Japanese cellular phone system, the frequency band from 700 MHz to 900 MHz is called the golden band or platinum band. It is known that a radio wave in this frequency band goes around an obstacle due to diffraction. For example, an RFID (Radio Frequency Identification) system is used for inventory management (inspection and stocktaking) of commodities in a factory, inspection and stocktaking of commodities in intermediate distribution, a self-checkout machine in a store, and the like. The radio wave used in this RFID system is generally in the UHF band of 860-960 MHz. It is considered that the radio wave in this UHF band also easily goes around an obstacle due to diffraction.

As described above, Japanese Unexamined Patent Application Publication No. 2008-99266 describes that when the radio wave transmission region was narrowed too much in order to increase the directivity of the radio wave radiated by the antenna of the reader, a diffracted wave was generated when the radio wave passed through the radio wave transmission region, and the directivity could not be controlled in some cases.

Therefore, when the antenna and an RF tag communicate with each other by radio waves in the UHF band of 860-960 MHz in the reading apparatus of FIG. 3 described in Japanese Unexamined Patent Application Publication No. 2018-190255, the RF tag outside the shield portion may be operated by the radio wave diffracted at the periphery of the opening, and information of RF tags attached to commodities around the reading apparatus may be accidentally read.

Also, the intensity of the radio wave received by the RF tag may be weakened depending on the direction of the RF tag to the antenna. Furthermore, when multiple RF tags are present in the shield portion, the intensity of the radio wave received by the RF tags may be weakened depending on their mutual position. Therefore, in the reading apparatus of FIG. 3 described in Japanese Patent Laid-Open No. 2018-190255, if the radio wave radiated by the antenna is weakened in order to weak the intensity of the radio wave diffracted at the periphery of the opening, information may not be read from an RF tag in the shield portion.

Therefore, if the frequency of the radio wave used in the reading apparatus described in Japanese Unexamined Patent Application Publication No. 2018-190255 is 860-960 MHz or lower and the radio wave radiated by the antenna is strong, information of an RF tag outside the shield portion may accidentally be read. On the other hand, if the radio wave radiated by the antenna is weak, the reading apparatus may not read information from the RF tags in the shield portion. For this reason, there is a limit to weakening the radio wave radiated by the antenna.

DETAILED DESCRIPTION

Each reading apparatus for reading information from an RF tag according to each embodiment has an opening at the top of the housing and reads information from a passive RF tag inside the housing. The opening always is open. However, the problem of reading information from an RF tag outside the housing due to the diffraction of a radio wave at the periphery of the opening does not occur in the reading apparatus.

Each reading apparatus for reading information from an RF tag according to each embodiment will be described in detail with reference to the drawings below. In all the drawings for explaining the embodiments, common components are denoted by the same reference number, and a repetitive description thereof will be omitted.

First Embodiment

Figure 1:
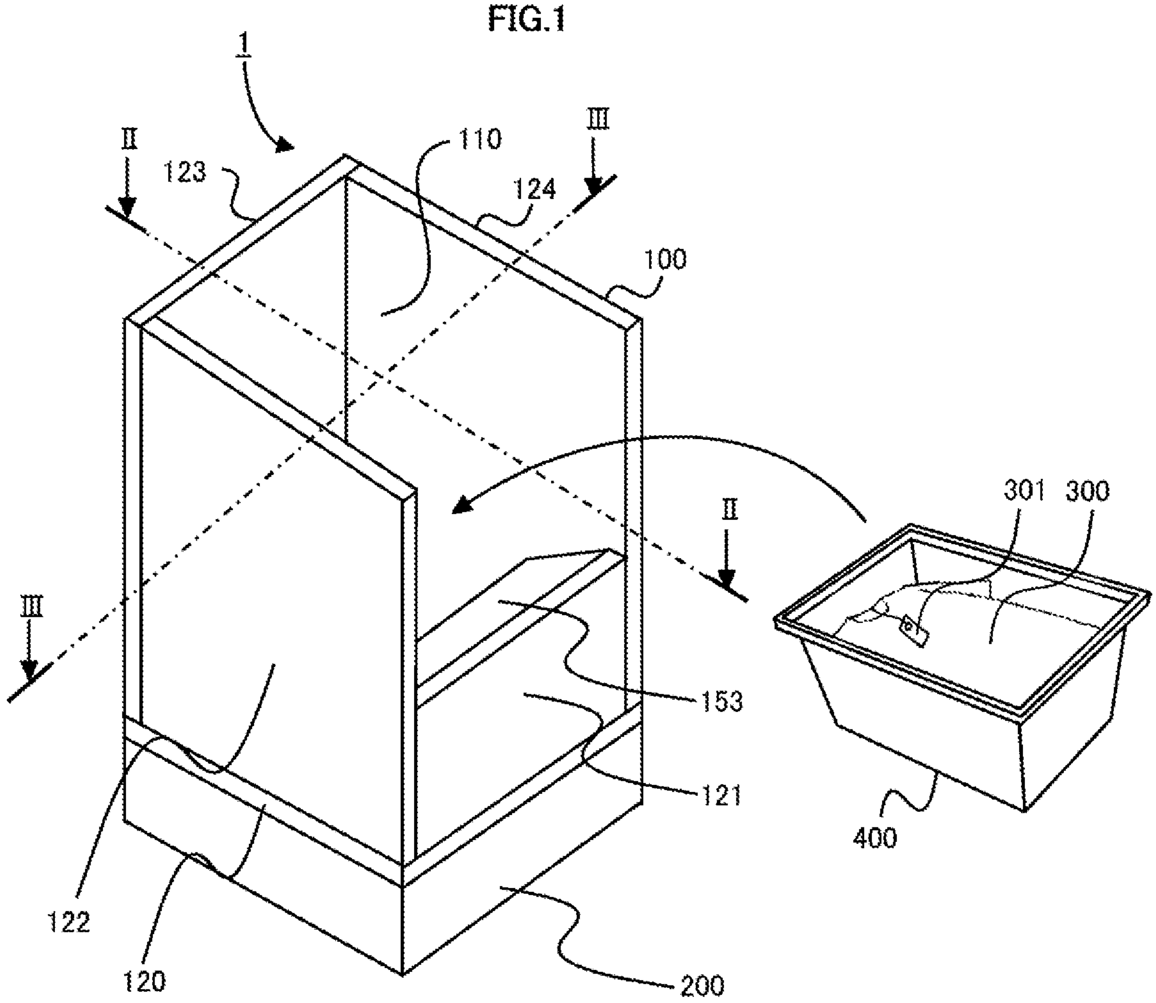
FIG. 1 is a perspective view of an example of a reading apparatus for reading information from an RF tag according to the first embodiment.
Figure 2:
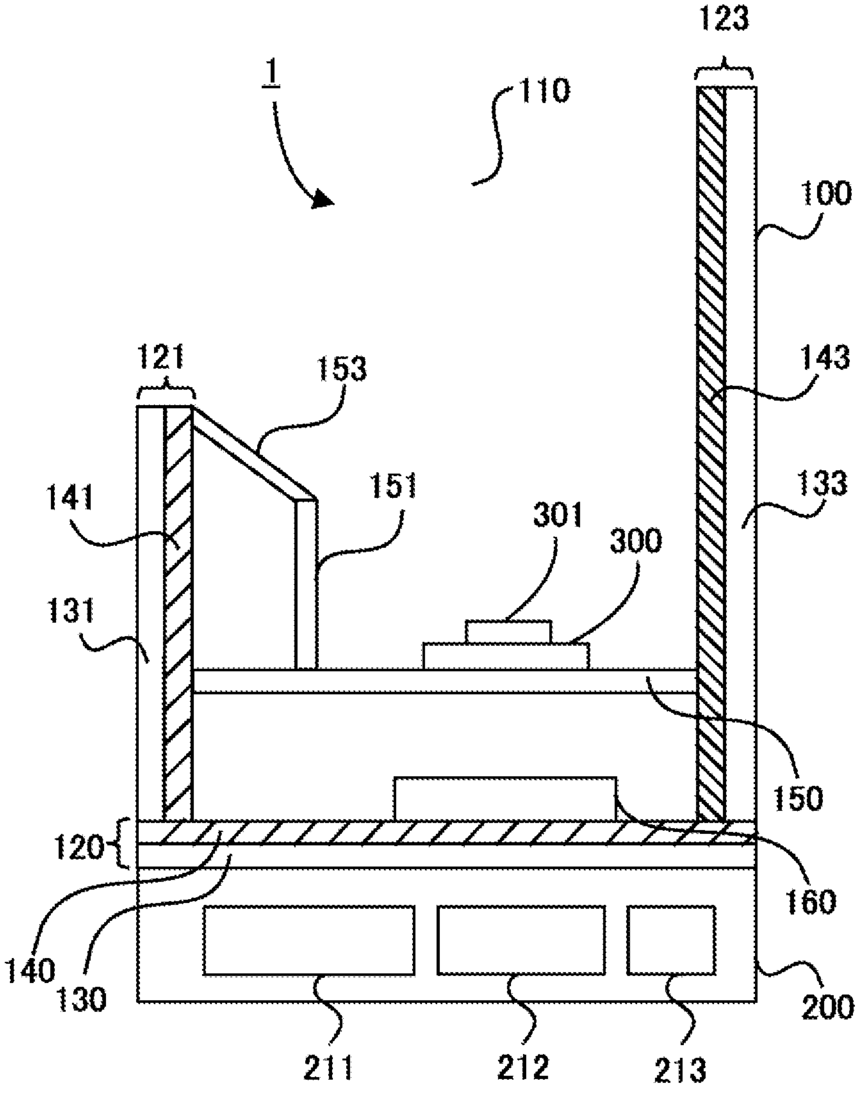
FIG. 2 is a sectional view taken along line II-II in FIG. 1.
Figure 3:
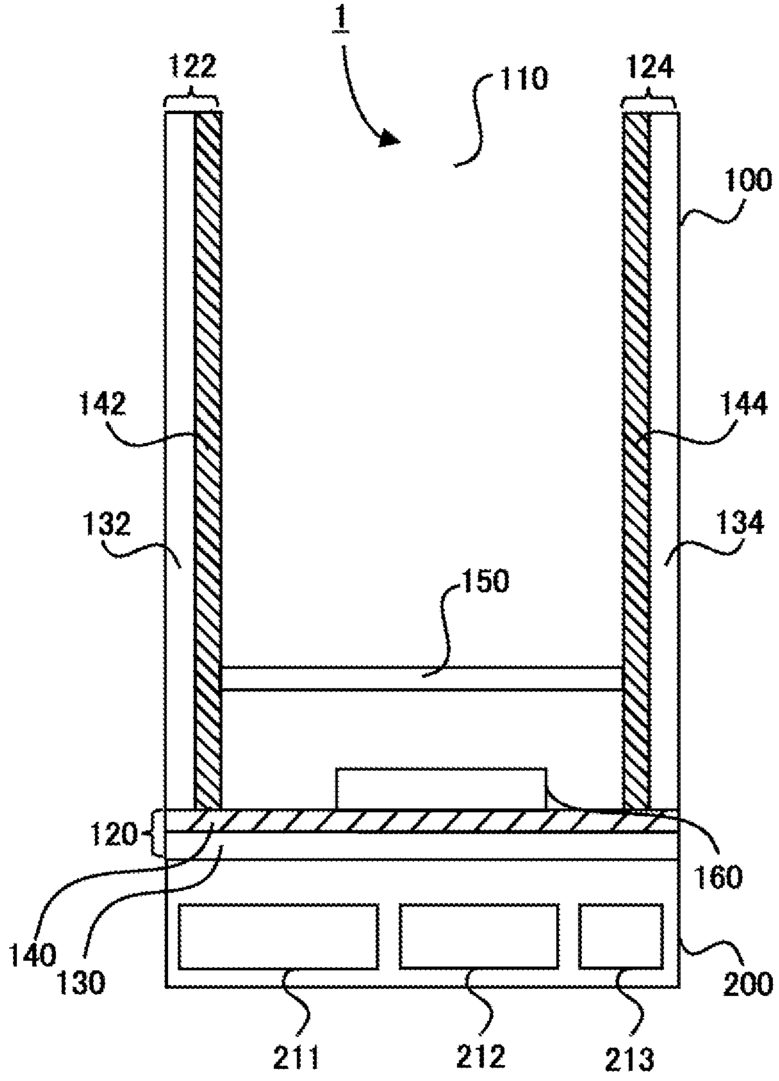
FIG. 3 is a sectional view taken along line III-III in FIG. 1.
Figure 4:
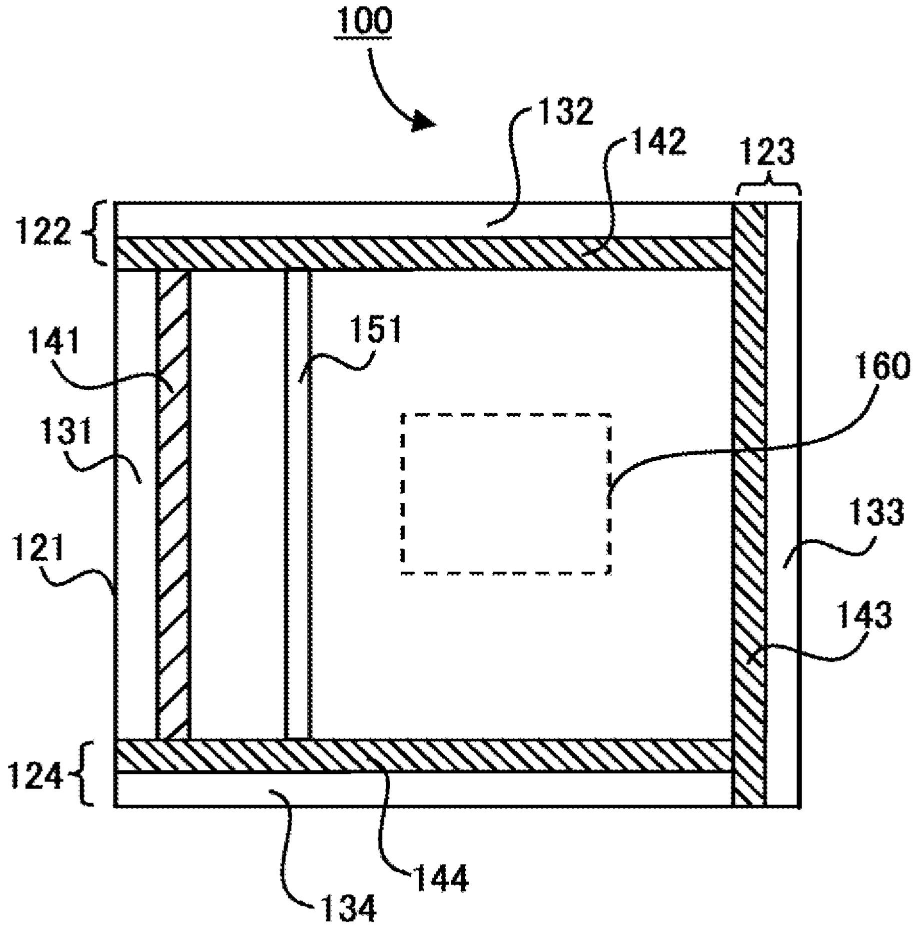
FIG. 4 is a plan view of an example of a housing in the reading apparatus shown in FIG. 1.

FIG. 1 is a perspective view of an example of a reading apparatus 1 for reading information from an RF tag 301 according to the first embodiment. FIG. 2 is a sectional view taken along line II-II in FIG. 1. FIG. 3 is a sectional view taken along line III-III in FIG. 1. FIG. 4 is a plan view of an example of a housing 100 in the reading apparatus 1 shown in FIG. 1. The reading apparatus 1 includes a housing 100 and a controller 200. There is an opening 110 at the top of the housing 100.

The reading apparatus 1 can take an article 300 with an RF tag 301 in and out of the housing 100 through the opening 110. The article 300 is placed in the housing space inside the housing 100. The opening 110 can be used to take a shopping basket 400 in and out of the housing 100, too. The housing space of the housing 100 can accommodate part or all of the shopping basket 400. The housing space is described later.

For example, when the reading apparatus 1 is incorporated into a self-checkout machine and used in a store, the articles 300 to which the RF tags 301 are attached are displayed on shelves or tables in the store. The customer selects a desired article 300 and places it in the shopping basket 400. Then, the customer puts part or all of the shopping basket 400 into the housing space through the opening 110.

The article 300 is, for example, a commodity such as a book, clothing, or a food. The article 300 may be packed in a box. It is desirable that radio waves easily pass through the article 300. For example, the article 300 should not contain metal or moisture. For example, the RF tag 301 is used to collectively manage a plurality of articles 300 in the entire supply chain including production, intermediate distribution, and sales. For example, the RF tag 301 can be used for stock management (inspection and inventory) of commodities in a factory, inspection and inventory of commodities in intermediate distribution, self-checkout in a store, and the like.

The RF tag 301 stores, for example, a unique tag-ID (Identifier) determined so as to be able to uniquely identify the article 300. A reading apparatus 1 reads information including a tag ID from an RF tag 301 when an article 300 to which the RF tag 301 is attached is put in a housing 100. The RF tag 301 is a well-known passive RF tag. The reading apparatus 1 communicates with the RF tag 301 by, for example, radio waves in the UHF band with a frequency of 860 to 960 MHz.

As shown in FIGS. 1 to 4, the housing 100 includes a top portion, a bottom portion 120, a front portion 121, a left side portion 122, a back portion 123, a right side portion 124, a placement plate 150, a front housing limiting plate 151, a front guide portion 153, and a bottom antenna 160. The top portion forms a top of the housing 100. The top portion has the opening 110 through which can take the article 300 in and out of the housing 100. The bottom portion 120 forms a bottom of the housing 100.

The bottom portion 120 is, for example, a rectangular flat plate. The bottom portion 120 includes a flat plate 130 and a radio wave shielding layer 140. The radio wave shielding layer 140 covers, for example, the upper surface of the flat plate 130. The bottom portion 120 may not necessarily include the radio wave shielding layer 140, but the bottom portion 120 preferably includes the radio wave shielding layer 140, for example, in order to suppress radio waves that enter the inside of the housing 100 from the outside.

The radio wave shielding layer includes at least one of a radio wave absorbing layer and a radio wave reflecting layer. The radio wave shielding layer may include both a radio wave absorbing layer and a radio wave reflecting layer. The radio wave absorbing layer absorbs radio waves. The radio wave absorbing layer is formed of, for example, a radio wave absorbing sheet. The radio wave absorbing sheet is, for example, a sheet made of a material in which magnetic metal powder is mixed in a rubber material. The radio wave reflecting layer reflects radio waves. The radio wave reflecting layer is made of, for example, metal.

A structure in which a radio wave absorbing layer is placed on the inner surface side (or the upper surface side) of the housing 100, and a radio wave reflecting layer is placed on the outer surface side (or the lower surface side) may be also regarded as a kind of a radio wave absorbing layer.

The side portion of the housing 100 includes the front portion 121, the left side portion 122, the back portion 123, and the right side portion 124.

The front portion 121 is, for example, a rectangular flat plate. The front portion 121 stands vertically to the bottom portion 120 from the front edge of the bottom portion 120. The front portion 121 includes a flat plate 131 and a radio wave shielding layer 141. The radio wave shielding layer 141 covers, for example, the inner surface of the flat plate 131. However, the front portion 121 may not necessarily include the radio wave shielding layer 141. The front portion 121 preferably includes the radio wave shielding layer 141, for example, in order to suppress radio waves that enter the inside of the housing 100 from the outside. The upper end of the front portion 121 is lower than the upper end of the left side portion 122, the upper end of the back portion 123, and the upper end of the right side portion 124.

One end and the other end of the left side portion 122 are fixed to one end of the front portion 121 and one end of the back portion 123, respectively. The left side portion 122 is, for example, a rectangular flat plate. The left side portion 122 includes a flat plate 132 and a radio wave absorbing layer 142. The radio wave absorbing layer 142 covers, for example, the inner surface of the flat plate 132. The left side portion 122 stands vertically to the bottom portion 120 from the left edge of the bottom portion 120. The upper end of the left side portion 122 is higher than the upper end of the front portion 121.

The back portion 123 is opposed to the front portion 121. One end and the other end of the back portion 123 are fixed to the other end of the left side portion 122 and one end of the right side portion 124, respectively. The back portion 123 is, for example, a rectangular flat plate. The back portion 123 includes a flat plate 133 and a radio wave absorbing layer 143. The radio wave absorbing layer 143 covers, for example, the inner surface of the flat plate 133. The back portion 123 stands vertically to the bottom portion 120 from the back edge of the bottom portion 120. The upper end of the back portion 123 is higher than the upper end of the front portion 121.

The right side portion 124 is opposed to the left side portion 122. One end and the other end of the right side portion 124 are fixed to the other end of the back portion 123 and the other end of the front portion 121, respectively. The right side portion 124 is, for example, a rectangular flat plate. The right side portion 124 includes a flat plate 134 and a radio wave absorbing layer 144. The radio wave absorbing layer 144 covers, for example, the inner surface of the flat plate 134. The right side portion 124 stands vertically to the bottom portion 120 from the right edge of the bottom portion 120. The upper end of the right side portion 124 is higher than the upper end of the front portion 121.

The lower end of the front portion 121, the lower end of the left side portion 122, the lower end of the back portion 123, and the lower end of the right side portion 124 are fixed to each edge of the bottom portion 120, respectively. The bottom portion 120, the front portion 121, the left side portion 122, the back portion 123, and the right side portion 124 form the housing 100 that is open upward. This opening is the above-described opening 110.

The radio wave shielding layer 141 included in the front portion 121 may not cover the inner surface of the flat plate 131 but may cover the outer surface of the flat plate 131 or may be sandwiched between two flat plates. The radio wave absorbing layer 142 included in the left side portion 122 may not cover the inner surface of the flat plate 132 but may cover the outer surface of the flat plate 134 or may be sandwiched between two flat plates. In these cases, however, the flat plate on the inner side of the radio wave absorbing layer 142 must be made of a material that allows radio waves to pass through. The back portion 123 and the right side portion 124 are similar to the left side portion 122. The radio wave shielding layer 140 included in the bottom portion 120 may not cover the upper surface of the flat plate 130 but may cover the lower surface of the flat plate 130 or may be sandwiched between two flat plates.

The left side portion 122 is an example of a first side portion of the present disclosure, and the right side portion 124 is an example of a second side portion of the present disclosure.

The bottom antenna 160 is an antenna located on the upper surface of the bottom portion 120. The bottom antenna 160 radiates a radio wave upward to communicate with an RF tag 301 and receives a response radio wave transmitted by the RF tag 301. The bottom antenna 160 is, for example, a planar antenna or a sheet antenna. For example, the bottom antenna 160 radiates a circularly polarized radio wave or radiates a radio wave while switching between a horizontally polarized wave and a vertically polarized wave when a linearly polarized wave is used.

The response radio wave is a radio wave on which the RF tag 301 transmits information when the RF tag 301 receives the radio wave radiated by the bottom antenna 160. A side antenna 161 and a front antenna 162, described later, operate in the same way. In this embodiment, the front portion 121, the left side portion 122, the back portion 123, and the right side portion 124 do not have an antenna for radiating a radio wave to communicate with the RF tag 301.

The placement plate 150 is, for example, a rectangular flat plate. The placement plate 150 is located above the bottom portion 120. The placement plate 150 is located parallel to the bottom portion 120 and separates from the bottom portion 120 by a predetermined distance. For example, each edge of the placement plate 150 is fixed to the inner surfaces of the front portion 121, the left side portion 122, the back portion 123, and the right side portion 124. The placement plate 150 allows radio waves to pass through. The front housing limiting plate 151 is, for example, a rectangular flat plate. The front housing limiting plate 151 is located between the front portion 121 and the back portion 123 at a predetermined distance from the front portion 121. The front housing limiting plate 151 stands vertically from the upper surface of the placement plate 150. The front housing limiting plate 151 allows radio waves to pass through. The front guide portion 153 is, for example, a rectangular flat plate. The lower end of the front guide portion 153 is fixed to the upper end of the front housing limiting plate 151. The front guide portion 153 inclines obliquely upward, and the upper end thereof is fixed to the upper end of the front portion 121. One end and the other end of the front guide portion 153 are fixed to the inner surface of the left side portion 122 and the inner surface of the right side portion 124, respectively. The front guide portion 153 allows radio waves to pass through.

The front housing limiting plate 151 may not stand vertically from the upper surface of the placement plate 150 but may stand vertically from the upper surface of the bottom portion 120, and each edge of the placement plate 150 may be fixed to the inner surfaces of the front housing limiting plate 151, the left side portion 122, the back portion 123, and the right side portion 124. The front guide portion 153 may not extend obliquely upward from the upper end of the front housing limiting plate 151 but may be parallel to the placement plate 150. Furthermore, the front guide portion 153 may be omitted.

A space surrounded by the front housing limiting plate 151, the left surface portion 122, the back portion 123, and the right side portion 124 above the placement plate 150 is the housing space. The housing space can accommodate an article 300 or can accommodate part or all of a shopping basket 400. The article 300 or the shopping basket 400 is placed on the placement plate 150.

The placement plate 150 divides the inside of the housing 100 into a space between the bottom portion 120 and the placement plate 150 and a space above the placement plate 150. Here, the article 300 and the shopping basket 400 are not accommodated in a space between the bottom portion 120 and the placement plate 150. This space is a space in which a radio wave radiated by the bottom antenna 160 propagates while spreading. A space above the placement plate 150 is the housing space in which the article 300 and the shopping basket 400 can be accommodated. The front housing limiting plate 151 divides the inside of the housing 100 into a space between the front portion 121 and the front housing limiting plate 151 and a space between the front housing limiting plate 151 and the back portion 123. Here, the article 300 and the shopping basket 400 are not accommodated in a space between the front portion 121 and the front housing limiting plate 151. This space is a first attenuation space in which a radio wave radiated by the bottom antenna 160 propagates while being attenuated. The space between the front housing limiting plate 151 and the back portion 123 is the housing space. That is, the front housing limiting plate 151 divides the inside of the housing 100 into the first attenuation space near the front portion 121 and the housing space near the back portion 123.

The bottom antenna 160 is located on the upper surface of the bottom portion 120 at a position at which a radio wave with high intensity is radiated toward the housing space and a radio wave with lower intensity than that of the radio wave radiated toward the housing space is radiated toward the first attenuation space.

The front housing limiting plate 151 is an example of a first housing limiting portion of the present disclosure, and the placement plate 150 is an example of a third housing limiting portion of the present disclosure.

The controller 200 includes a transmission/reception part 211, an acquisition part 212, and an interface (I/F) 213. The transmission/reception part 211 causes the bottom antenna 160 to radiate a circularly polarized radio wave, or to radiate a radio wave while switching between a horizontally polarized wave and a vertically polarized wave when a linearly polarized wave is used. When the bottom antenna 160 receives a response radio wave, the transmission/reception part 211 obtains information including the tag ID from the response radio wave.

The RF tag 301 obtains the power needed to operate by receiving a radio wave transmitted by the bottom antenna 160. When the intensity of the radio wave received by the RF tag 301 is lower than the predetermined intensity, the RF tag 301 does not operate and does not transmit the response radio wave.

Figure 5:
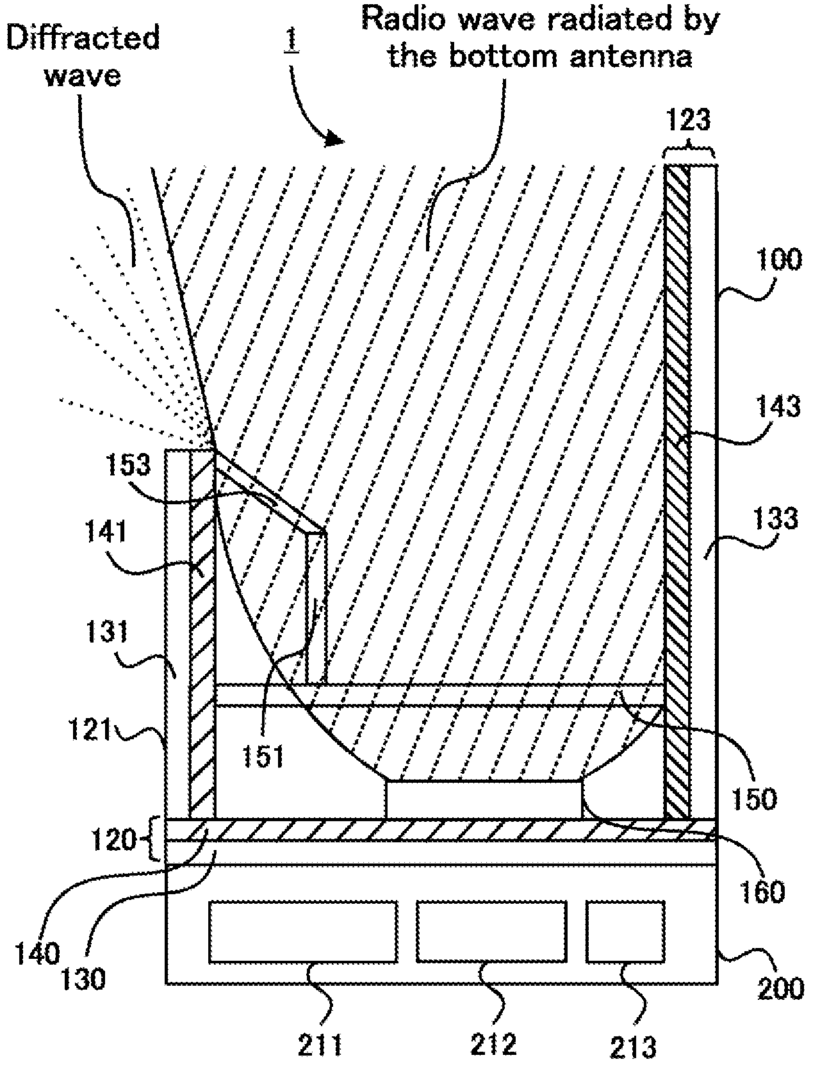
FIG. 5 is a diagram showing an example of a radio wave radiated by a bottom antenna in the reading apparatus shown in FIG. 1 when a front portion includes a radio wave shielding layer.

FIG. 5 shows an example of a radio wave radiated by the bottom antenna 160 in the reading apparatus 1 shown in FIG. 1 when the front portion 121 includes the radio wave shielding layer 141. In FIG. 5, the RF tag 301 that receives the radio wave in the range indicated by the diagonally right-up dashed line operates and transmits the response radio wave.

The upper end of the front portion 121 in the reading apparatus 1 is low. However, the radio wave radiated by the bottom antenna 160 is attenuated while propagating through the first attenuation space between the front portion 121 and the front housing limiting plate 151. The attenuated radio wave is diffracted at the upper end of the front portion 121 (that is, the periphery of the opening 110) and leaks over the upper end of the front portion 121 to the outside of the housing 100. The transmission/reception part 211 causes the bottom antenna 160 to radiate the radio wave toward the first attenuation space with the intensity at which the RF tag 301 outside the housing 100 does not operate due to the radio wave that is diffracted at the upper end of the front portion 121 and leaks from the opening 110 to the outside of the housing 100. Since the intensity of the radio wave diffracted at the upper end of the front portion 121 is low, the RF tag 301 outside the housing 100 does not operate.

Figure 6:
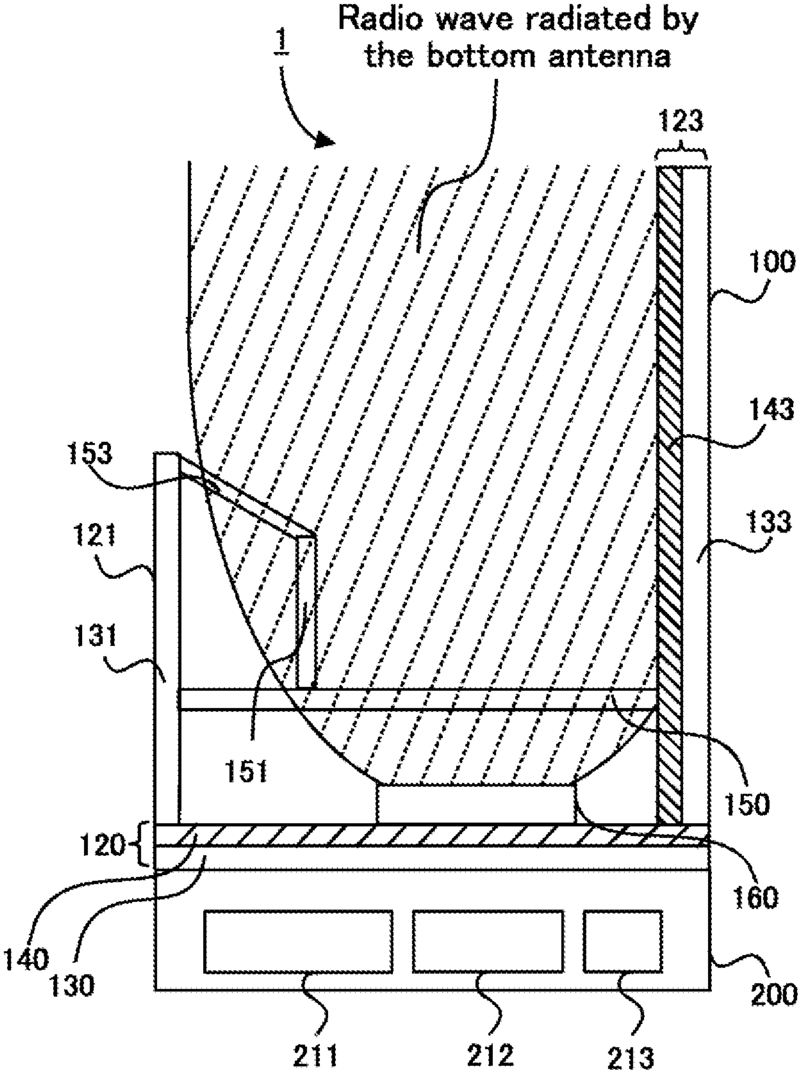
FIG. 6 is a diagram showing an example of a radio wave radiated by the bottom antenna in the reading apparatus shown in FIG. 1 when the front portion does not include a radio wave shielding layer.

FIG. 6 shows an example of a radio wave radiated by the bottom antenna 160 in the reading apparatus 1 shown in FIG. 1 when the front portion 121 does not include the radio wave shielding layer 141. In FIG. 6, the RF tag 301 that receives the radio wave in the range indicated by the diagonally right-up dashed line operates and transmits the response radio wave.

The radio wave radiated by the bottom antenna 160 is attenuated while propagating through the first attenuation space between the front portion 121 and the front housing limiting plate 151. The transmission/reception part 211 causes the bottom antenna 160 to radiate the radio wave toward the first attenuation space with the intensity at which the RF tag 301 does not operate when the radio wave reaches the front portion 121. Therefore, the RF tag 301 outside the housing 100 does not operate due to the radio wave leaking to the outside of the housing 100 from the front portion 121. In this case, the front portion 121 may not include the radio wave shielding layer 141.

Since the intensity of the radio wave radiated by the bottom antenna 160 to the housing space between the front housing limiting plate 151 and the back portion 123 is high, the possibility of reading off information from the RF tag 301 in the housing space is low. On the other hand, the intensity of the radio wave radiated by the bottom antenna 160 to the first attenuation space between the front portion 121 and the front housing limiting plate 151 is low. If the RF tag 301 is put in the first attenuation space, there is a possibility that information is not read from the RF tag 301. However, the RF tag 301 is not put in the first attenuation space.

The upper end of the left side portion 122, the upper end of the back portion 123, and the upper end of the right side portion 124 are higher than the upper end of the front portion 121. The radio wave radiated by the bottom antenna 160 is attenuated when it reaches the upper end of the left side portion 122, the upper end of the back portion 123, and the upper end of the right side portion 124. The attenuated radio wave is diffracted at the upper ends of these portions (that is, the periphery of the opening 110) and leaks over the upper ends of these portions to the outside of the housing 100. The transmission/reception part 211 causes the bottom antenna 160 to radiate the radio wave with the intensity at which the RF tag 301 outside the housing 100 does not operate due to the radio wave that is diffracted at the upper ends of these portions and leaks from the opening 110 to the outside of the housing 100.

Furthermore, the radio wave radiated by the bottom antenna 160 may be reflected by the ceiling and reach an RF tag 301 outside the housing 100. However, the radio wave is attenuated before reaching the ceiling, and the reflected wave is further attenuated before reaching the RF tag 301 outside the housing 100. For example, the transmission/reception part 211 causes the bottom antenna 160 to radiate the radio wave with the intensity at which the RF tag 301 outside the housing 100 does not operate due to the radio wave reflected by the ceiling. If the RF tag 301 does not operate, it does not transmit the response radio wave. Thus the reading apparatus 1 does not obtain information of the RF tag 301 outside the housing 100. Therefore, when the bottom antenna 160 receives the response radio wave from the RF tag 301, the reading apparatus 1 can obtain only information read from the RF tag 301 inside the housing 100. In other words, the reading apparatus 1 can read information only from the RF tag 301 inside the housing space by reducing the intensity of the radio wave that is radiated by the bottom antenna 160 and leaks to the outside of the housing 100 from the opening 110.

The acquisition part 212 acquires information of the RF tag 301 included in the response radio wave received by the bottom antenna 160. The I/F 213 transmits information of each RF tag 301 acquired by the acquisition part 212 to an external apparatus (for example, a checkout apparatus or the like), and receives an instruction of an operation to the reading apparatus 1 from the external apparatus.

Figure 7:
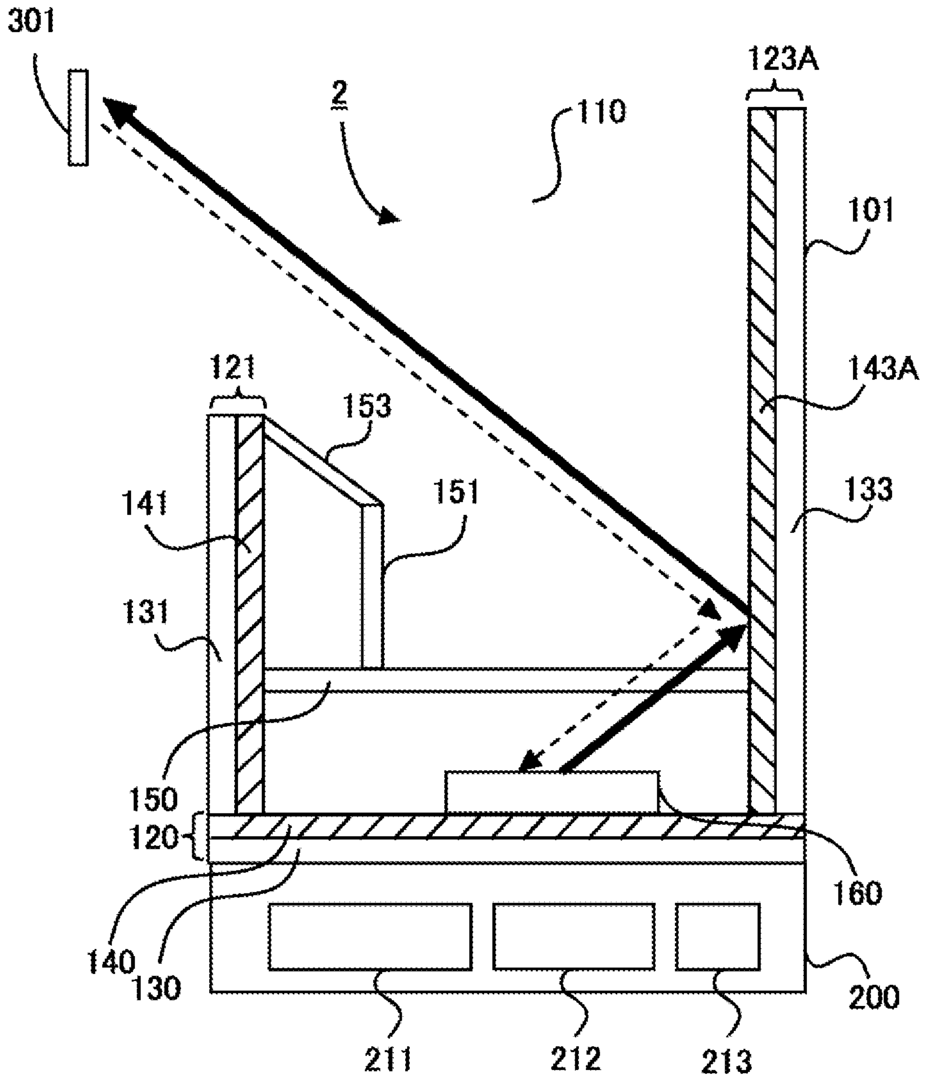
FIG. 7 is a diagram showing a reading apparatus for reading information from an RF tag as a comparative example of the reading apparatus shown in FIG. 1.

FIG. 7 shows a reading apparatus 2 for reading information from an RF tag 301 as a comparative example of the reading apparatus 1 shown in FIG. 1. The reading apparatus 2 of FIG. 7 is different from the reading apparatus 1 of FIG. 1 in that a back portion 123A includes a radio wave reflecting layer 143A instead of a radio wave absorbing layer. In other respects, the configuration of the reading apparatus 2 is the same as that of the reading apparatus 1. The side of a housing 101 in the reading apparatus 2 includes the front portion 121, the left side portion 122, a back portion 123A, and the right side portion 124. The back portion 123A includes the flat plate 133 and the radio wave reflecting layer 143A. The radio wave reflecting layer 143A covers, for example, the inner surface of the flat plate 133.

In the example of FIG. 7, an RF tag 301 is held by a person or the like on the outside of the housing 101 near the front portion 121, and the RF tag 301 is slightly higher than the upper end of the front portion 121. The radio wave radiated by the bottom antenna 160 is reflected by the radio wave reflecting layer 143A. The intensity of the reflected radio wave may be high. When the reflected radio wave leaks over the upper end of the front portion 121 to the outside of the housing 101, the RF tag 301 located on the outside of the housing 101 near the front portion 121 may be operated by the reflected radio wave. In this case, the response radio wave transmitted by the RF tag 301 held on the outside of the housing 101 is also reflected by the radio wave reflecting layer 143A and reaches the bottom antenna 160. Therefore, the acquisition part 212 may acquire information of the RF tag 301 even though the RF tag 301 is located on the outside of the housing 101.

On the other hand, in the reading apparatus 1 according to the present embodiment, the radio wave radiated by the bottom antenna 160 is absorbed by the radio wave absorbing layer 143. Therefore, the radio wave radiated by the bottom antenna 160 does not reach the RF tag 301 located at the position shown in FIG. 7. In the reading apparatus 1 according to the present embodiment, the acquisition part 212 does not acquire information of the RF tag 301 outside the housing 100. Therefore, in the reading apparatus 1 according to the present embodiment, the back portion 123 must include the radio wave absorbing layer 143. For the same reason as the back portion 123, the left side portion 122 and right side portion 124 must include the radio wave absorbing layer 143, too.

However, the front portion 121 of the reading apparatus 1 may include a radio wave reflecting layer instead of the radio wave absorbing layer. When the radio wave radiated by the bottom antenna 160 is reflected by the front portion 121, the radiated radio wave will head toward the rear. The reflected radio wave can not leak to the outside from the opening 110 over the upper end of the front portion 121. However, the reflected radio wave reflected by the front portion 121 and the direct radio wave radiated by the bottom antenna 160 may result in a multipath inside the housing 100. There is a possibility that the multipath generates a region in which the intensity of the radio wave is low. When the RF tag 301 is present in this region, the RF tag 301 may not operate, and the acquisition part 212 may not be able to acquire information of the RF tag 301. For this reason, the front portion 121 preferably includes a radio wave absorbing layer or includes neither a radio wave reflecting layer nor a radio wave absorbing layer.

Second Embodiment

Figure 8:
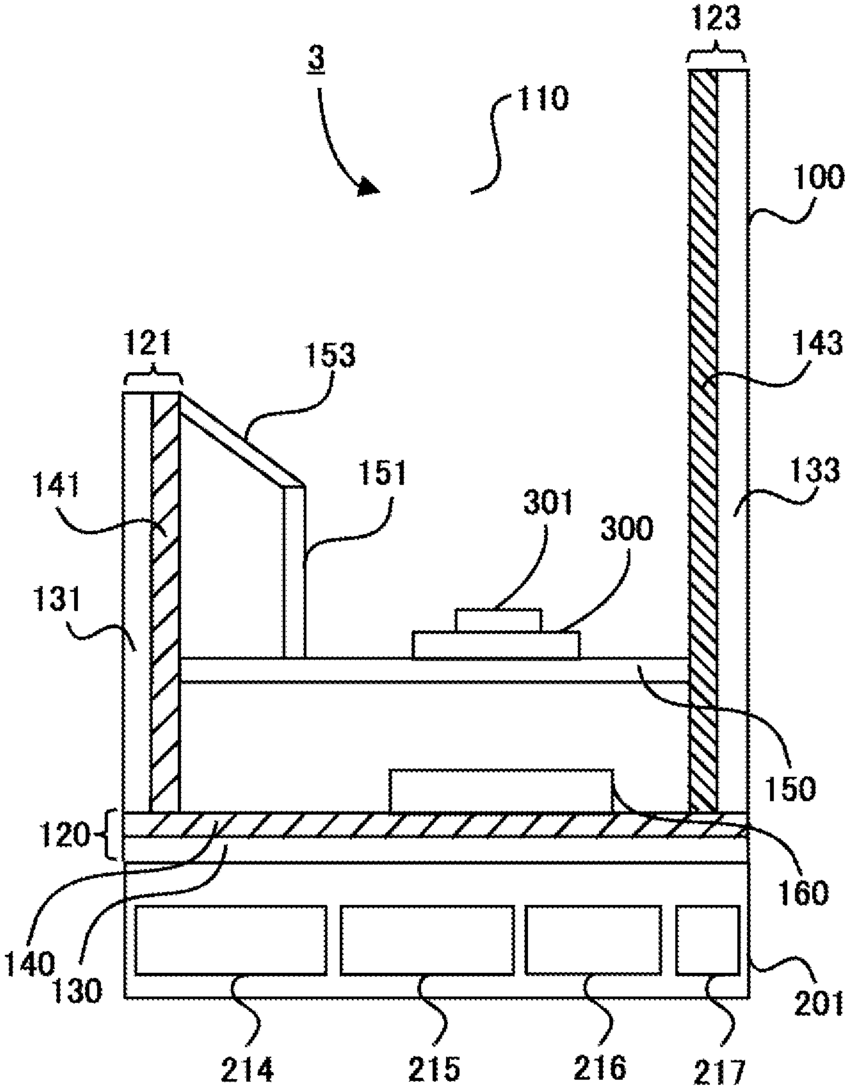
FIG. 8 is a longitudinal sectional view of an example of a reading apparatus for reading information from an RF tag according to the second embodiment.

FIG. 8 is a longitudinal sectional view of an example of a reading apparatus 3 for reading information from an RF tag 301 according to the second embodiment. FIG. 8 corresponds to the sectional view taken along line II-II in FIG. 1. The reading apparatus 3 includes the housing 100 and a controller 201. The configuration of the housing 100 in the reading apparatus 3 according to the second embodiment is the same as that of the housing 100 in the reading apparatus 1 according to the first embodiment. The radio wave output of the bottom antenna 160 in the reading apparatus 3 according to the second embodiment is larger than that of the reading apparatus 1 according to the first embodiment. In the reading apparatus 3 according to the second embodiment, the RF tag 301 outside the housing 100 may operate due to the radio wave leaking from the opening 110 to the outside of the housing 100.

The controller 201 includes a transmission/reception part 214, a determination part 215, an acquisition part 216, and an interface (I/F) 217. If an RF tag 301 is capable of transmitting an RSSI (Received Signal Strength Indicator), the transmission/reception part 214 obtains the RSSI and information including a tag ID from a response radio wave when the bottom antenna 160 receives the response radio wave. In this case, the RSSI indicates the intensity of the radio wave that is radiated by the bottom antenna 160 and received by the RF tag 301. Alternatively, when the bottom antenna 160 receives the response radio wave, the transmission/reception part 214 obtains the intensity of the response radio wave and information including the tag ID from the response radio wave.

If the RF tag 301 is capable of transmitting the RSSI, the determination part 215 determines whether the RF tag 301 is inside or outside the housing 100 based on the RSSI obtained from the response radio wave received by the bottom antenna 160. For example, when the RSSI obtained from the response radio wave received by the bottom antenna 160 is equal to or higher than a predetermined first threshold, the determination part 215 determines that the RF tag 301 is inside the housing 100 (that is, inside the housing space).

Alternatively, the determination part 215 determines whether the RF tag 301 is inside or outside the housing 100 based on the intensity of the response radio wave which is transmitted by the RF tag 301 and is received by the bottom antenna 160. For example, when the intensity of the response radio wave obtained from the response radio wave received by the bottom antenna 160 is equal to or higher than a predetermined second threshold, the determination part 215 determines that the RF tag 301 is inside the housing 100 (that is, inside the housing space).

The configuration of the housing 100 in the reading apparatus 3 according to the second embodiment is the same as that of the housing 100 in the reading apparatus 1 according to the first embodiment. Therefore, the operation of the controller 201 will be described below with reference to FIGS. 5 and 6. However, unlike the description regarding FIGS. 5 and 6 described above, the determination part 215 determines that the RF tag 301 is inside the housing 100 based on the RSSI or the intensity of the response radio wave obtained from the response radio wave transmitted by the RF tag 301 that receives the radio wave in the range indicated by the diagonally right-up dashed line in FIGS. 5 and 6.

FIG. 5 is an example in which the front portion 121 includes the radio wave shielding layer 141. As shown in FIG. 5, the upper end of the front portion 121 in the reading apparatus 3 is low. However, the radio wave radiated by the bottom antenna 160 is attenuated while propagating through the first attenuation space between the front portion 121 and the front housing limiting plate 151. The attenuated radio wave is diffracted at the upper end of the front portion 121 (that is, the periphery of the opening 110) and leaks over the upper end of the front portion 121 to the outside of the housing 100. The transmission/reception part 214 causes the bottom antenna 160 to radiate the radio wave toward the first attenuation space with the intensity at which the determination part 215 can determine that the RF tag 301 is outside the housing 100 based on a response radio wave radiated by the RF tag 301 operated by a radio wave diffracted at the upper end of the front portion 121 and leaking from the opening 110 to the outside of the housing 100.

Since the intensity of the radio wave diffracted at the upper end of the front portion 121 is low, the RSSI included in the response radio wave transmitted by the RF tag 301 that receives the diffracted radio wave is low. If the response radio wave transmitted by RF tag 301 which receives the diffracted radio wave is diffracted in the upper end of the front portion 121 and reaches the bottom antenna 160, the intensity of the response radio wave is low, too. Therefore, the determination part 215 can determine that the RF tag 301 is outside the housing 100 based on the RSSI obtained from the response radio wave or the intensity of the response radio wave.

FIG. 6 is an example in which the front portion 121 does not include the radio wave shielding layer 141. As shown in FIG. 6, the upper end of the front portion 121 in the reading apparatus 3 is low. However, the radio wave radiated by the bottom antenna 160 is attenuated while propagating through the first attenuation space between the front portion 121 and the front housing limiting plate 151. The transmission/reception part 214 causes the bottom antenna 160 to radiate a radio wave toward the first attenuation space with the intensity at which the determination part 215 can determine that an RF tag 301 is outside the housing 100 based on the response radio wave radiated by the RF tag 301 operated by the radio wave leaking through the front portion 121 to the outside of the housing 100. Since the intensity of the radio wave leaking through the front portion 121 to the outside of the housing 100 is low, the RSSI included in the response radio wave transmitted by the RF tag 301 that receives the radio wave is low. In addition, the intensity of the response radio wave transmitted by the RF tag 301 that receives the radio wave is also low. Therefore, the determination part 215 can determine that the RF tag 301 is outside the housing 100 based on the RSSI obtained from the response radio wave or the intensity of the response radio wave.

The upper end of the left side portion 122, the upper end of the back portion 123, and the upper end of the right side portion 124 are higher than the upper end of the front portion 121. The radio wave radiated by the bottom antenna 160 is attenuated when it reaches the upper end of the left side portion 122, the upper end of the back portion 123, and the upper end of the right side portion 124. The attenuated radio wave is diffracted at the upper ends of these portions (that is, the periphery of the opening 110) and leaks over the upper ends of these portions to the outside of the housing 100. In the reading apparatus 3, even if the RF tag 301 is operated by the radio wave which is diffracted at the upper ends of these portions and leaks from the opening 110 to the outside of the housing 100, the determination part 215 can determine that the RF tag 301 is outside the housing 100 based on the RSSI or the intensity of the response radio wave obtained from the response radio wave transmitted by the RF tag 301.

Furthermore, the radio wave radiated by the bottom antenna 160 may be reflected by the ceiling and reach an RF tag 301 outside the housing 100. However, the radio wave is attenuated before reaching the ceiling, and the reflected radio wave is further attenuated before reaching the RF tag 301 outside the housing 100. In the reading apparatus 3, even if the RF tag 301 outside of the housing 100 is operated by the radio wave which is reflected by the ceiling, the determination part 215 can determine that the RF tag 301 is outside the housing 100 based on the RSSI or the intensity of the response radio wave obtained from the response radio wave transmitted by the RF tag 301.

Therefore, when the bottom antenna 160 receives the response radio wave from the RF tag 301, the reading apparatus 3 can select only information read from the RF tag 301 inside the housing 100. In other words, the reading apparatus 3 can read information only from the RF tag 301 inside the housing space by reducing the intensity of the radio wave that is radiated by the bottom antenna 160 and leaks to the outside of the housing 100 from the opening 110.

For example, when the determination part 215 determines that the RF tag 301 is inside the housing 100, the acquisition part 216 acquires information read from the RF tag 301. As a result, the reading apparatus 3 can acquire information of the RF tag 301 inside the housing space. The I/F 217 transmits information of each RF tag 301 acquired by the acquisition part 216 to an external apparatus (for example, a checkout apparatus or the like), and receives an instruction of an operation to the reading apparatus 3 from the external apparatus.

The acquisition part 216 may also acquire information of the RF tag 301 outside the housing 100, and the I/F 217 may transmit information of the RF tag 301 to the external apparatus along with information indicating whether the RF tag 301 is inside the housing 100 or the RF tag 301 is outside the housing 100.

Third Embodiment

Figure 9:
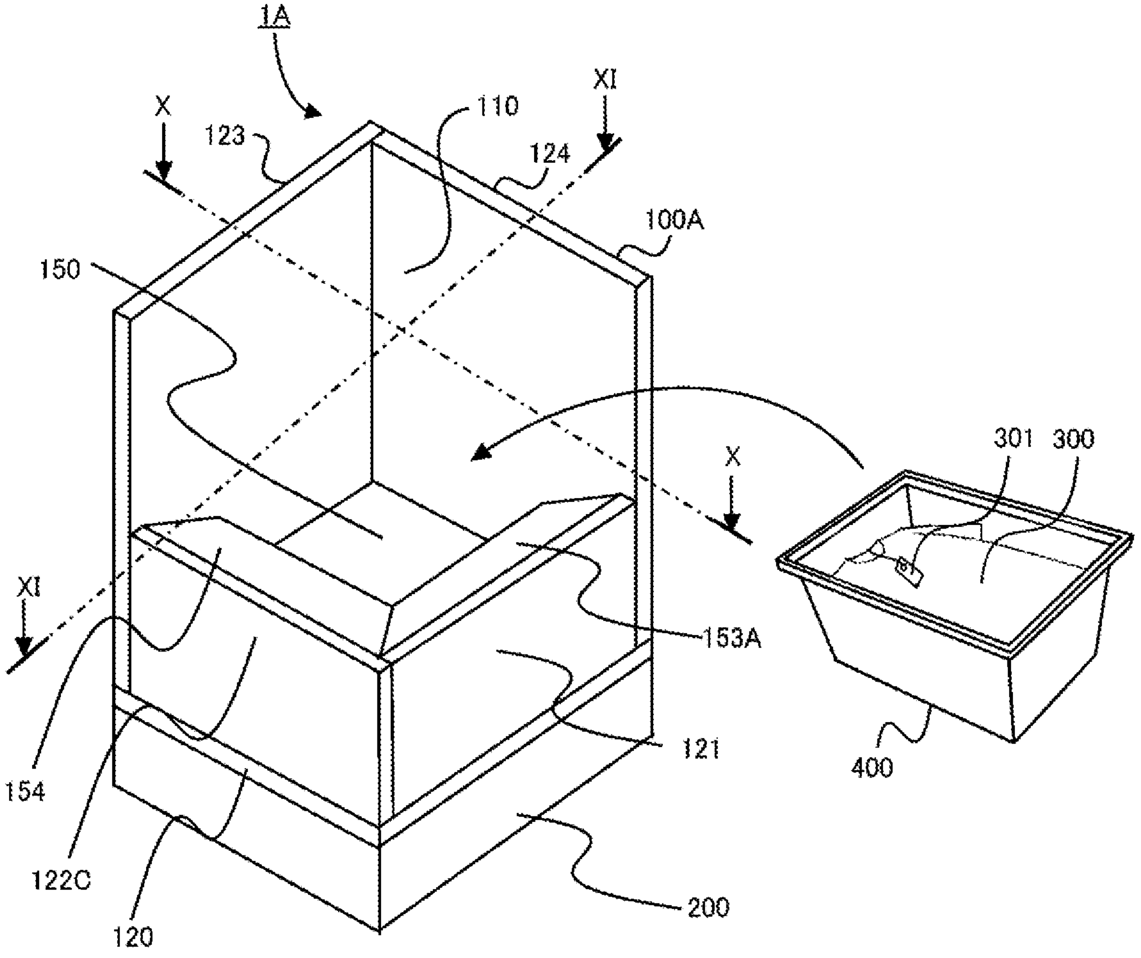
FIG. 9 is a perspective view of an example of a reading apparatus for reading information from an RF tag according to the third embodiment.
Figure 10:
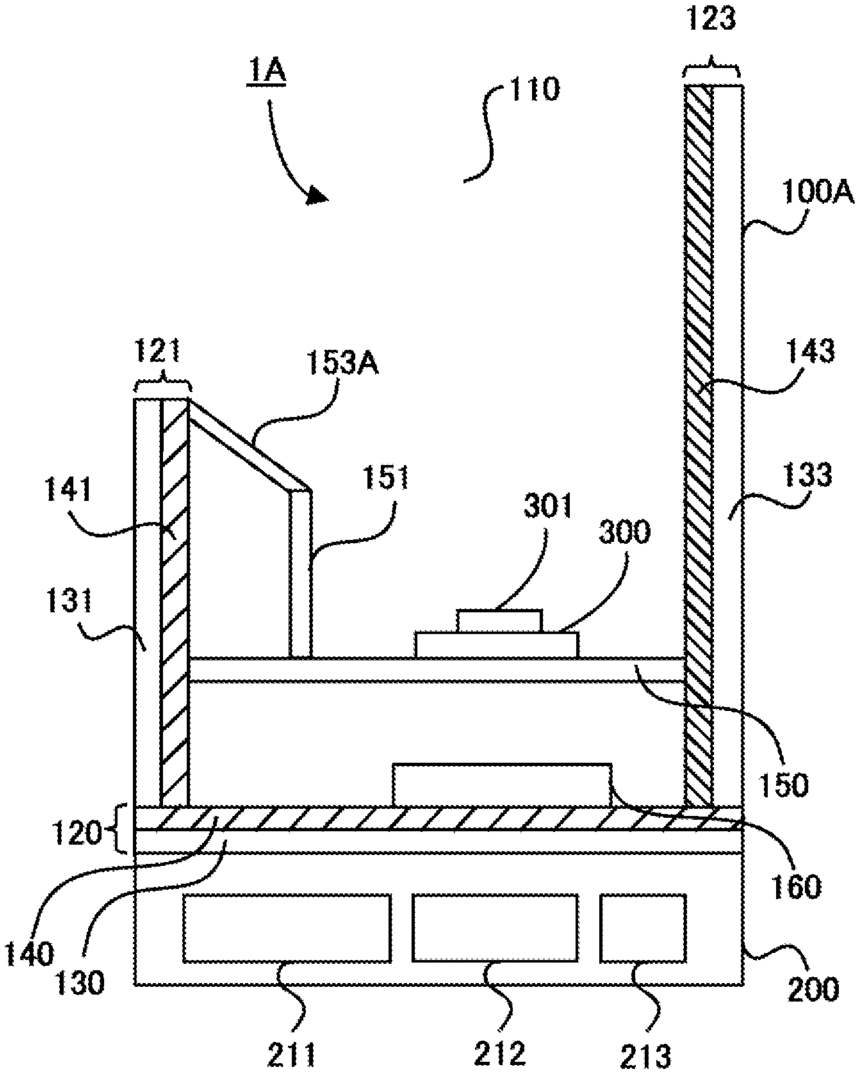
FIG. 10 is a sectional view taken along line X-X in FIG. 9.
Figure 11:
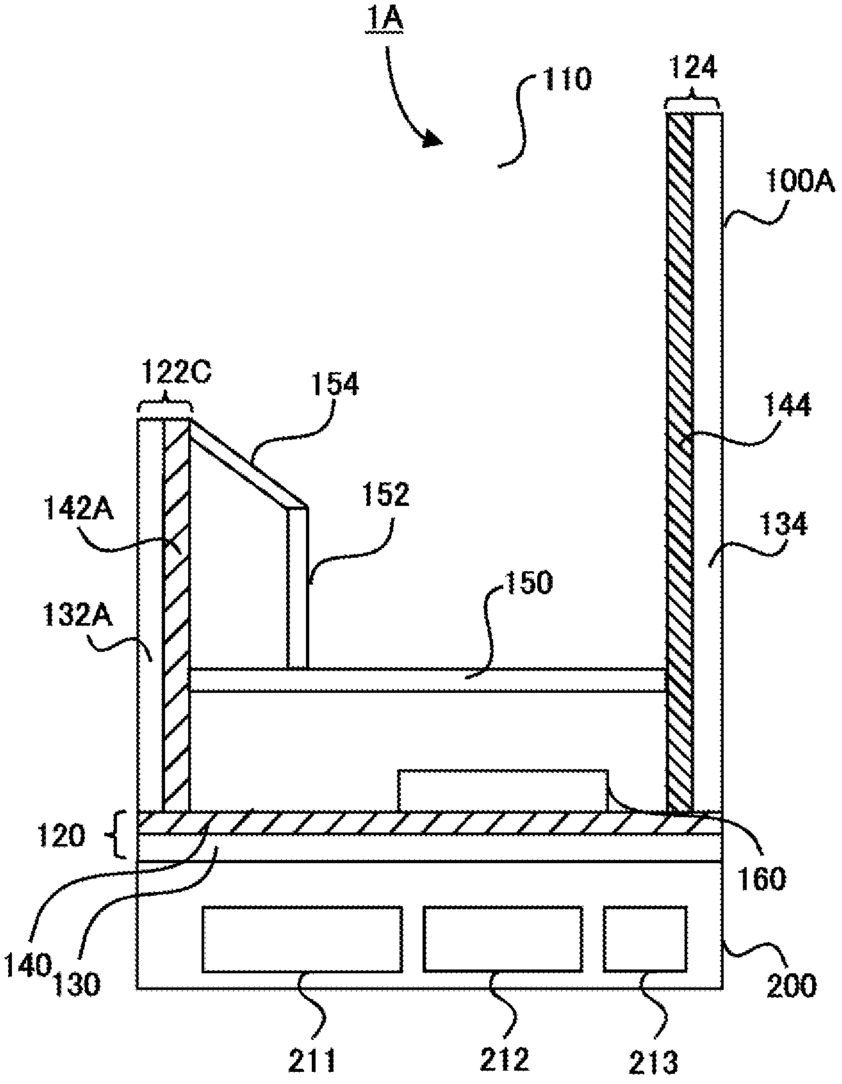
FIG. 11 is a sectional view taken along line XI-XI in FIG. 9.
Figure 12:
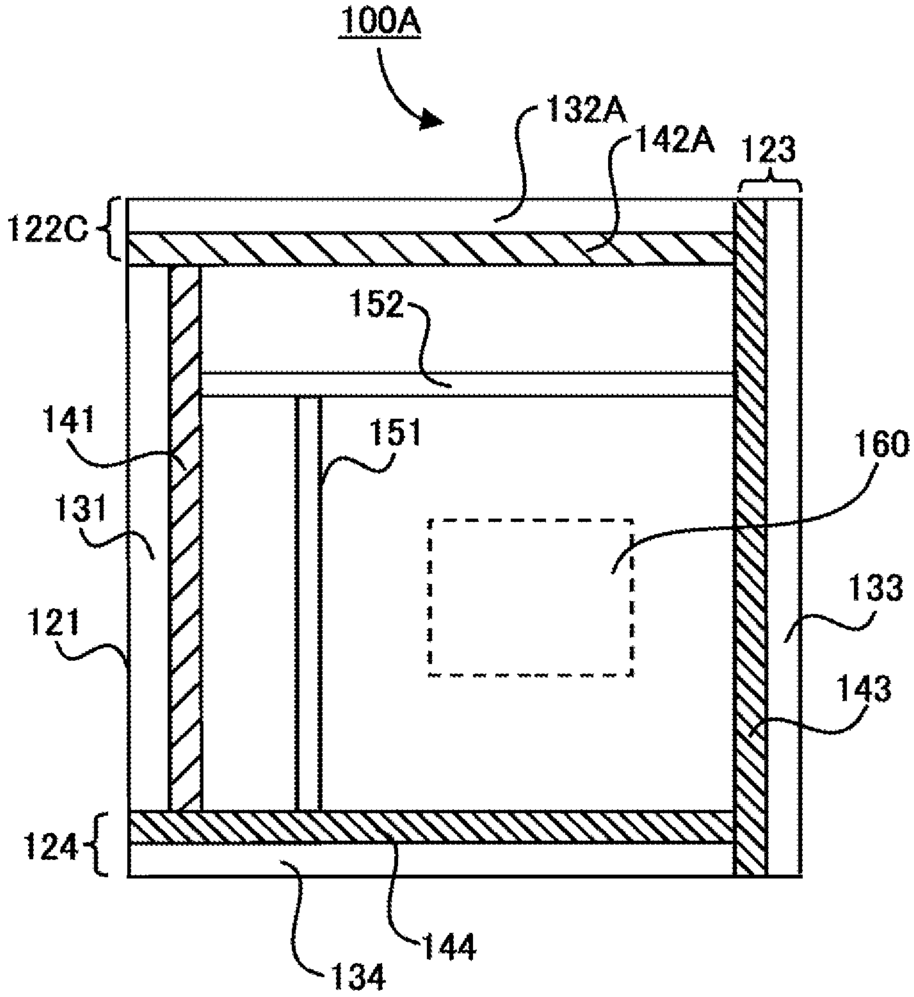
FIG. 12 is a plan view of an example of a housing in the reading apparatus shown in FIG. 9.

FIG. 9 is a perspective view of an example of a reading apparatus 1A for reading information from an RF tag 301 according to the third embodiment. FIG. 10 is a sectional view taken along line X-X in FIG. 9. FIG. 11 is a sectional view taken along line XI-XI in FIG. 9. FIG. 12 is a plan view of an example of a housing 100A in the reading apparatus 1A shown in FIG. 9. The reading apparatus 1A includes the housing 100A and the controller 200. The configuration of the controller 200 in the reading apparatus 1A according to the third embodiment is the same as that of the controller 200 in the reading apparatus 1 according to the first embodiment. The transmission/reception part 211 of the controller 200 causes the bottom antenna 160 to radiate a radio wave with the intensity at which the RF tag 301 outside the housing 100A does not operate.

The housing 100A includes the bottom portion 120, the front portion 121, a left side portion 122C, the back portion 123, the right side portion 124, the placement plate 150, the front housing limiting plate 151, a side housing limiting plate 152, a front guide portion 153A, a side guide portion 154, and the bottom antenna 160. Unlike the left side portion 122 of the housing 100 according to the first embodiment, the upper end of the left side portion 122C in the housing 100A according to the third embodiment is at the same height as the upper end of the front portion 121. Further, the housing 100A is different from the housing 100 according to the first embodiment in that it has the side housing limiting plate 152 and the side guide portion 154. In other respects, the configuration of the housing 100A is the same as that of the housing 100. The differences between the housing 100A and the housing 100 are described below.

One end and the other end of the left side portion 122C are fixed to one end of the front portion 121 and one end of the back portion 123, respectively. The left side portion 122C is, for example, a rectangular flat plate. The left side portion 122C stands vertically to the bottom portion 120 from the left edge of the bottom portion 120. The upper end of the left side portion 122C is, for example, at the same height as the upper end of the front portion 121. The left side portion 122C includes a flat plate 132A and a radio wave shielding layer 142A. The radio wave shielding layer 142A covers, for example, the inner surface of the flat plate 132A. The left side portion 122C may not necessarily include the radio wave shielding layer 142A, but the left side portion 122C preferably includes the radio wave shielding layer 142A, for example, in order to suppress radio waves that enter the inside of the housing 100A from the outside.

The side housing limiting plate 152 is, for example, a rectangular flat plate. The side housing limiting plate 152 is located between the left side portion 122C and the right side portion 124 at a predetermined distance from the left side portion 122C so as to stand vertically from the upper surface of the placement plate 150. The side housing limiting plate 152 allows radio waves to pass through. The front guide portion 153A and the side guide portion 154 are, for example, a flat plate, respectively. The lower end of the front guide portion 153A is fixed to the upper end of the front housing limiting plate 151. The front guide portion 153A inclines obliquely upward, and the upper end thereof is fixed to the upper end of the front portion 121. The lower end of the side guide portion 154 is fixed to the upper end of the side housing limiting plate 152. The side guide portion 154 inclines obliquely upward, and the upper end thereof is fixed to the upper end of the left side portion 122C. One end and the other end of the front guide portion 153A are fixed to one end of the side guide portion 154 and the inner surface of the right side portion 124, respectively. One end and the other end of the side guide portion 154 are fixed to one end of the front guide portion 153 A and the inner surface of the back portion 123, respectively. The front guide portion 153A and the side guide portion 154 allow radio waves to pass through.

The front housing limiting plate 151 and the side housing limiting plate 152 may not stand vertically from the upper surface of the placement plate 150 but may stand vertically from the upper surface of the bottom portion 120, and each edge of the placement plate 150 may be fixed to the inner surfaces of the front housing limiting plate 151, the side housing limiting plate 152, the back portion 123, and the right side portion 124. The side guide portion 154 may not extend obliquely upward from the upper end of the side housing limit plat 152 but may be parallel to the placement plate 150. Further, the side guide portion 154 may be omitted.

A space above the placement plate 150 and surrounded by the front housing limiting plate 151, the side housing limiting plate 152, the back portion 123, and the right side portion 124 is the housing space. The housing space can accommodate an article 300 or can accommodate part or all of a shopping basket 400. The article 300 or the shopping basket 400 is placed on the placement plate 150.

The side housing limiting plate 152 divides the inside of the housing 100A into a space between the left side portion 122C and the side housing limiting plate 152 and a space between the side housing limiting plate 152 and the right side portion 124. Here, the article 300 and the shopping basket 400 are not accommodated in a space between the left side portion 122C and the side housing limiting plate 152. This space is a second attenuation space in which a radio wave radiated by the bottom antenna 160 propagates while being attenuated. The space between the side housing limiting plate 152 and the right side portion 124 is the housing space. That is, the side housing limiting plate 152 divides the inside of the housing 100A into the second attenuation space near the left side portion 122C and the housing space near the the right side portion 124. The bottom antenna 160 is located on the upper surface of the bottom portion 120 at a position at which a radio wave with high intensity is radiated toward the housing space and a radio wave with lower intensity than the intensity of the radio wave radiated toward the housing space is radiated toward the second attenuation space. The side housing limiting plate 152 is an example of a second housing limiting portion of the present disclosure.

The back portion 123 is opposed to the front portion 121. One end and the other end of the back portion 123 are fixed to the other end of the left side portion 122C and one end of the right side portion 124, respectively.

The difference in the configuration of the housing 100A and the configuration of the housing 100 causes a difference in the operation related to the left side portion 122C of the reading apparatus 1A according to the third embodiment and the operation related to the left side portion 122 of the reading apparatus 1 according to the first embodiment. The differences between the operation of the reading apparatus 1A and the operation of the reading apparatus 1 are described below. The operation regarding the left side portion 122C in the reading apparatus 1A is like the operation regarding the front portion 121 described with reference to FIGS. 5 and 6 in the description of the reading apparatus 1 according to the first embodiment.

The left side portion 122C may or may not include the radio wave shielding layer 142A. First, a case where the left side portion 122C includes the radio wave shielding layer 142A is described. The upper end of the left side portion 122C in the reading apparatus 1A is low. However, the radio wave radiated by the bottom antenna 160 is attenuated while propagating through the second attenuation space between the left side portion 122C and the side housing limiting plate 152. The attenuated radio wave is diffracted at the upper end of the left side portion 122C (that is, the periphery of the opening 110) and leaks over the upper end of the left side portion 122C to the outside of the housing 100A. The transmission/reception part 211 causes the bottom antenna 160 to radiate a radio wave toward the second attenuation space with the intensity at which an RF tag 301 outside the housing 100A does not operate due to a radio wave that is diffracted at the upper end of the left side portion 122C and leaks from the opening 110 to the outside of the housing 100A. Since the intensity of the radio wave diffracted at the upper end of the left side portion 122C is low, the RF tag 301 outside the housing 100A does not operate.

Next, a case where the left side portion 122C does not include the radio wave shielding layer 142A is described. The radio wave radiated by the bottom antenna 160 is attenuated while propagating through the second attenuation space between the left side portion 122C and the side housing limiting plate 152. The transmission/reception part 211 causes the bottom antenna 160 to radiate a radio wave toward the second attenuation space with the intensity at which the RF tag 301 does not operate when the radio wave reaches the left side portion 122C. Therefore, the RF tag 301 outside the housing 100A does not operate due to the radio wave leaking to the outside of the housing 100A from the left side portion 122C.

Since the intensity of the radio wave radiated by the bottom antenna 160 to the housing space between the side housing limiting plate 152 and the right side portion 124 is high, the possibility of reading off information from the RF tag 301 in the housing space is low. On the other hand, the intensity of the radio wave radiated by the bottom antenna 160 to the second attenuation space between the left side portion 122C and the side housing limiting plate 152 is low. If the RF tag 301 is put in the second attenuation space, there is a high possibility that information is not read from the RF tag 301. However, the RF tag 301 is not put in the second attenuation space.

The upper end of the back portion 123 and the upper end of the right side portion 124 are higher than the upper end of the front portion 121. The radio wave radiated by the bottom antenna 160 is attenuated when it reaches the upper end of the back portion 123 and the upper end of the right side portion 124. The attenuated radio wave is diffracted at the upper ends of these portions (that is, the periphery of the opening 110) and leaks over the upper ends of these portions to the outside of the housing 100A. The transmission/reception part 211 causes the bottom antenna 160 to radiate a radio wave with the intensity at which the RF tag 301 outside the housing 100A does not operate due to the radio wave that leaks over the upper ends of these portions from the opening 110 to the outside of the housing 100A.

If the RF tag 301 does not operate, it does not transmit the response radio wave. Thus the reading apparatus 1A does not acquire information of the RF tag 301 outside the housing 100A. Therefore, when the bottom antenna 160 receives the response radio wave from the RF tag 301, the reading apparatus 1A can obtain only information read from the RF tag 301 inside the housing 100A. In other words, the reading apparatus 1A can read information only from the RF tag 301 inside the housing space by reducing the intensity of the radio wave that is radiated by the bottom antenna 160 and leaks to the outside of the housing 100A from the opening 110.

However, the left side portion 122C of the reading apparatus 1A may include a radio wave reflecting layer instead of the radio wave absorbing layer. The radio wave radiated by the bottom antenna 160 is attenuated while propagating through the second attenuation space between the left side portion 122C and the side housing limiting plate 152. Therefore, when the radio wave radiated by the bottom antenna 160 reaches the left side portion 122C, the intensity of the radio wave is reduced. When the distance between the left side portion 122C and the side housing limiting plate 152 is sufficiently large, even if the radio wave radiated by the bottom antenna 160 is reflected by the left side portion 122C and leaks over the upper end of the front portion 121 to the outside of the housing 100A, the RF tag 301 outside of the housing 100A does not operate due to the leaked radio wave.

Fourth Embodiment

The reading apparatus according to the fourth embodiment is not shown in the figure. It includes the housing 100A and the controller 201. The configuration of the housing 100A is the same as that of the housing 100A in the reading apparatus 1A according to the third embodiment. The configuration of the controller 201 is the same as that of the controller 201 in the reading apparatus 3 according to the second embodiment. In the reading apparatus 1A according to the third embodiment, the RF tag 301 outside the housing 100A does not operate due to the radio wave that is radiated by the bottom antenna 160 and leaks from the opening 110 to the outside of the housing 100A.

On the other hand, the radio wave output of the bottom antenna 160 in the reading apparatus according to the fourth embodiment is larger than that of the reading apparatus 1A according to the third embodiment. In the reading apparatus according to the fourth embodiment, the RF tag 301 outside the housing 100A may operate due to the radio wave that is radiated by the bottom antenna 160 and leaks from the opening 110 to the outside of the housing 100A. When the bottom antenna 160 receives the response radio wave from the RF tag 301, the determination part 215 determines whether the RF tag 301 is inside or outside the housing 100A based on the RSSI obtained from the response radio wave or the intensity of the response radio wave.

Fifth Embodiment

Figure 13:
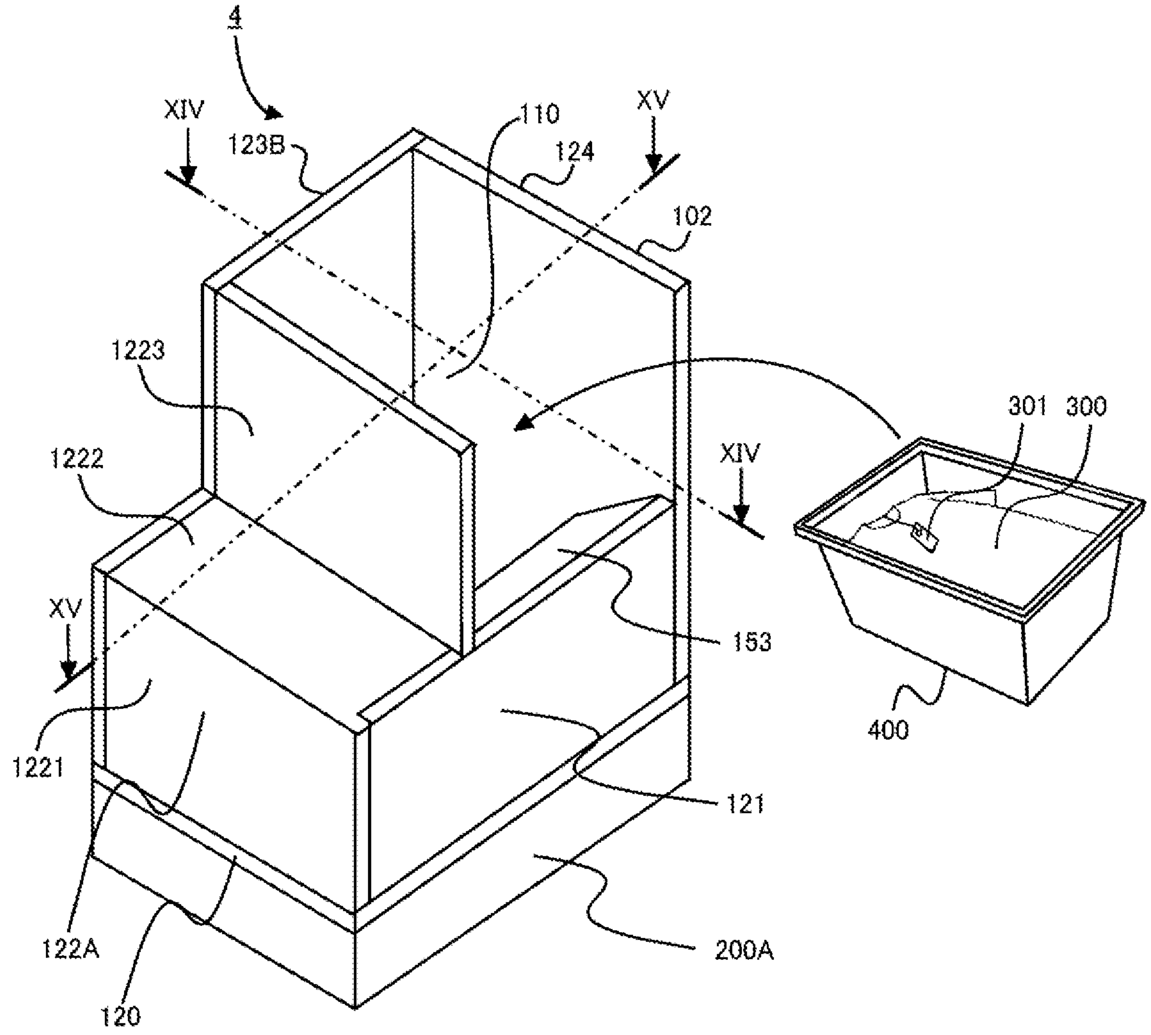
FIG. 13 is a perspective view of an example of a reading apparatus for reading information from an RF tag according to the fifth embodiment.
Figure 14:
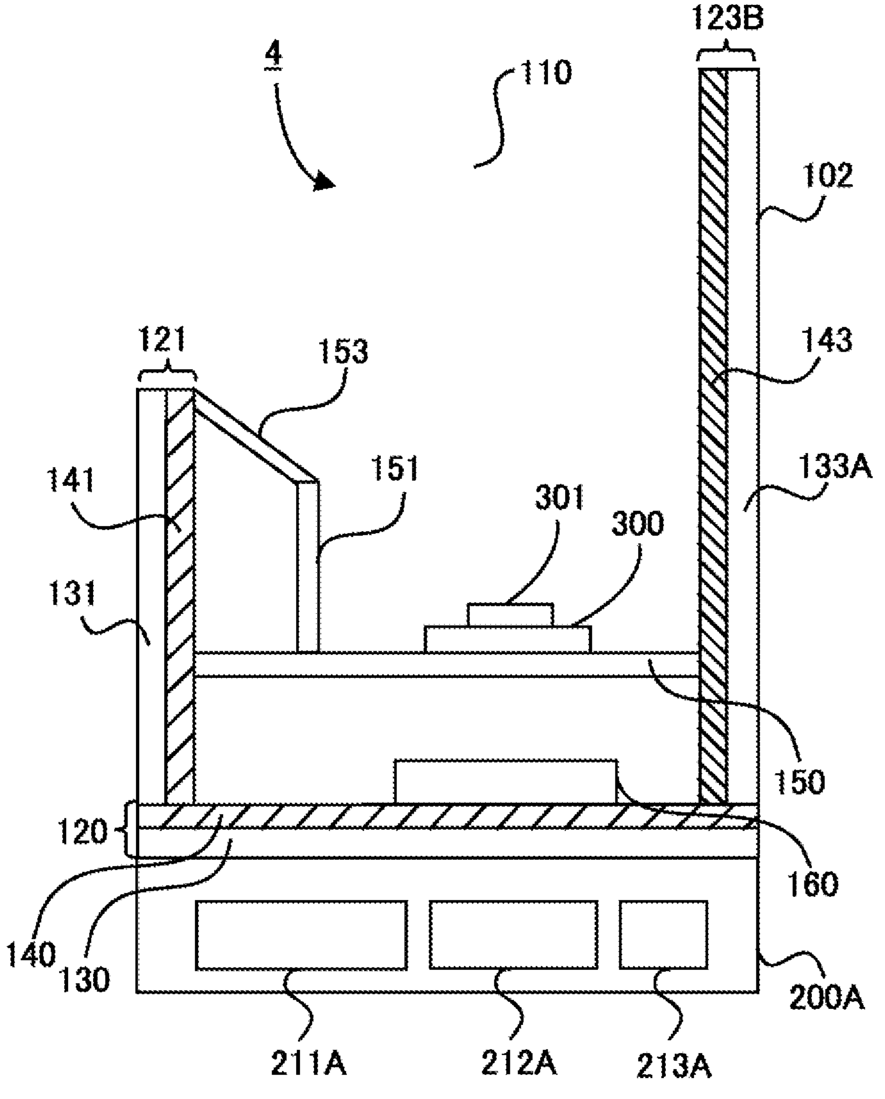
FIG. 14 is a sectional view taken along line XIV-XIV in FIG. 13.
Figure 15:
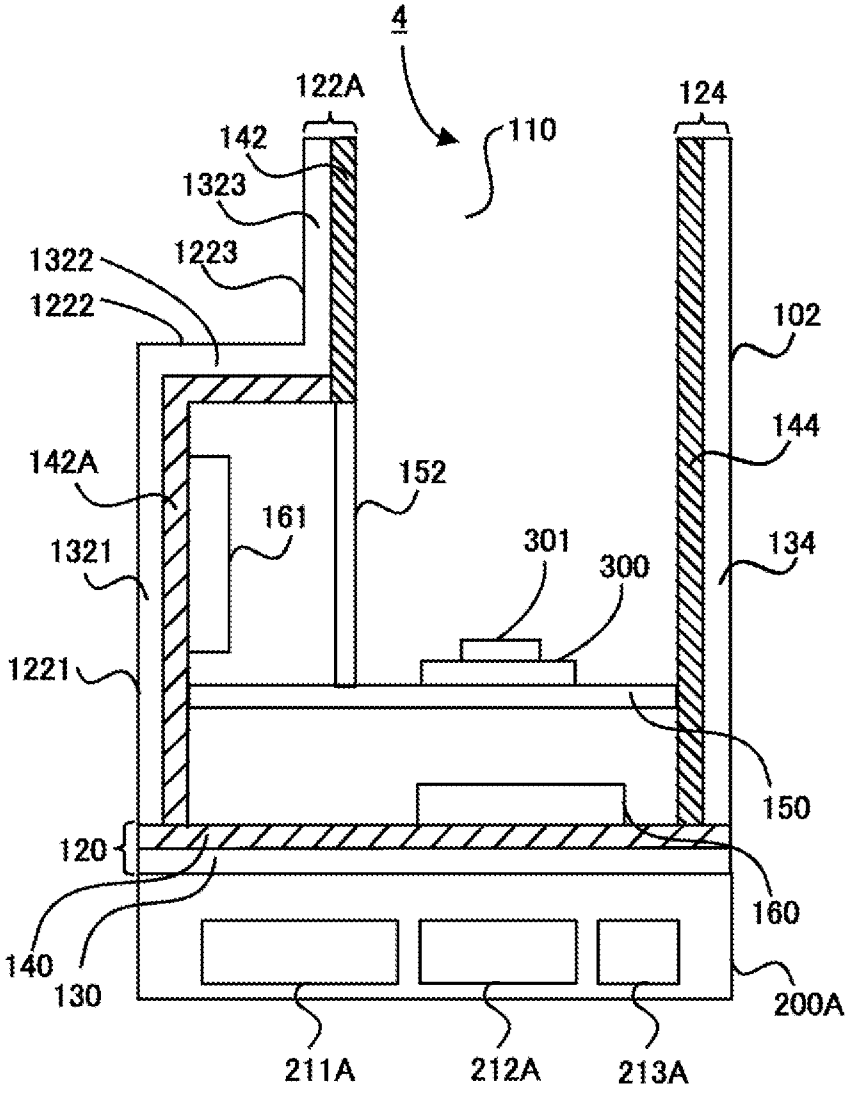
FIG. 15 is a sectional view taken along line XV-XV in FIG. 13.
Figure 16:
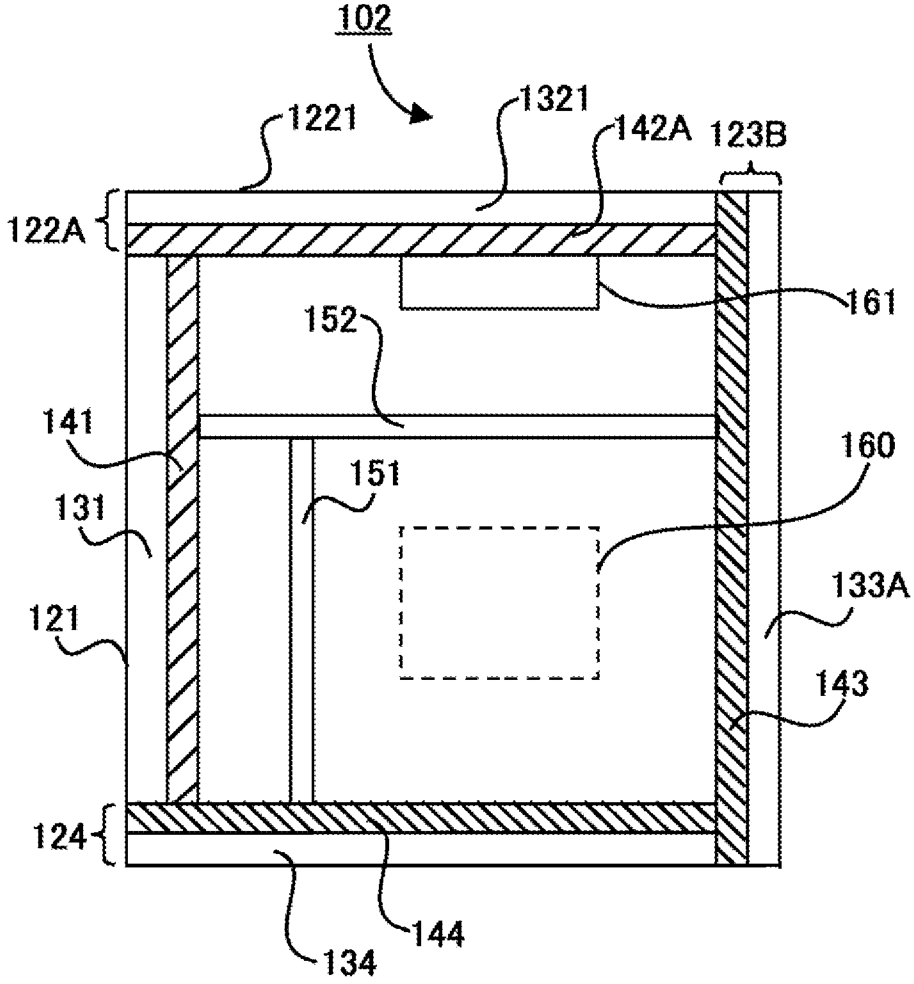
FIG. 16 is a plan view of an example of a housing in the reading apparatus shown in FIG. 13.

FIG. 13 is a perspective view of an example of a reading apparatus 4 for reading information from an RF tag 301 according to the fifth embodiment. FIG. 14 is a sectional view taken along line XIV-XIV in FIG. 13. FIG. 15 is a sectional view taken along line XV-XV in FIG. 13. FIG. 16 is a plan view of an example of a housing 102 in the reading apparatus 4 shown in FIG. 13. The reading apparatus 4 includes the housing 102 and a controller 200A.

As shown in FIGS. 13 to 16, the housing 102 includes the top portion, the bottom portion 120, the front portion 121, a left side portion 122A, a back portion 123B, the right side portion 124, the placement plate 150, the front housing limiting plate 151, the side housing limiting plate 152, the front guide portion 153, the bottom antenna 160, and a side antenna 161. The housing 102 according to the fifth embodiment is different from the housing 100 according to the first embodiment in that it has the side housing limiting plate 152 and the side antenna 161. Accordingly, the configurations of the left portion 122A and the back portion 123B in the housing 102 are different from those of the left portion 122 and the back portion 123 in the housing 100. In other respects, the configuration of the housing 102 according to the fifth embodiment is the same as that of the housing 100 according to the first embodiment. The differences between housing 102 and housing 100 are described below.

One end and the other end of the left side portion 122A are fixed to one end of the front portion 121 and one end of the back portion 123B, respectively. The left side portion 122A includes a lower part 1221, a middle part 1222, and an upper part 1223. The lower part 1221 stands vertically to the bottom portion 120 from the left edge of the bottom portion 120. The middle part 1222 extends from the upper end of the lower part 1221 toward the right side portion 124 in parallel with the bottom portion 120. The upper part 1223 stands vertically to the middle part 1222 (and bottom portion 120) from the right edge of the middle part 1222. The lower part 1221, the middle part 1222, and the upper part 1223 include, a rectangular flat plate 1321, a rectangular flat plate 1322, and a rectangular flat plate 1323, respectively. A radio wave shielding layer 142A covers, for example, the inner surfaces of the flat plate 1321 and the flat plate 1322. The radio wave absorbing layer 142 covers, for example, the inner surface of the flat plate 1323. That is, the lower part 1221 and the middle part 1222 include the radio wave shielding layer 142A, and the upper part 1223 includes the radio wave absorbing layer 142. The middle part 1222 is at the same height as the upper end of the front portion 121. The upper end of the upper part 1223 has a constant height and is at the same height as the upper end of the back portion 123B. Therefore, the upper end of the left side portion 122A (that is, the upper end of the upper part 1223) is higher than the upper end of the front portion 121.

Figure 17:
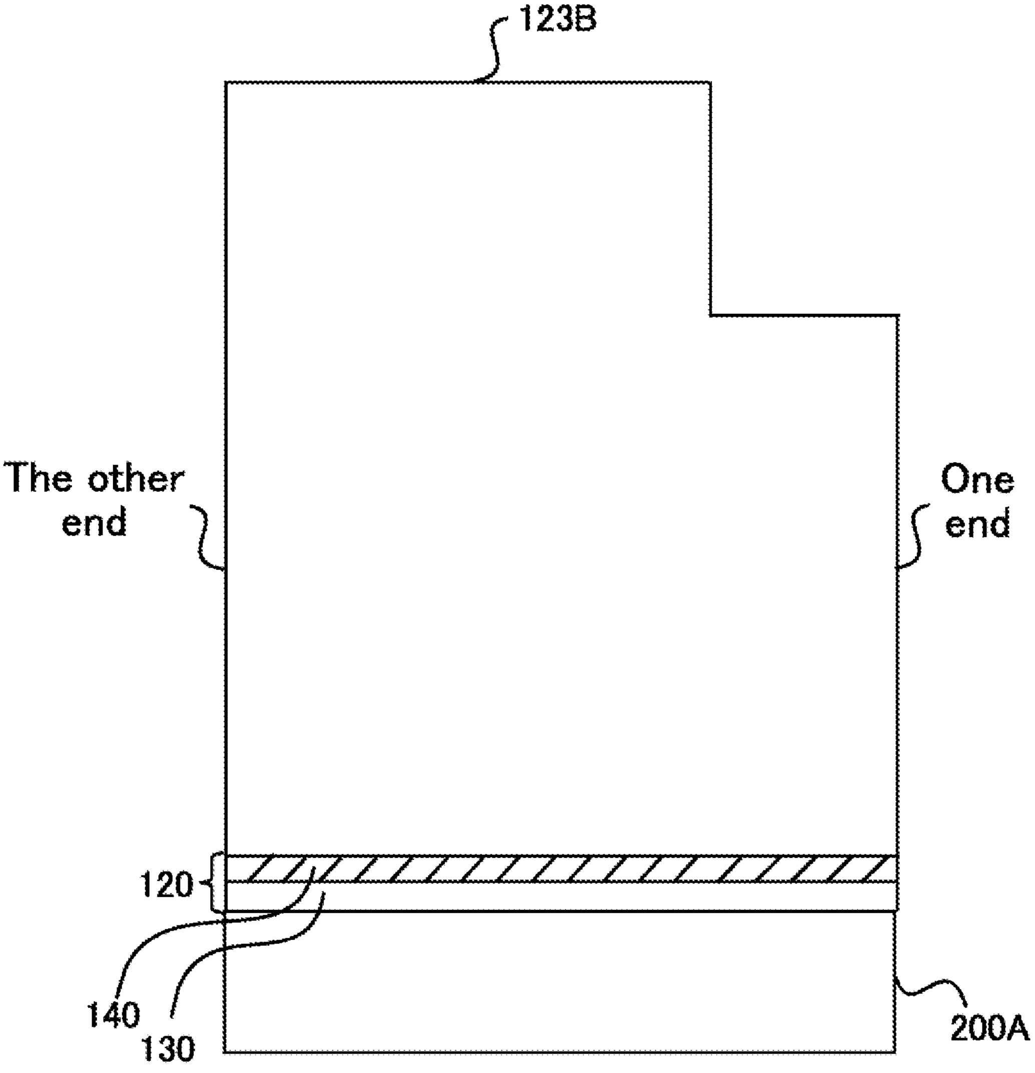
FIG. 17 is a rear view of the reading apparatus shown in FIG. 13.

The back portion 123B is opposed to the front portion 121. One end and the other end of the back portion 123B are fixed to the other end of the left side portion 122A and one end of the right side portion 124, respectively. The back portion 123B stands vertically to the bottom portion 120 from the back edge of the bottom portion 120. As shown in FIG. 17, one end of the back portion 123B has a shape that matches the shape of the other end of the left side portion 122A. Thus, the back portion 123B is L-shaped. That is, the back portion 123B is composed of a high portion near the other end and a low portion near one end. The upper end of the low portion near one end is at the same height as the middle part 1222 of the left side portion 122A. The upper end of the high portion near the other end is at the same height as the upper part 1223 of the left side portion 122A. The upper end of the back portion 123B has a constant height and is higher than the upper end of the front portion 121. Here, the upper end of the back portion 123B is the portion near the other end and higher than the portion near one end. The back portion 123B includes an L-shaped flat plate 133A and the L-shaped radio wave absorbing layer 143. The radio wave absorbing layer 143 covers, for example, the inner surface of the L-shaped flat plate 133A.

The right side portion 124 is opposed to the left side portion 122A. One end and the other end of the right side portion 124 are fixed to the other end of the back portion 123B and the other end of the front portion 121, respectively. The height of the upper end of the right side portion 124 is the same as the height of the upper end of the back portion 123B. The upper end of the right side portion 124 has a constant height and is higher than the upper end of the front portion 121.

The radio wave absorbing layer 143 included in the back portion 123B may not cover the inner surface of the L-shaped flat plate 133A but may cover the outer surface of the L-shaped flat plate 133A or may be sandwiched between two L-shaped flat plates. In these cases, however, the L-shaped flat plate on the inner side of the radio wave absorbing layer 143 must be made of a material that allows radio waves to pass through. The left side portion 122A is an example of a first side portion of the present disclosure, and the right side portion 124 is an example of a second side portion of the present disclosure.

The side antenna 161 is an antenna located on the inner surface of the lower part 1221 in the left side portion 122A (that is, the inner surface of the left side portion 122A). The side antenna 161 radiates a radio wave toward the right side portion 124 to communicate with the RF tag 301 and receives a response radio wave transmitted by the RF tag 301. The side antenna 161 is, for example, a planar antenna or a sheet antenna. For example, the side antenna 161 radiates a circularly polarized radio wave or radiates a radio wave while switching between a horizontally polarized wave and a vertically polarized wave when a linearly polarized wave is used. The upper end of the back portion 123B and the upper end of the right side portion 124 are higher than the top of the side antenna 161. Here, the top of the side antenna 161 is the highest position of a portion radiating a radio wave in the side antenna 161.

To prevent the radio wave radiated by the side antenna 161 from leaking through the bottom portion 120 to the outside of the housing 102, the bottom portion 120 preferably includes a radio wave shielding layer 140. In this embodiment, the front portion 121, the back portion 123B, and the right side portion 124 do not have an antenna for radiating a radio wave to communicate with the RF tag 301.

The side housing limiting plate 152 is, for example, a rectangular flat plate. The side housing limiting plate 152 is located between the lower part 1221 and the right side portion 124 at a predetermined distance from the lower part 1221 in the left side portion 122A so as to stand vertically from the upper surface of the placement plate 150. An upper end of the side housing limiting plate 152 is fixed to, for example, a lower end of the upper part 1223 in the left side portion 122A. The upper part 1223 stands vertically from the upper end of the side housing limiting plate 152. The height of the side housing limiting plate 152 is equal to the distance between the upper end of the placement plate 150 and the lower surface of the middle part 1222 of the left side portion 122A. One end and the other end of the side housing limiting plate 152 are fixed to, for example, the front portion 121 and the back portion 123B, respectively. The width of the side housing limiting plate 152 is equal to the distance between the front portion 121 and the back portion 123B. The side housing limiting plate 152 allows radio waves to pass through.

The side housing limiting plate 152 divides the inside of the housing 102 into a space between the lower part 1221 (that is, the left side portion 122A) and the side housing limiting plate 152 and a space between the side housing limiting plate 152 and the right side portion 124. Here, the article 300 and the shopping basket 400 are not accommodated in a space between the lower part 1221 and the side housing limiting plate 152. This space is a second attenuation space in which the radio waves radiated by the bottom antenna 160 and the side antenna 161 propagate while spreading. The space between the side housing limiting plate 152 and the right side portion 124 is the housing space. The side antenna 161 is located on the inner surface of the lower part 1221 in the left side portion 122A at a position at which a radio wave with high intensity is radiated toward the housing space and a radio wave with lower intensity than the intensity of the radio wave radiated toward the housing space is radiated toward the first attenuation space between the front portion 121 and the front housing limiting plate 151. The bottom antenna 160 is located on the upper surface of the bottom portion 120 at a position at which a radio wave with high intensity is radiated toward the housing space and a radio wave with lower intensity than that of the radio wave radiated toward the housing space is radiated toward the second attenuation space. The side housing limiting plate 152 is an example of a second housing limiting portion of the present disclosure.

The radio wave radiated by the bottom antenna 160 propagates while being attenuated in the second attenuation space between the lower part 1221 and the side housing limiting plate 152. However, this radio wave is reflected or absorbed by the lower surface of the middle part 1222 and the inner surface of the lower part 1221 in the left side portion 122A. In the reading apparatus 4, the radio wave radiated by the bottom antenna 160 and reflected or absorbed by the lower part 1221 and the middle part 1222 does not leak to the outside of the housing 102.

The controller 200A of the reading apparatus 4 according to the fifth embodiment is different from the controller 200 of the reading apparatus 1 according to the first embodiment in that the controller 200A controls the side antenna 161. In other respects, the operation of the controller 200A is the same as that of the controller 200. The controller 200A includes a transmission/reception part 211A, an acquisition part 212A, and an interface (I/F) 213A. The transmission/reception part 211A controls the side antenna 161 in addition to the bottom antenna 160. The transmission/reception part 211A causes each of the bottom antenna 160 and the side antenna 161 to radiate a circularly polarized radio wave, or to radiate a radio wave while switching between a horizontally polarized wave and a vertically polarized wave when a linearly polarized wave is used. When the bottom antenna 160 and the side antenna 161 receive a response radio wave, the transmission/reception part 211A obtains information including the tag ID from the response radio wave. The transmission/reception part 211A may cause the bottom antenna 160 and the side antenna 161 to radiate radio waves at different timings, or may cause the bottom antenna 160 and the side antenna 161 to radiate radio waves at the same time when mutual interferences of radio waves radiated by the bottom antenna 160 and the side antenna 161 can be ignored.

The RF tag 301 obtains the power needed to operate by receiving a radio wave transmitted by at least one of the bottom antenna 160 and the side antenna 161. When the intensity of the radio wave received by the RF tag 301 is lower than the predetermined intensity, the RF tag 301 does not operate and does not transmit the response radio wave. Similarly to the reading apparatus 1 according to the first embodiment, also in the reading apparatus 4, the radio wave radiated by the bottom antenna 160 is attenuated while propagating through the first attenuation space between the front portion 121 and the front housing limiting plate 151. Also in the reading apparatus 4, the transmission/reception part 211A causes the bottom antenna 160 to radiate a radio wave with the intensity at which the RF tag 301 outside the housing 102 does not operate due to a radio wave that leaks from the upper end of the front portion 121 to the outside of the housing 102.

Also in the reading apparatus 4, the upper end of the upper part 1223 (that is, the upper end of the left side portion 122A), the upper end of the back portion 123, and the upper end of the right side portion 124 are higher than the upper end of the front portion 121. The radio wave radiated by the bottom antenna 160 is attenuated when it reaches the upper end of the upper part 1223, the upper end of the back portion 123B, and the upper end of the right side portion 124. The transmission/reception part 211A causes the bottom antenna 160 to radiate a radio wave with the intensity at which the RF tag 301 outside the housing 102 does not operate due to a radio wave that is diffracted at the upper ends of these portions and leaks to the outside of the housing 102.

Figure 18:
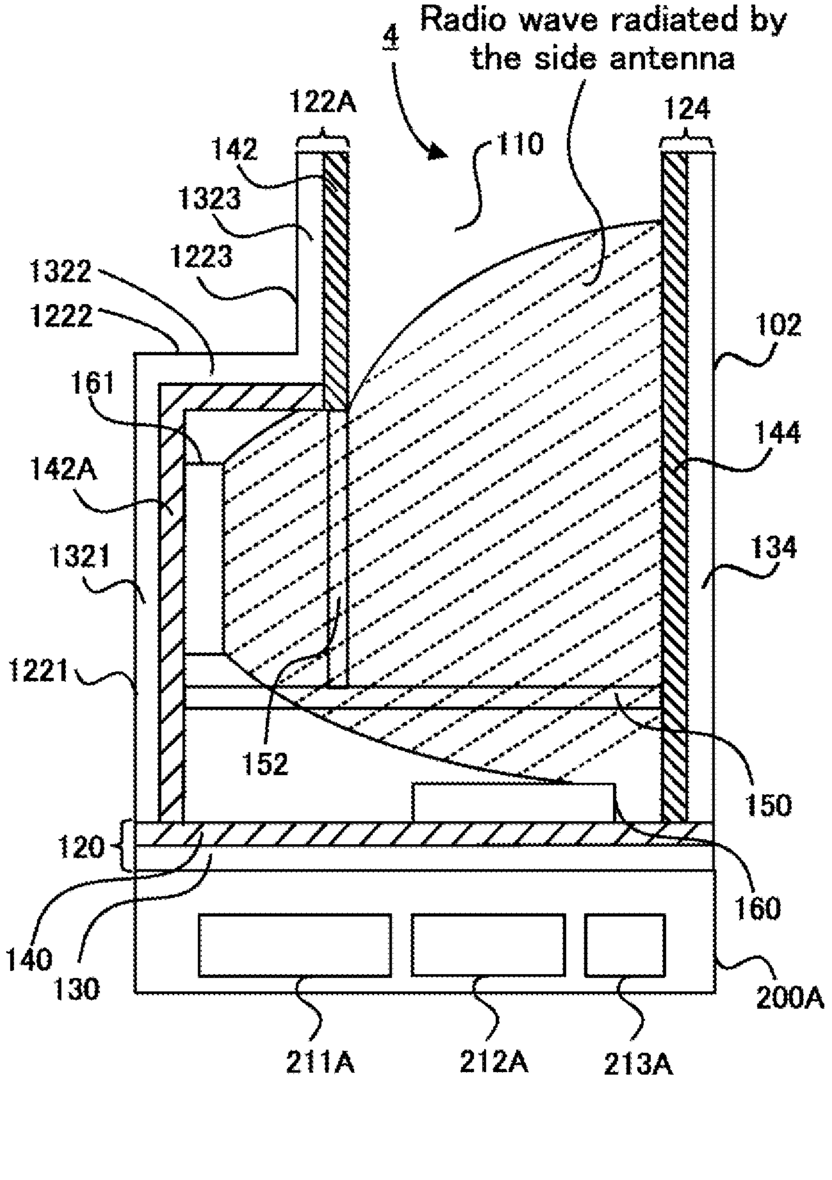
FIG. 18 is a diagram showing an example of a radio wave radiated by a side antenna in the reading apparatus shown in FIG. 13.

FIG. 18 shows an example of a radio wave radiated by the side antenna 161 in the reading apparatus 4 shown in FIG. 13. The RF tag 301 that receives the radio wave in the range indicated by the diagonally right-up dashed line operates and transmits a response radio wave. The radio wave radiated by the side antenna 161 may leak from the opening 110 to the outside of the housing 102 over the upper end of the back portion 123B and the upper end of the right side portion 124 (that is, the periphery of the opening 110). However, the upper end of the back portion 123B and the upper end of the right side portion 124 are higher than the top of the side antenna 161. The radio wave radiated by the side antenna 161 is attenuated when it reaches the upper end of the back portion 123B and the upper end of the right side portion 124. The transmission/reception part 211A causes the side antenna 161 to radiate a radio wave with the intensity at which the RF tag 301 outside the housing 102 does not operate due to the radio wave that leaks over the upper ends of these portions from the opening 110 to the outside of the housing 102.

The radio wave radiated by the side antenna 161 is diffracted upward at the right end of the middle part 1222 of the left side portion 122A, further diffracted at the upper end of the upper part 1223, and propagates in the left direction of the housing 102. However, the intensity of the radio wave propagating in the left direction of the housing 102 is lower than the intensity of the radio wave radiated by the side antenna 161. In the reading apparatus 4, the intensity of the radio wave radiated by the side antenna 161 and propagating in the left direction of the housing 102 is at a level at which the RF tag 301 outside the housing 102 does not operate.

Figure 19:
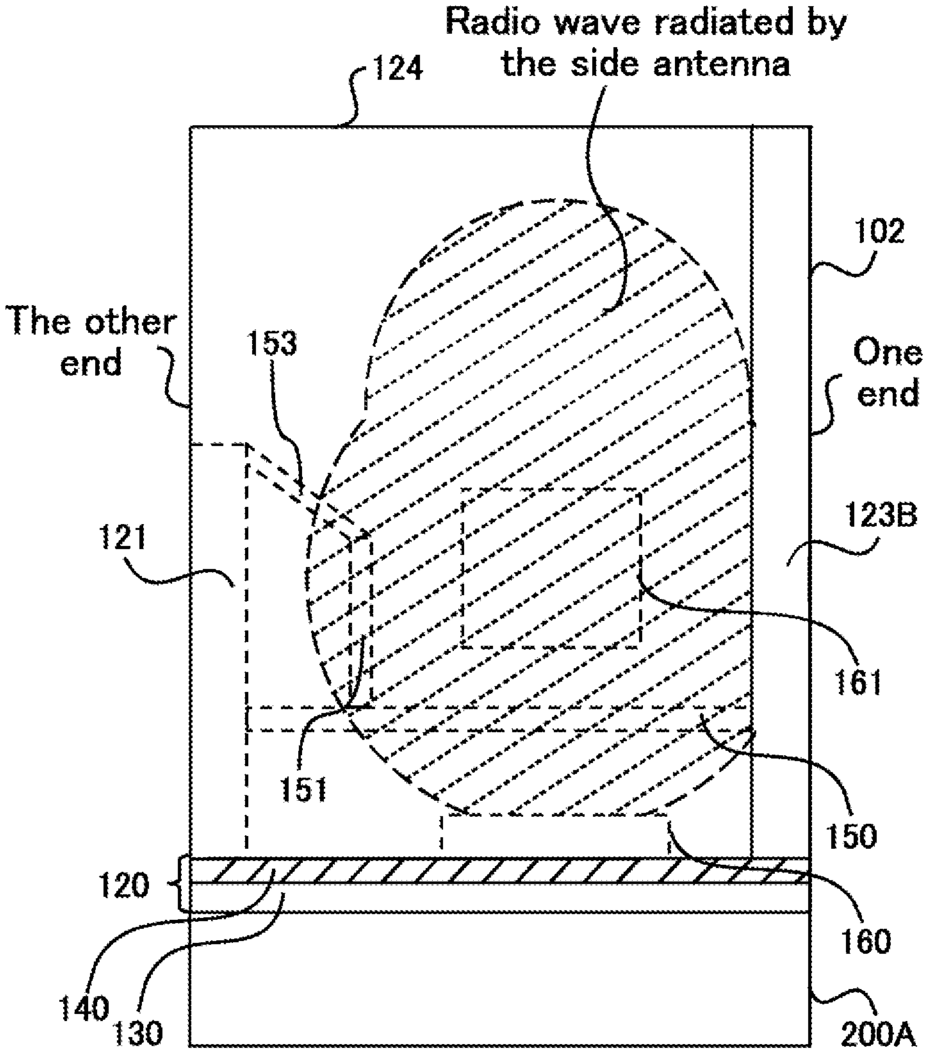
FIG. 19 is a diagram showing an example of a radio wave radiated by the side antenna attached to a left side portion and reaching a right side portion in the reading apparatus shown in FIG. 13.

FIG. 19 shows an example of a radio wave radiated by the side antenna 161 attached to the left side portion 122A and reaching the right side portion 124 in the reading apparatus 4 shown in FIG. 13. The RF tag 301 that receives the radio wave in the range indicated by the diagonally right-up dashed line operates and transmits a response radio wave. The radio wave radiated by the side antenna 161 propagates through the first attenuation space between the front portion 121 and the front housing limiting plate 151. This attenuated radio wave is diffracted at the upper end of the front portion 121 (that is, the periphery of the opening 110) and leaks over the upper end of the front portion 121 to the outside of the housing 102. This radio wave also leaks from the other end of the right side portion 124 (that is, the opening 110) to the outside of the housing 102. However, the radio wave radiated by the side antenna 161 is attenuated while propagating through the first attenuation space between the front portion 121 and the front housing limiting plate 151. The transmission/reception part 211A causes the side antenna 161 to radiate a radio wave with the intensity at which the RF tag 301 outside the housing 102 does not operate due to the radio wave that leaks from the upper end of the front portion 121 and the other end of the right side portion 124 to the outside of the housing 102.

If the RF tag 301 does not operate, it does not transmit the response radio wave. Thus the reading apparatus 4 does not obtain information of the RF tag 301 outside the housing 102. Therefore, when the side antenna 161 receives the response radio wave from the RF tag 301, the reading apparatus 4 can obtain only information read from the RF tag 301 inside the housing 102.

The acquisition part 212A identifies each of the RF tags 301 based on the tag IDs included in information of the RF tags 301 obtained from the response radio waves received by the bottom antenna 160 and the side antenna 161, and acquires information of each of the RF tags 301. The I/F 213A transmits information of each RF tag 301 acquired by the acquisition part 212A to an external apparatus (for example, a checkout apparatus or the like), and receives an instruction of an operation to the reading apparatus 4 from the external apparatus.

If the right side portion 124 includes a radio wave reflecting layer, a strong radio wave radiated by the side antenna 161 toward the housing space may be reflected by the right side portion 124, and the reflected radio wave may leak to the outside of the housing 102 over the upper end of the front portion 121. Since the intensity of the reflected radio wave may be high, the right side portion 124 must include the radio wave absorbing layer 144.

Sixth Embodiment

Figure 20:
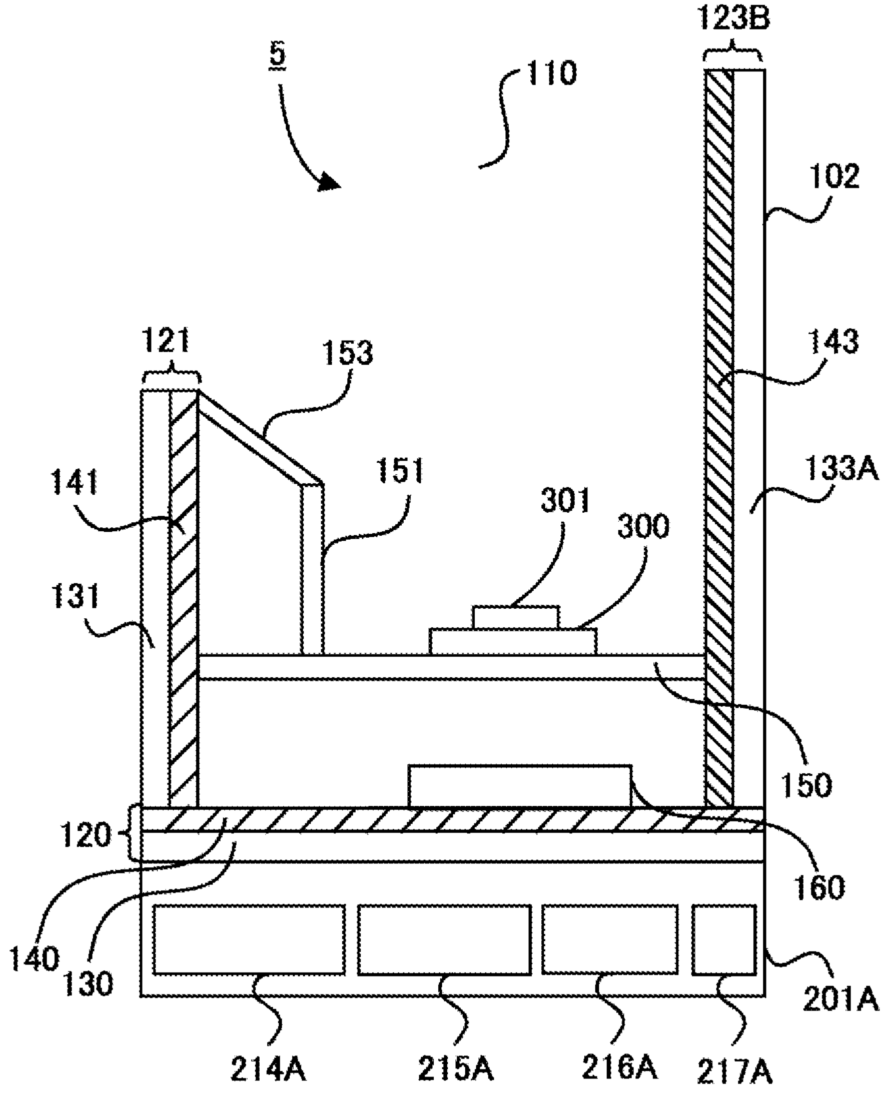
FIG. 20 is a longitudinal sectional view of an example of a reading apparatus for reading information from an RF tag according to the sixth embodiment.

FIG. 20 is a longitudinal sectional view of an example of a reading apparatus 5 for reading information from an RF tag 301 according to the sixth embodiment. FIG. 20 corresponds to the sectional view taken along line XIV-XIV in FIG. 13. The reading apparatus 5 includes the housing 102 and a controller 201A. The configuration of the housing 102 in the reading apparatus 5 according to the sixth embodiment is the same as that of the housing 102 in the reading apparatus 4 according to the fifth embodiment. The each radio wave output of the bottom antenna 160 and the side antenna 161 in the reading apparatus 5 according to the sixth embodiment is larger than that of the reading apparatus 4 according to the fifth embodiment, respectively. In the reading apparatus 5 according to the sixth embodiment, the RF tag 301 outside the housing 102 may operate due to the radio waves leaking from the opening 110 to the outside of the housing 102.

The controller 201A of the reading apparatus 5 according to the sixth embodiment is different from the controller 201 of the reading apparatus 3 according to the second embodiment in that the controller 201A controls the side antenna 161. As for the control of the bottom antenna 160, the operation of the controller 201A is the same as that of the controller 201.

The controller 201A includes a transmission/reception part 214A, a determination part 215A, an acquisition part 216A, and an interface (I/F) 217A. The transmission/reception part 214A controls the side antenna 161 in addition to the bottom antenna 160. The transmission/reception part 214A causes each of the bottom antenna 160 and the side antenna 161 to radiate a circularly polarized radio wave, or to radiate a radio wave while switching between a horizontally polarized wave and a vertically polarized wave when a linearly polarized wave is used. When the bottom antenna 160 and the side antenna 161 receive a response radio wave, the transmission/reception part 214A obtains information including the tag ID from the response radio wave. The transmission/reception part 214A may cause the bottom antenna 160 and the side antenna 161 to radiate radio waves at different timings, or may cause the bottom antenna 160 and the side antenna 161 to radiate radio waves at the same time when mutual interferences of radio waves radiated by the bottom antenna 160 and the side antenna 161 can be ignored.

Similarly to the reading apparatus 3 according to the second embodiment, also in the reading apparatus 5, the radio wave radiated by the bottom antenna 160 is attenuated while propagating through the first attenuation space between the front portion 121 and the front housing limiting plate 151. Also in the reading apparatus 5, even if the RF tag 301 is operated by a radio wave that leaks to the outside of the housing 102 from the opening 110 over the upper end of the front portion 121, the determination part 215A can determine that the RF tag 301 is outside the housing 102. Also in the reading apparatus 5, the upper end of the left side portion 122A, the upper end of the back portion 123B, and the upper end of the right side portion 124 are higher than the upper end of the front portion 121. The radio wave radiated by the bottom antenna 160 is attenuated when it reaches the upper end of the left side portion 122A, the upper end of the back portion 123B, and the upper end of the right side portion 124. Also in the reading apparatus 5, even if the RF tag 301 is operated by a radio wave that leaks to the outside of the housing 102 from the opening 110 over the upper ends of these portions, the determination part 215A can determine that the RF tag 301 is outside the housing 102.

The configuration of the housing 102 in the reading apparatus 5 is the same as that of the housing 102 in the reading apparatus 4. Therefore, the operation of the controller 201A in the reading apparatus 5 will be described below with reference to FIGS. 18 and 19. However, unlike the description regarding FIGS. 18 and 19 described above, the determination part 215A determines that the RF tag 301 is inside the housing 102 based on the RSSI or the intensity of the response radio wave obtained from the response radio wave transmitted by the RF tag 301 that has received the radio wave in the range indicated by the diagonally right-up dashed line in FIGS. 18 and 19. When the side antenna 161 receives the response radio wave transmitted by the RF tag 301 that receives the radio wave in the range indicated by the diagonally right-up dashed line in FIGS. 18, the determination part 215 determines that the RF tag 301 is inside the housing 100 based on the RSSI obtained from the response radio wave or the intensity of the response radio wave.

The radio wave radiated by the side antenna 161 may leak from the opening 110 to the outside of the housing 102 over the upper end of the back portion 123B and the upper end of the right side portion 124 (that is, the periphery of the opening 110). However, the upper end of the back portion 123B and the upper end of the right side portion 124 are higher than the top of the side antenna 161. The radio wave radiated by the side antenna 161 is attenuated when it reaches the upper end of the back portion 123B and the upper end of the right side portion 124. In the reading apparatus 5, even if the RF tag 301 is operated by the radio wave which is diffracted at the upper end of the back portion 123B and the upper end of the right side portion 124 and leaks from the opening 110 to the outside of the housing 102, the determination part 215A can determine that the RF tag 301 is outside the housing 102 based on the RSSI or the intensity of the response radio wave obtained from the response radio wave transmitted by the RF tag 301.

The radio wave radiated by the side antenna 161 is diffracted upward at the right end of the middle part 1222 in the left side portion 122A, further diffracted at the upper end of the upper part 1223, and propagated in the left direction of the housing 102. However, the intensity of the radio wave propagating in the left direction of the housing 102 is lower than the intensity of the radio wave radiated by the side antenna 161. In the reading apparatus 5, even if the RF tag 301 is operated by the radio wave which is radiated by the side antenna 161 and propagates in the left direction of the housing 102, the determination part 215A can determine that the RF tag 301 is outside the housing 102 based on the RSSI or the intensity of the response radio wave obtained from the response radio wave transmitted by the RF tag 301.

When the side antenna 161 receives the response radio wave transmitted by the RF tag 301 that receives the radio wave in the range indicated by the diagonally right-up dashed line in FIGS. 19, the determination part 215A determines that the RF tag 301 is inside the housing 102 based on the RSSI obtained from the response radio wave or the intensity of the response radio wave. The radio wave radiated by the side antenna 161 propagates through the first attenuation space between the front portion 121 and the front housing limiting plate 151. This attenuated radio wave is diffracted at the upper end of the front portion 121 (that is, the periphery of the opening 110) and leaks over the upper end of the front portion 121 to the outside of the housing 102. This attenuated radio wave also leaks from the other end of the right side portion 124 (that is, the opening 110) to the outside of the housing 102. However, the radio wave radiated by the side antenna 161 is attenuated while propagating through the first attenuation space between the front portion 121 and the front housing limiting plate 151. Thus the intensity of the radio wave leaking to the outside of the housing 102 is low. In the reading apparatus 5, even if the RF tag 301 is operated by the radio wave which leaks from the upper end of the front portion 121 and the other end of the right side portion 124 to the outside of the housing 102, the determination part 215A can determine that the RF tag 301 is outside the housing 102 based on the RSSI or the intensity of the response radio wave obtained from the response radio wave transmitted by the RF tag 301.

The acquisition part 216A identifies each of the RF tags 301 based on the tag IDs included in information of the RF tags 301 obtained from the response radio waves received by the bottom antenna 160 and the side antenna 161, and acquires information of each of the RF tags 301. For example, when the determination part 215A determines that the RF tag 301 is inside the housing 102, the acquisition part 216A acquires information read from the RF tag 301. As a result, the reading apparatus 5 can acquire information of the RF tag 301 inside the housing space. The I/F 217A transmits information of each RF tag 301 acquired by the acquisition part 216A to an external apparatus (for example, a checkout apparatus or the like), and receives an instruction of an operation to the reading apparatus 5 from the external apparatus.

The acquisition part 216A may also acquire information about the RF tag 301 outside the housing 102, and the I/F 217A may transmit information of the RF tag 301 to the external apparatus along with information indicating whether the RF tag 301 is inside the housing 102 or the RF tag 301 is outside the housing 102.

Seventh Embodiment

Figure 21:
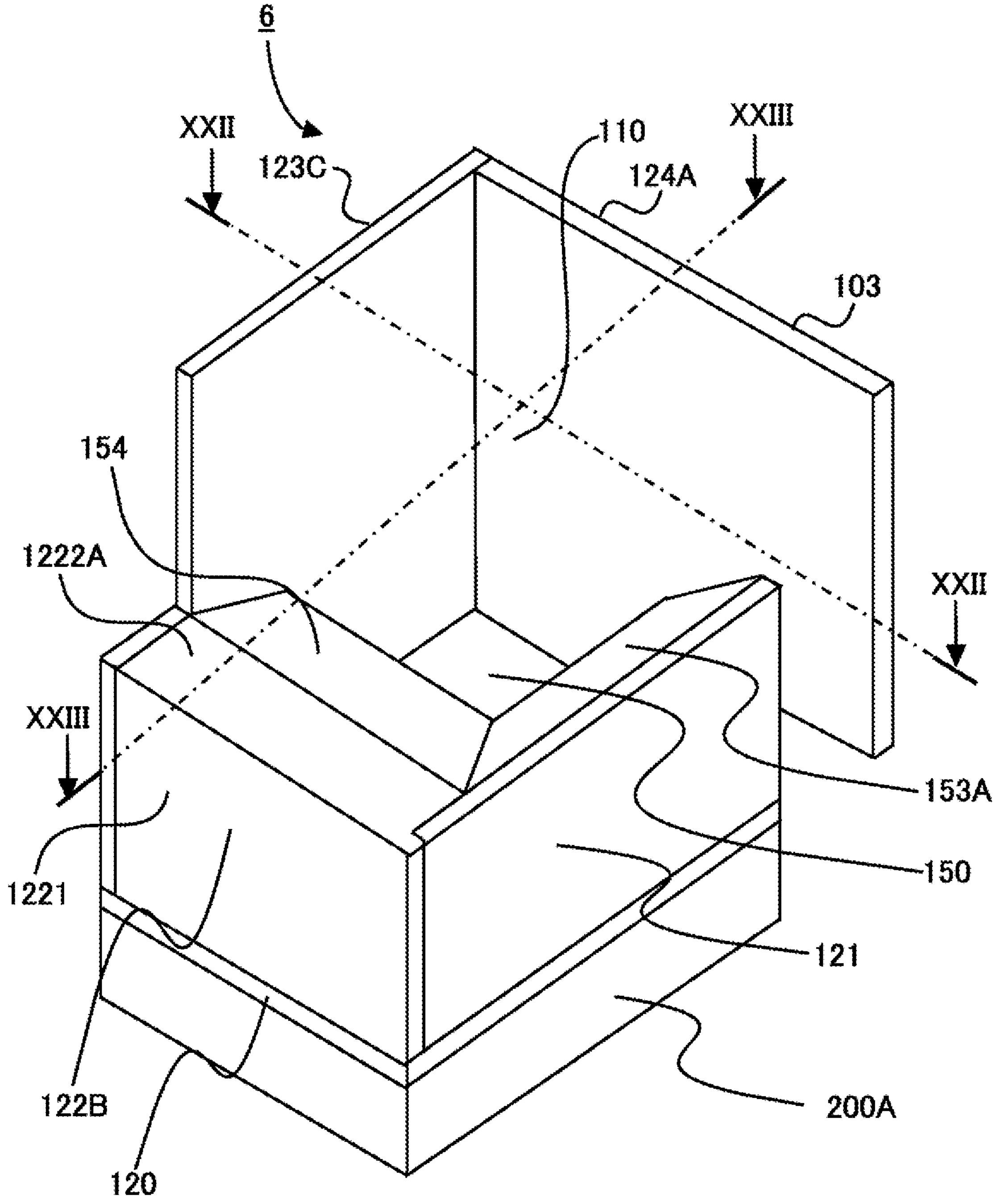
FIG. 21 is a perspective view of an example of a reading apparatus for reading information from an RF tag according to the seventh embodiment.
Figure 22:
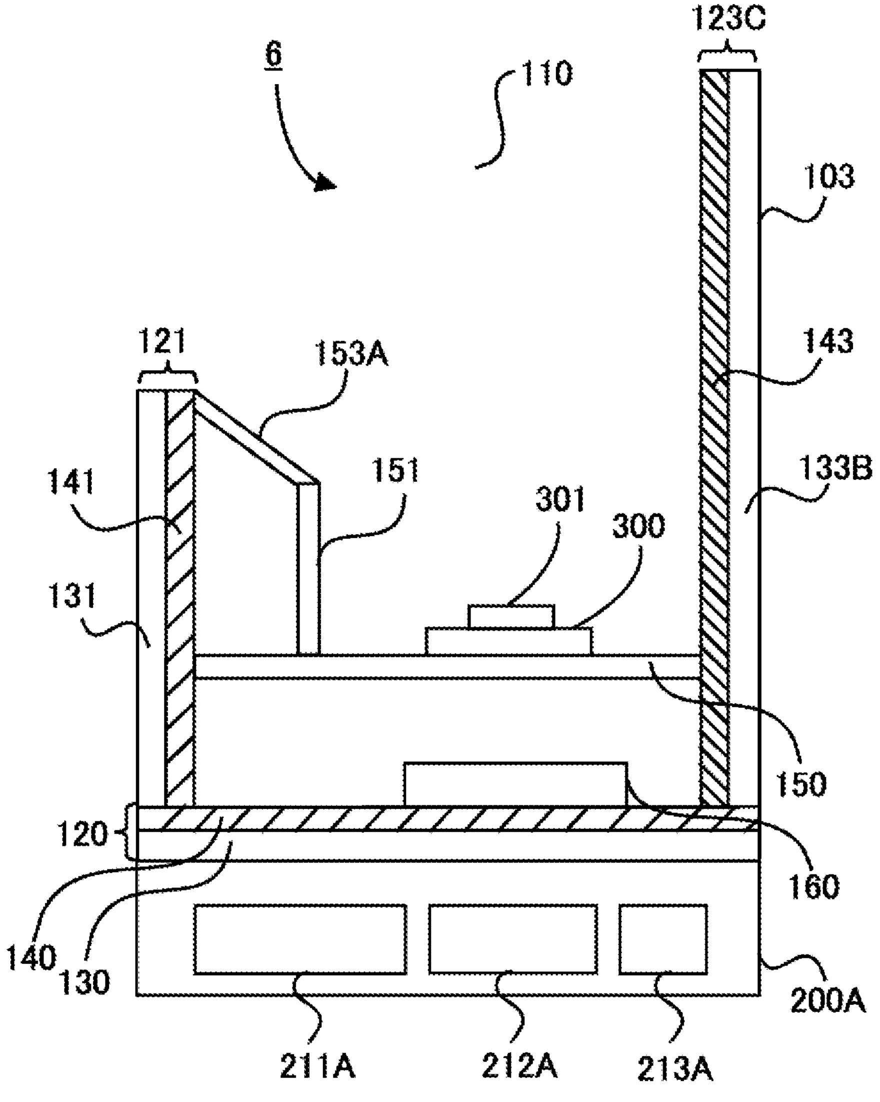
FIG. 22 is a sectional view taken along line XXII-XXII in FIG. 21.
Figure 23:
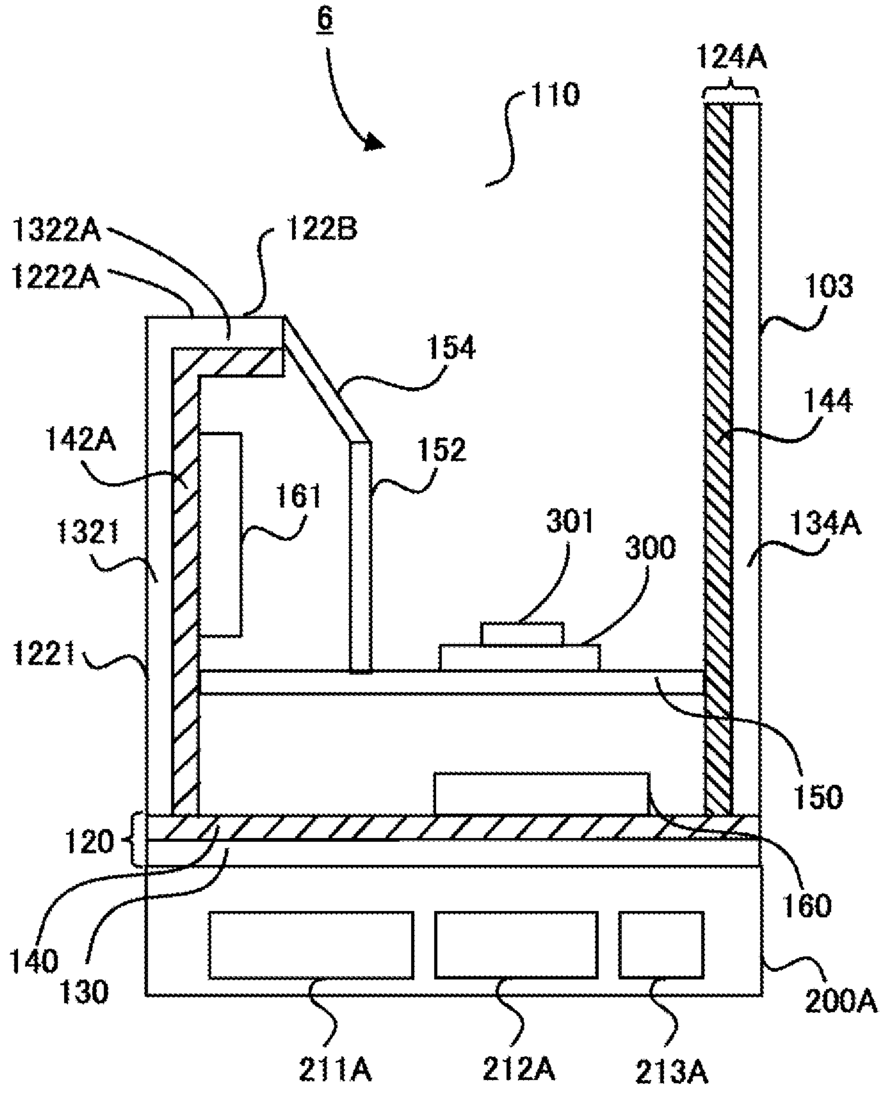
FIG. 23 is a sectional view taken along line XXIII-XXIII in FIG. 21.
Figure 24:
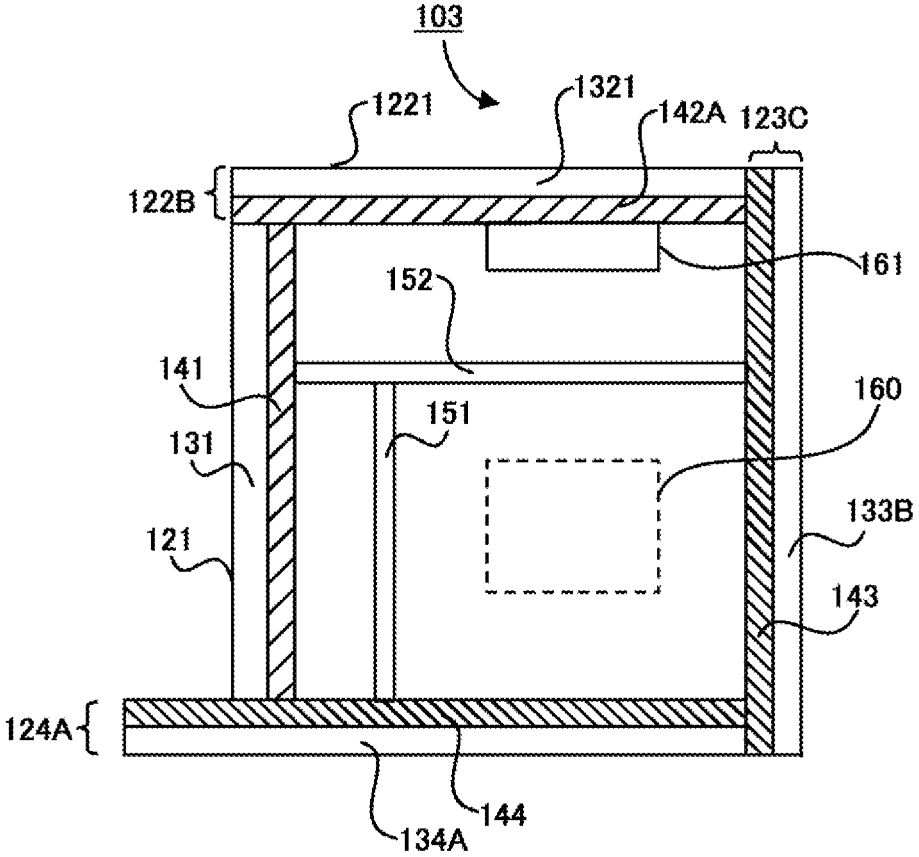
FIG. 24 is a plan view of an example of a housing in the reading apparatus shown in FIG. 21.

FIG. 21 is a perspective view of an example of a reading apparatus 6 for reading information from an RF tag 301 according to the seventh embodiment. FIG. 22 is a sectional view taken along line XXII-XXII in FIG. 21. FIG. 23 is a sectional view taken along line XXIII-XXIII in FIG. 21. FIG. 24 is a plan view of an example of a housing 103 in the reading apparatus 6 shown in FIG. 21. The reading apparatus 6 includes a housing 103 and the controller 200A. The configuration of the controller 200A in the reading apparatus 6 according to the seventh embodiment is the same as that of the controller 200A in the reading apparatus 4 according to the fifth embodiment. The transmission/reception part 211A of the controller 200A causes the bottom antenna 160 and the side antenna 161 to radiate radio waves with the intensity at which the RF tag 301 outside the housing 103 does not operate.

The housing 103 includes the bottom portion 120, the front portion 121, a left side portion 122B, a back portion 123C, a right side portion 124A, the placement plate 150, the front housing limiting plate 151, the side housing limiting plate 152, the front guide portion 153A, the side guide portion 154, the bottom antenna 160, and the side antenna 161. In the housing 103 according to the seventh embodiment, the configurations of the left side portion 122B and the right side portion 124A are different from the configurations of the left side portion 122A and the right side portion 124 in the housing 102 according to the fifth embodiment. Accordingly, the configuration of the back portion 123C is different from the configuration of the back portion 123B in the housing 102, and the side guide portion 154 is added to the housing 103. In other respects, the configuration of the housing 103 according to the seventh embodiment is the same as that of the housing 102 according to the fifth embodiment. The differences between the housing 103 and the housing 102 are described below.

One end and the other end of the left side portion 122B are fixed to one end of the front portion 121 and one end of the back portion 123C, respectively. The left side portion 122B includes the lower part 1221 and a middle part 1222A. The left side portion 122B is different from the left side portion 122A in the housing 102 in that the upper part 1223 is not provided and the middle part 1222A is narrower than the middle part 1222 in the housing 102. The lower part 1221 stands vertically to the bottom portion 120 from the left edge of the bottom portion 120. The middle part 1222A extends from the upper end of the lower part 1221 toward the right side portion 124A in parallel with the bottom portion 120. A side antenna 161 is located on the inner surface of the lower part 1221 in the left side portion 122B. The lower part 1221 and the middle part 1222A include the rectangular flat plate 1321 and a rectangular flat plate 1322A, respectively. The radio wave shielding layer 142A covers, for example, the inner surface of the flat plate 1321 and the lower surface of the flat plate 1322A. The lower part 1221 and the middle part 1222A may not necessarily include the radio wave shielding layer 142A, but the lower part 1221 and the middle part 1222A preferably include the radio wave shielding layer 142A, for example, in order to suppress radio waves that enter the inside of the housing 103 from the outside.

As shown in FIG. 23, there is a predetermined gap between the right end of the middle part 1222A and the side housing limiting plate 152. The side guide portion 154 covers the gap. The lower end of the side guide portion 154 is fixed to the upper end of the side housing limiting plate 152. And the side guide portion 154 inclines obliquely upward, and the upper end thereof is fixed to the right end of the middle part 1222A (that is, the left side portion 122B) at a higher position than the top of the side antenna 161. The side guide portion 154 allows radio waves to pass through.

The back portion 123C is opposed to the front portion 121. One end and the other end of the back portion 123C are fixed to the other end of the left side portion 122B and one end of the right side portion 124A, respectively. Similar to the back portion 123B shown in FIG. 17, the back portion 123C is L-shaped and is composed of a high portion near the other end and a low portion near one end. The length of the low portion near one end is the same as the width of the middle part 1222A. That is, the low portion near the one end in the back portion 123C is shorter than the low portion near the one end in the back portion 123B. The back portion 123C includes an L-shaped flat plate 133B and the L-shaped radio wave absorbing layer 143. The radio wave absorbing layer 143 covers, for example, the inner surface of the L-shaped flat plate 133B.

Figure 25:
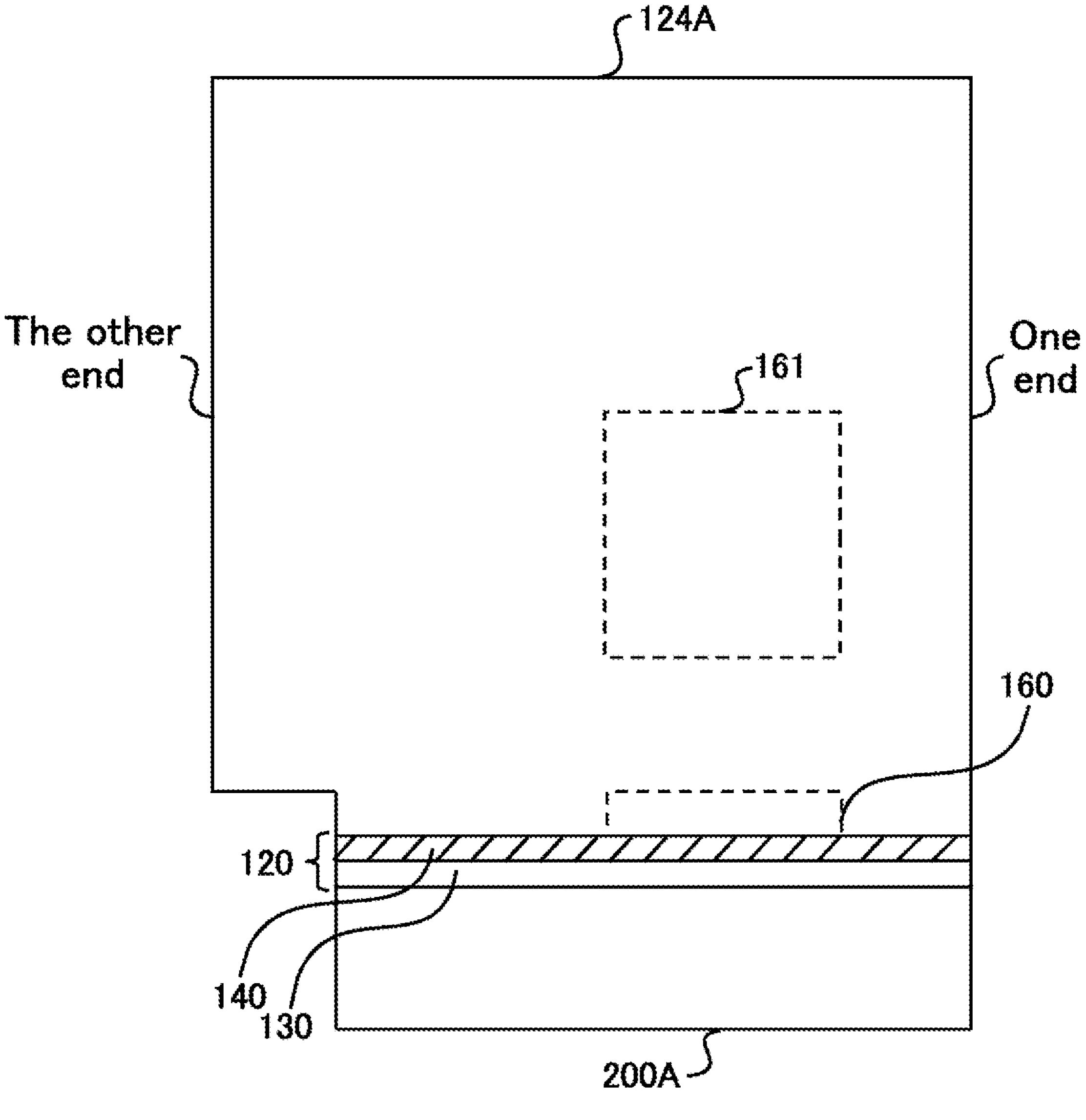
FIG. 25 is a right-side view of the reading apparatus shown in FIG. 21.

The right side portion 124A is opposed to the left side portion 122B. FIG. 25 shows an example of the shape of the right side portion 124A when the reading apparatus 6 is viewed from the right side. One end of the right side portion 124A is fixed to the other end of the back portion 123C. The other end of the right side portion 124A protrudes further to the front side from the front portion 121 by a predetermined distance. And the other end of the front portion 121 is fixed between one end and the other end of the right side portion 124A. The right side portion 124A includes a portion standing vertically to the bottom portion 120 from the right edge of the bottom portion 120, and a portion protruding from the front portion 121 toward the front side by a predetermined distance. The right side portion 124A includes a flat plate 134A and the radio wave absorbing layer 144. The radio wave absorbing layer 144 covers, for example, the inner surface of the flat plate 134A. The upper end of the right side portion 124A has a constant height from one end to the other end. The height of the upper end of the right side portion 124A is the same as the height of the upper end near the other end in the back portion 123C. Therefore, the upper end of the right side portion 124A is higher than the upper end of the front portion 121.

Figure 26:
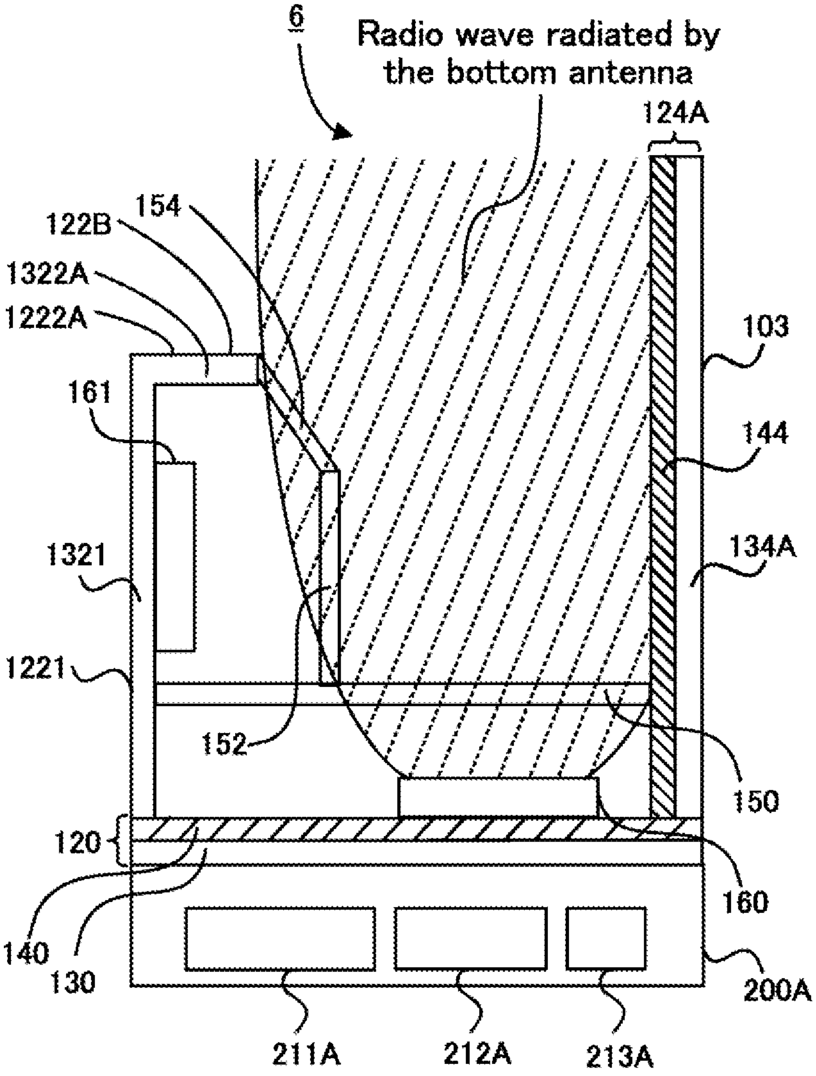
FIG. 26 is a diagram showing an example of a radio wave radiated by a bottom antenna in the reading apparatus shown in FIG. 21.

The difference in the configuration of the housing 103 and the configuration of the housing 102 causes a difference in the operation of the reading apparatus 6 according to the seventh embodiment and the operation of the reading apparatus 4 according to the fifth embodiment. The differences between the operation of the reading apparatus 6 and the operation of the reading apparatus 4 are described below. FIG. 26 shows an example of a radio wave radiated by the bottom antenna 160 in the reading apparatus 6 shown in FIG. 21. In an example shown in FIG. 26, the lower part 1221 and the middle part 1222A do not include the radio wave shielding layer 142A but are respectively configured only by the flat plate 1321 and the flat plate 1322A.

The radio wave radiated upward by the bottom antenna 160 propagates while spreading through the second attenuation space between the left side portion 122B and the side housing limiting plate 152. A space between the right end of the middle part 1222A and the side housing limiting plate 152 is included in the second attenuation space. The radio wave radiated upward by the bottom antenna 160 is attenuated while propagating through the space between the right end of the middle part 1222A and the side housing limiting plate 152. In the reading apparatus 6, for example, the transmission/reception part 211A causes the bottom antenna 160 to radiate a radio wave with the intensity at which the RF tag 301 outside the housing 103 does not operate due to the radio wave that reaches the right end of the middle part 1222A. On the other hand, when the lower part 1221 and the middle part 1222A include the radio wave shielding layer 142A unlike the example of FIG. 26, the transmission/reception part 211A causes the bottom antenna 160 to radiate a radio wave with the intensity at which the RF tag 301 outside the housing 103 does not operate due to the radio wave that is diffracted at the right end of the middle part 1222A and leaks to the left side of the housing 103.

The upper end of the back portion 123C and the upper end of the right side portion 124A are higher than the upper end of the front portion 121. The radio wave radiated by the bottom antenna 160 is attenuated when it reaches the upper end of the back portion 123 C and the upper end of the right side portion 124A. The transmission/reception part 211A causes the bottom antenna 160 to radiate a radio wave with the intensity at which the RF tag 301 outside the housing 103 does not operate due to the radio wave that is diffracted at the upper ends of these portions and leaks from the opening 110 to the outside of the housing 103.

In the reading apparatus 6, the radio wave radiated by the bottom antenna 160 is attenuated while propagating through the first attenuation space between the front portion 121 and the front housing limiting plate 151. The radio wave radiated by the bottom antenna 160 is attenuated while propagating through the space between the right end of the middle part 1222A and the side housing limiting plate 152. And the radio wave radiated by the bottom antenna 160 is attenuated when it reaches the upper end of the back portion 123C and the upper end of the right side portion 124A because the upper ends of these portions are higher than the upper end of the front portion 121. Therefore, the intensity of the radio wave that is radiated by the bottom antenna 160 and leaks from the opening 110 to the outside of the housing 103 is low. This allows the reading apparatus 6 to acquire information of the RF tag 301 inside the housing space.

In addition, in the reading apparatus 6, the other end of the right side portion 124A protrudes from the front portion 121 toward the front side by a predetermined distance. The radio wave radiated by the side antenna 161 is attenuated when it reaches the other end of the right side portion 124A. The transmission/reception part 211A causes the side antenna 161 to radiate a radio wave with the intensity at which the RF tag 301 outside the housing 103 does not operate due to the radio wave that goes around the other end of the right side portion 124 and leaks to the outside of the housing 103. In the reading apparatus 6, the radio wave radiated by the side antenna 161 is attenuated while propagating through the first attenuation space between the front portion 121 and the front housing limiting plate 151. And the other end of the right side portion 124A protrudes from the front portion 121 toward the front side by a predetermined distance. Further, the radio wave radiated by the side antenna 161 is attenuated when it reaches the upper end of the back portion 123C and the upper end of the right side portion 124A because the upper ends of these portions are higher than the top of the side antenna 161. Therefore, the intensity of the radio wave that is radiated by the side antenna 161 and leaks from the opening 110 to the outside of the housing 103 is low. This allows the reading apparatus 6 to acquire information of the RF tag 301 inside the housing space.

Figure 27:
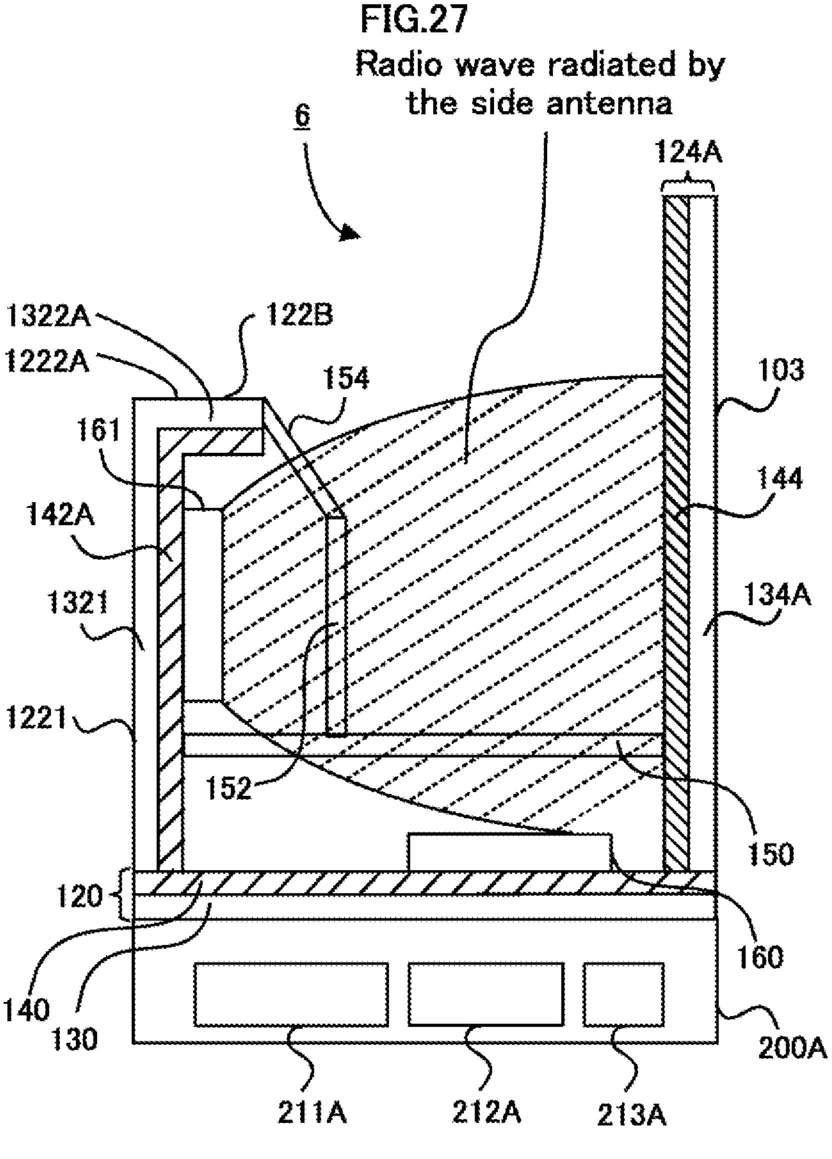
FIG. 27 is a diagram showing an example of a radio wave radiated by the side antenna in the reading apparatus shown in FIG. 21.

The middle part 1222A in the left side portion 122B is narrow. As shown in FIG. 27, if the radio wave radiated by the side antenna 161 reaches the right end of the middle part 1222A before sufficiently spreading, the intensity of the radio wave diffracted at the right end of the middle part 1222A and going around in the left direction of the housing 103 is low. Further, the radio wave radiated upward by the bottom antenna 160 is attenuated while propagating through the space between the right end of the middle part 1222A and the side housing limiting plate 152. Therefore, the left side portion 122B in the housing 103 of the reading apparatus 6 does not have the upper part 1223.

In the present embodiment, an example in which the left side portion 122B includes the lower part 1221 and the middle part 1222A has been described. In this case, the right end of the middle part 1222A is an example of an end part of the first side portion opposite the second housing limiting portion in the present disclosure, and the gap between the right end of the middle part 1222A and the side housing limiting plate 152 is an example of the predetermined gap between the end part of the first side portion and the second housing limiting portion in the present disclosure.

However, the left side portion 122B may have the upper part 1223 in addition to the lower part 1221 and the middle part 1222A. In this case, the inner surface of the upper part 1223 (which is also the right end of the middle part 1222A) is an example of an end part of the first side portion opposite the second housing limiting portion in the present disclosure, and the gap between the inner surface of the upper part 1223 and the side housing limiting plate 152 is an example of the predetermined gap between the end part of the first side portion and the second housing limiting portion in the present disclosure.

Further, the left side portion 122B may not have the middle part 1222A. That is, the left side portion 122B may be formed only by the lower part 1221. In this case, the inner surface of the lower part 1221 is an example of an end part of the first side portion opposite the second housing limiting portion in the present disclosure, and the gap between the inner surface of the lower part 1221 and the side housing limiting plate 152 is an example of the predetermined gap between the end part of the first side portion and the second housing limiting portion in the present disclosure.

Eighth Embodiment

The reading apparatus according to the eighth embodiment is not shown in the figure. It includes the housing 103 and the controller 201A. The configuration of the housing 103 in the reading apparatus according to the eighth embodiment is the same as that of the housing 103 in the reading apparatus 6 according to the seventh embodiment. The configuration of the controller 201A in the reading apparatus according to the eighth embodiment is the same as that of the controller 201A in the reading apparatus 5 according to the sixth embodiment.

In the reading apparatus 6 according to the seventh embodiment, the RF tag 301 outside the housing 103 does not operate due to the radio waves that are radiated by the bottom antenna 160 and the side antenna 161 and leak from the opening 110 to the outside of the housing 103. On the other hand, the radio wave outputs of the bottom antenna 160 and the side antenna 161 in the reading apparatus according to the eighth embodiment are larger than those of the reading apparatus 6 according to the seventh embodiment. In the reading apparatus according to the eighth embodiment, the RF tag 301 outside the housing 103 may operate due to the radio waves that are radiated by the bottom antenna 160 and the side antenna 161 and leak from the opening 110 to the outside of the housing 103. When the response radio wave of the RF tag 301 is received, determination part 215A determines whether the RF tag 301 is inside or outside housing 103 based on the RSSI included in the response radio wave or the intensity of the response radio wave.

In the housing 102 of the reading apparatus 4 according to the fifth embodiment and the reading apparatus 5 according to the sixth embodiment, the other end of the right side portion 124 is fixed to the other end of the front portion 121. However, similarly to the housing 103 of the reading apparatus 6 according to the seventh embodiment and the reading apparatus according to the eighth embodiment, also in the housing 102, the other end of the right side portion 124 may protrude by a predetermined length toward the front side from the front portion 121, and the other end of the front portion 121 may be fixed between the other end and one end of the right side portion 124.

In the housing 103 of the reading apparatus 6 according to the seventh embodiment and the reading apparatus according to the eighth embodiment, the other end of the right side portion 124A protrudes by a predetermined length toward the front side from the front portion 121, and the other end of the front portion 121 is fixed between the other end and one end of the right side portion 124A. However, similarly to the housing 102 of the reading apparatus 4 according to the fifth embodiment and the reading apparatus 5 according to the sixth embodiment, also in the housing 103, the other end of the right side portion 124A may be fixed to the other end of the front portion 121.

Ninth Embodiment

Figure 28:
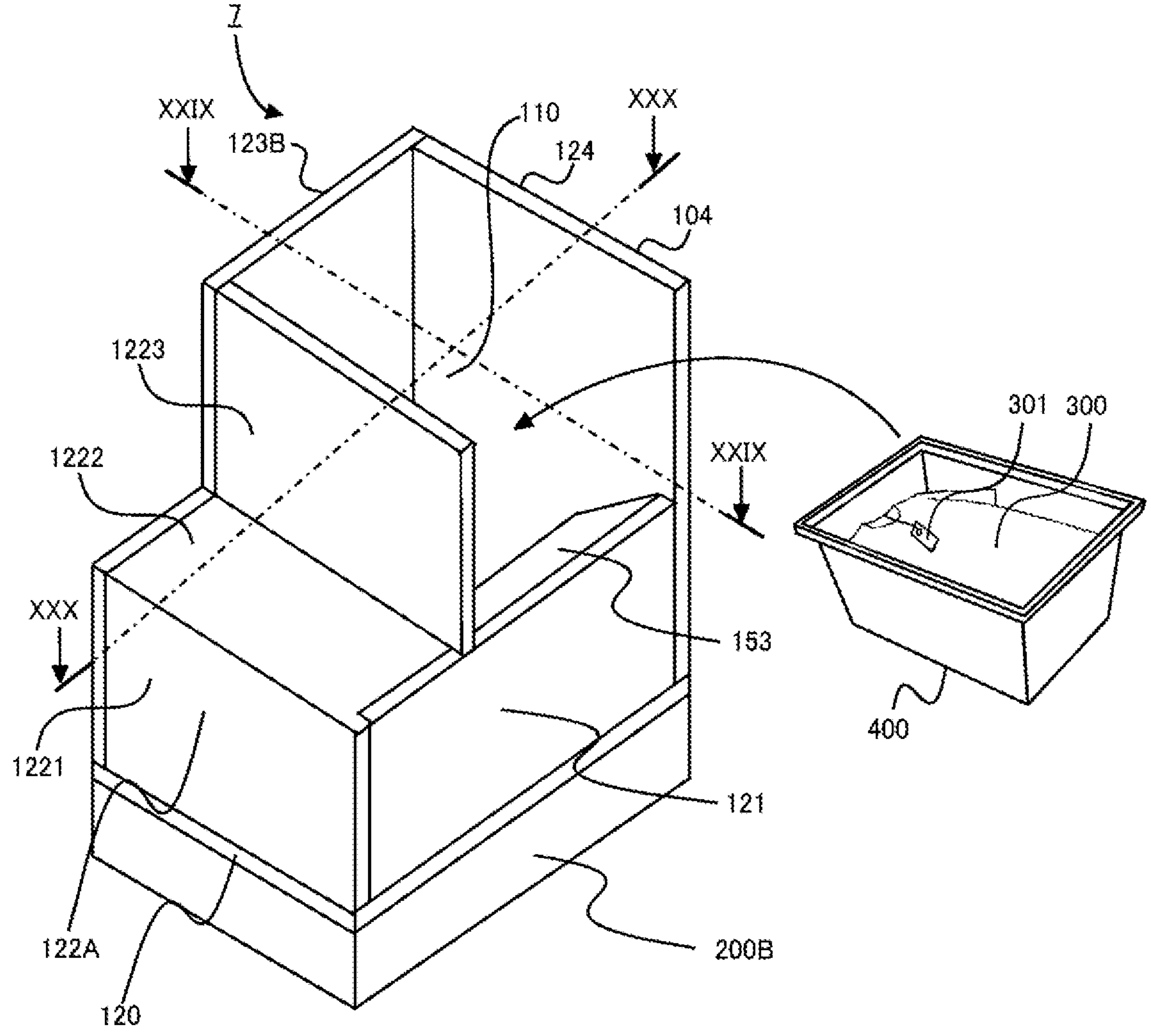
FIG. 28 is a perspective view of an example of a reading apparatus for reading information from an RF tag according to the ninth embodiment.
Figure 29:
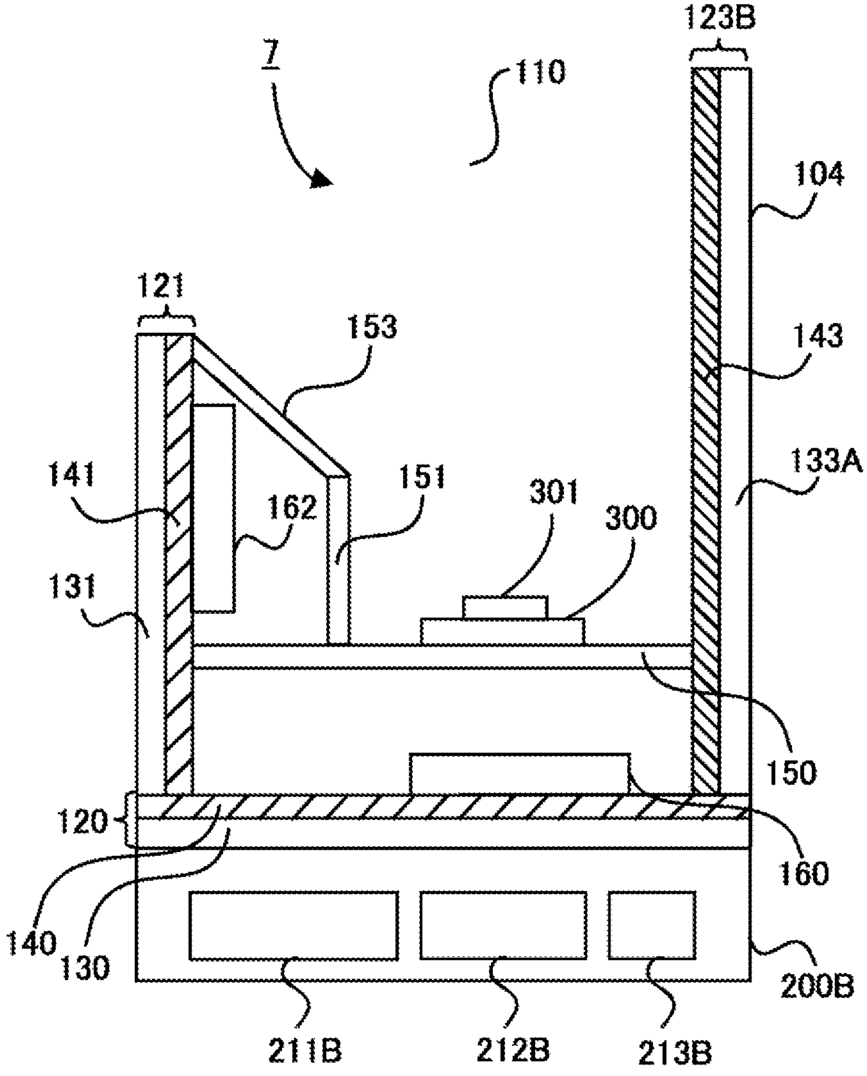
FIG. 29 is a sectional view taken along line XXIX-XXIX in FIG. 28.
Figure 30:
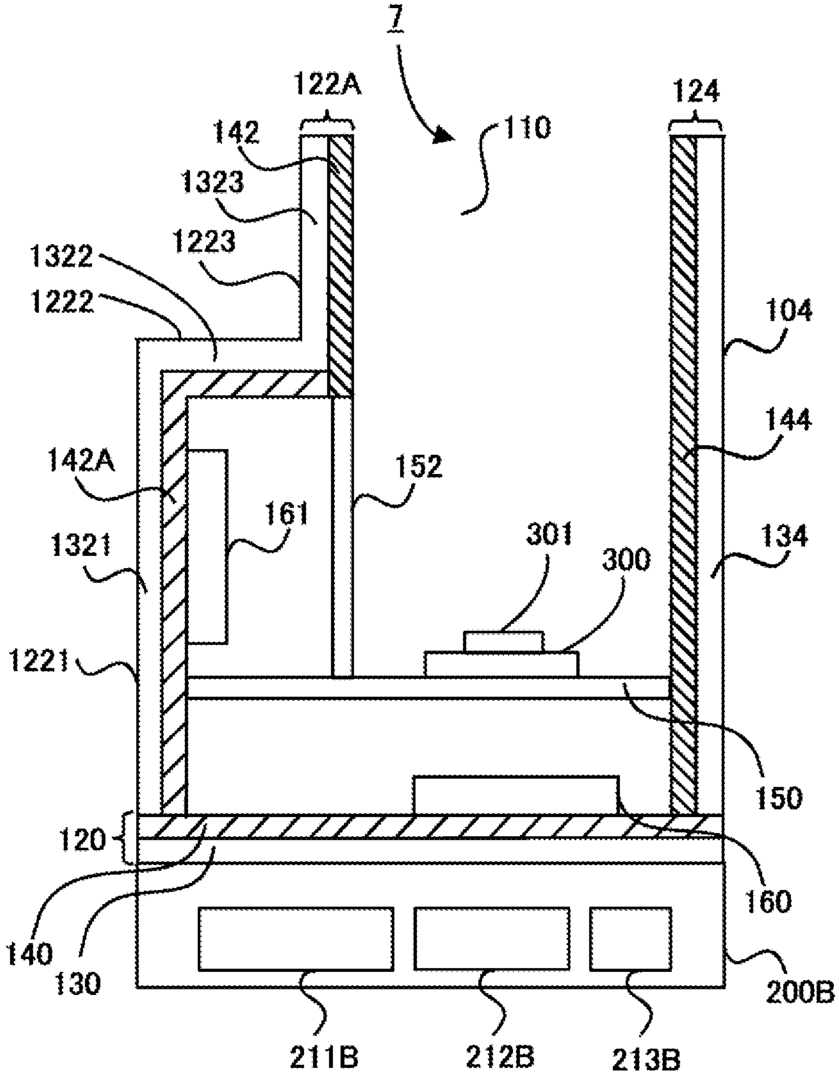
FIG. 30 is a sectional view taken along line XXX-XXX in FIG. 28.
Figure 31:
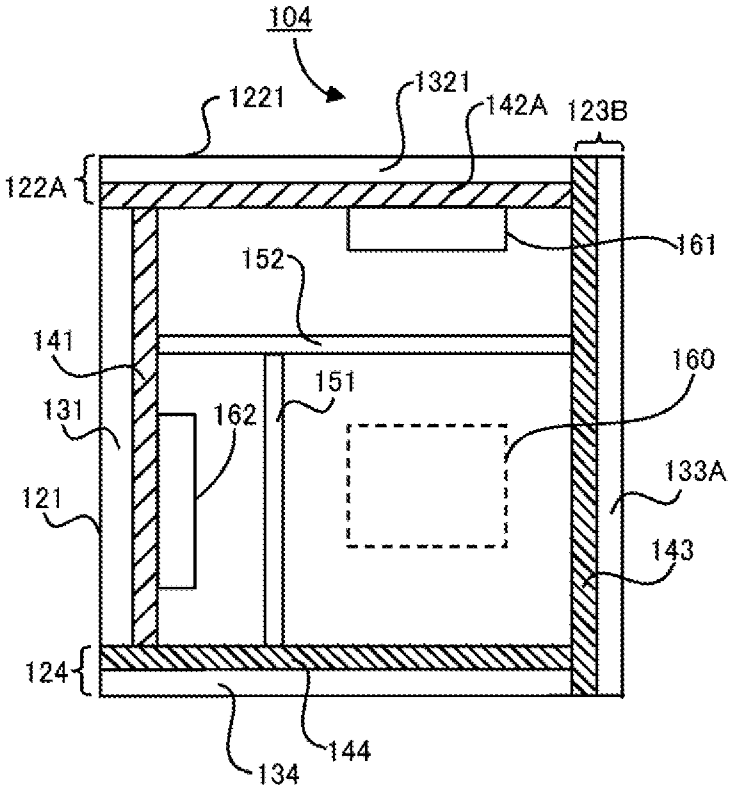
FIG. 31 is a plan view of an example of a housing in the reading apparatus shown in FIG. 28.

FIG. 28 is a perspective view of an example of a reading apparatus 7 for reading information from an RF tag 301 according to the ninth embodiment. FIG. 29 is a sectional view taken along line XXIX-XXIX in FIG. 28. FIG. 30 is a sectional view taken along line XXX-XXX in FIG. 28. FIG. 31 is a plan view of an example of a housing 104 in the reading apparatus 7 shown in FIG. 28. The reading apparatus 7 according to the ninth embodiment is obtained by adding a front antenna 162 to the reading apparatus 4 according to the fifth embodiment. The reading apparatus 7 includes a housing 104 and a controller 200B.

As shown in FIGS. 28 to 31, the housing 104 includes the top portion, the bottom portion 120, the front portion 121, the left side portion 122A, the back portion 123B, the right side portion 124, the placement plate 150, the front housing limiting plate 151, the side housing limiting plate 152, the front guide portion 153, the bottom antenna 160, the side antenna 161, and the front antenna 162. The housing 104 of the reading apparatus 7 according to the ninth embodiment is different from the housing 102 of the reading apparatus 4 according to the fifth embodiment in that the front antenna 162 is included. In other respects, the configuration of the housing 104 according to the ninth embodiment is the same as that of the housing 102 according to the fifth embodiment. The differences between the housing 104 and the housing 102 are described below.

The front antenna 162 is an antenna located on the inner surface of the front portion 121. The front antenna 162 radiates a radio wave toward the back portion 123B to communicate with the RF tag 301 and receives a response radio wave transmitted by the RF tag 301. The front antenna 162 is, for example, a planar antenna or a sheet antenna. For example, the front antenna 162 radiates a circularly polarized radio wave or radiates a radio wave while switching between a horizontally polarized wave and a vertically polarized wave when a linearly polarized wave is used.

The upper end of the left side portion 122A (that is, the upper end of the upper part 1223), the upper end of the back portion 123B, and the upper end of the right side portion 124 are higher than the top of the front antenna 162. Here, the top of the front antenna 162 is the highest position radiating a radio wave in the front antenna 162. In this embodiment, the back portion 123B and the right side portion 124 do not have an antenna for radiating a radio wave to communicate with the RF tag 301.

The controller 200B of the reading apparatus 7 according to the ninth embodiment is different from the controller 200A of the reading apparatus 4 according to the fifth embodiment in that the controller 200B controls the front antenna 162. In other respects, the operation of the controller 200B is the same as that of the controller 200A. The controller 200B includes a transmission/reception part 211B, an acquisition part 212B, and an interface (I/F) 213B. The transmission/reception part 211B controls the front antenna 162 in addition to the bottom antenna 160 and the side antenna 161. The transmission/reception part 211B causes each of the bottom antenna 160, the side antenna 161, and the front antenna 162 to radiate a circularly polarized radio wave, or to radiate a radio wave while switching between a horizontally polarized wave and a vertically polarized wave when a linearly polarized wave is used.

When the bottom antenna 160, the side antenna 161, and the front antenna 162 receive a response radio wave, the transmission/reception part 211B obtains information including the tag ID from the response radio wave. The transmission/reception part 211B may cause the bottom antenna 160, the side antenna 161, and the front antenna 162 to radiate radio waves at different timings, or may cause the bottom antenna 160, the side antenna 161, and the front antenna 162 to radiate radio waves at the same time when mutual interferences of radio waves radiated by the bottom antenna 160, the side antenna 161, and the front antenna 162 can be ignored.

The RF tag 301 obtains the power needed to operate by receiving radio waves transmitted by one or more of the bottom antenna 160, the side antenna 161, and the front antenna 162. When the intensity of the radio wave received by the RF tag 301 is lower than the predetermined intensity, the RF tag 301 does not operate and does not transmit the response radio wave.

The radio wave radiated by the front antenna 162 leaks from the opening 110 to the outside of the housing 104 over the upper end of the left side portion 122A (that is, the upper end of the upper part 1223), the upper end of the back portion 123B, and the upper end of the right side portion 124 (that is, the periphery of the opening 110). However, the upper end of the left side portion 122A, the upper end of the back portion 123B, and the upper end of the right side portion 124 are higher than the top of the front antenna 162. The radio wave radiated by the front antenna 162 is attenuated when it reaches the upper end of the left side portion 122A, the upper end of the back portion 123B, and the upper end of the right side portion 124. Therefore, the intensity of the radio wave that is radiated by the front antenna 162 and leaks from the opening 110 to the outside of the housing 104 is reduced. The transmission/reception part 211B causes the front antenna 162 to radiate a radio wave with the intensity at which the RF tag 301 outside the housing 104 does not operate due to the radio wave that leaks over the upper ends of these portions from the opening 110 to the outside of the housing 104. As a result, the reading apparatus 7 can acquire information of the RF tag 301 inside the housing space.

Figure 32:
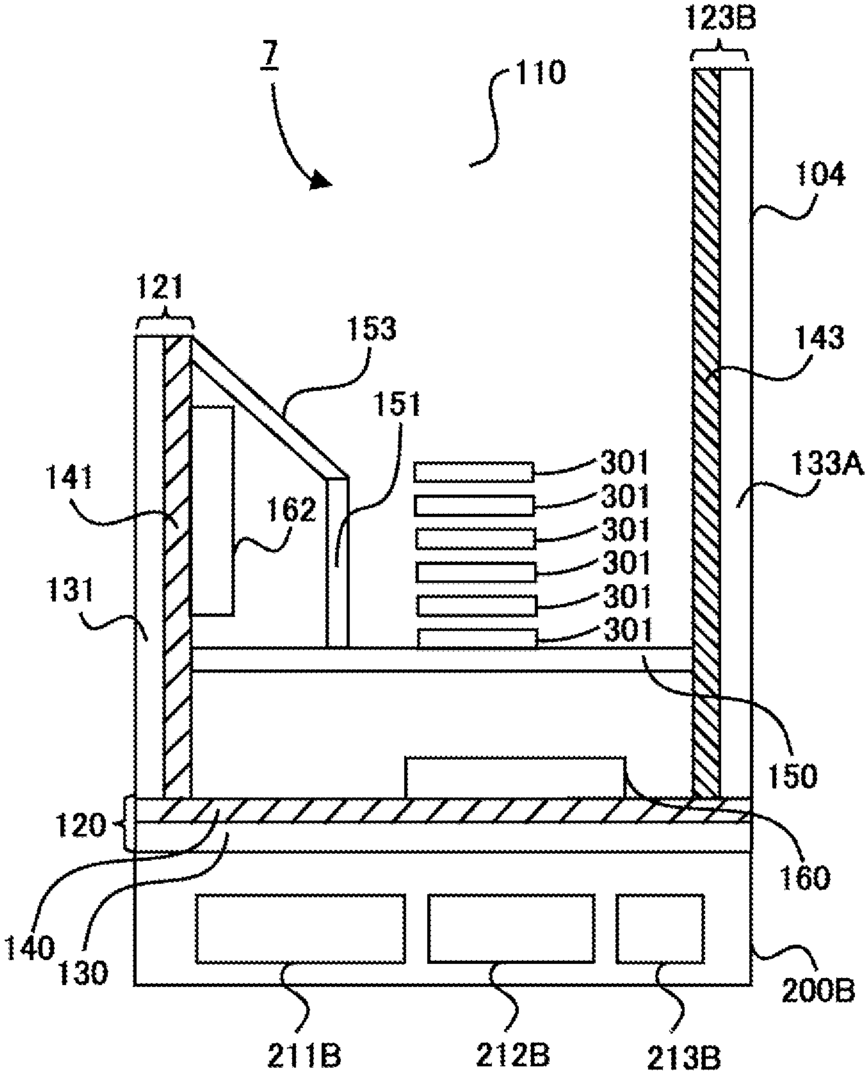
FIG. 32 is a diagram for explaining an example of an effect of the reading apparatus according to the ninth embodiment.

FIG. 32 is a diagram for explaining an example of an effect of the reading apparatus 7 according to the ninth embodiment. In the example of FIG. 32, six RF tags 301 are present inside the housing 104. Each RF tag 301 is parallel to the bottom antenna 160 and is stacked one on top of the other, and the longitudinal direction of each RF tag 301 is directed toward the front antenna 162. In this case, the higher each RF tag 301 is located, the more difficult it is for the RF tag 301 to receive the radio wave radiated by the bottom antenna 160. Since the longitudinal direction of each RF tag 301 is directed toward the front antenna 162, it is also difficult for the RF tag 301 to receive the radio wave radiated by the front antenna 162. However, each RF tag 301 can receive the radio wave radiated by the side antenna 161 and transmit the response radio wave to the side antenna 161. Therefore, acquisition part 212B can acquire information of six RF tags 301 from the response radio waves received by the side antenna 161.

A situation in which the plurality of RF tags 301 are parallel to the bottom antenna 160 and are stacked one on top of the other and the longitudinal direction of each RF tag 301 is directed to the side antenna 161 or the front antenna 162 may occur, for example, when each RF tag 301 is attached to a thin article 300 such as clothing or an envelope. According to the reading apparatus 7 of the ninth embodiment, the radio waves of the antennas are radiated to the RF tag 301 inside the housing 104 from three directions perpendicular to each other. Therefore, the reading apparatus 7 is less likely to fail to acquire information of the RF tag 301 inside the housing 104.

The back portion 123B includes the radio wave absorbing layer 143. On the other hand, if the back portion 123B includes a radio wave reflecting layer, a radio wave radiated by the front antenna 162 is reflected by the back portion 123B. In this case, the reflected radio wave may leak to the outside of the housing 104 beyond the upper end of the front portion 121. Since the upper end of the front portion 121 is low, the intensity of this reflected radio wave may be high. Therefore, the back portion 123B must include the radio wave absorbing layer 143.

Tenth Embodiment

Figure 33:
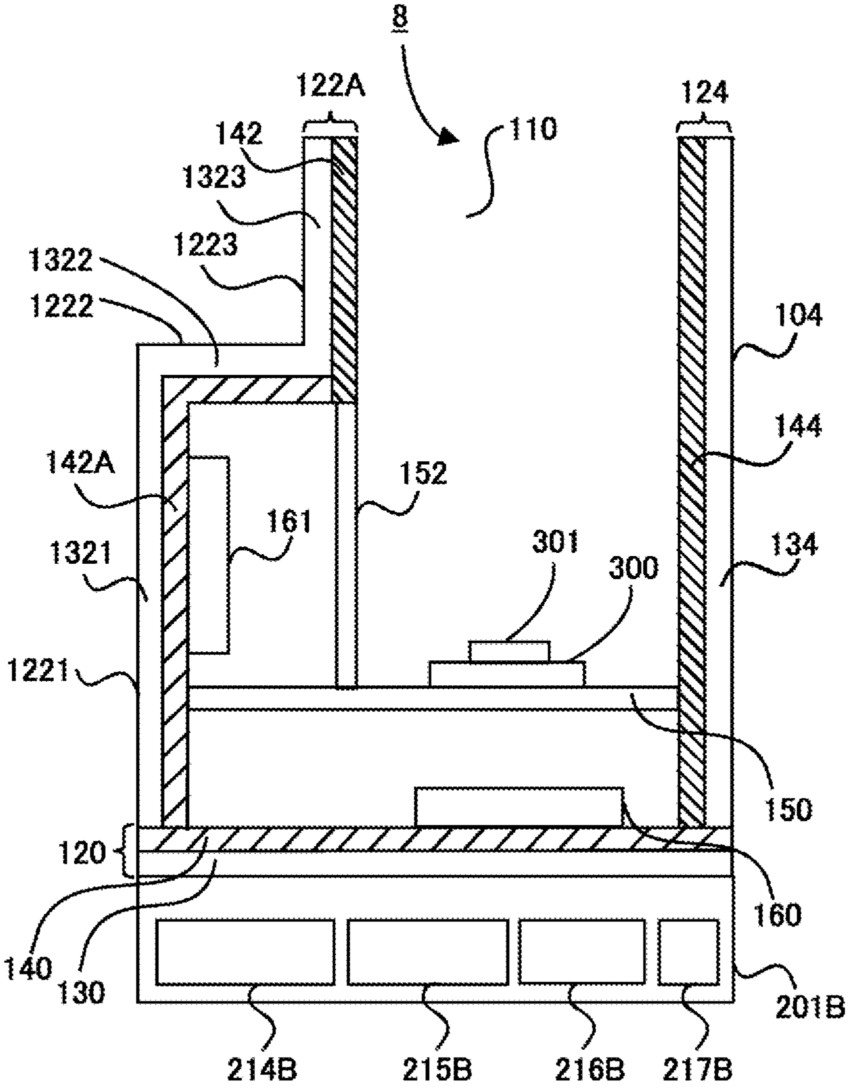
FIG. 33 is a longitudinal sectional view of an example of a reading apparatus for reading information from an RF tag according to the tenth embodiment.

FIG. 33 is a longitudinal sectional view of an example of a reading apparatus 8 for reading information from an RF tag 301 according to the tenth embodiment. FIG. 33 corresponds to the sectional view taken along line XXX-XXX in FIG. 28. The reading apparatus 8 according to the tenth embodiment is obtained by adding a front antenna 162 to the reading apparatus 5 according to the sixth embodiment. The reading apparatus 8 includes the housing 104 and a controller 201B. The configuration of the housing 104 in the reading apparatus 8 according to the tenth embodiment is the same as that of the housing 104 in the reading apparatus 7 according to the ninth embodiment. The each radio wave output of the bottom antenna 160, the side antenna 161, and the front antenna 162 in the reading apparatus 8 according to the tenth embodiment is larger than that of the reading apparatus 7 according to the ninth embodiment, respectively. In the reading apparatus 8 according to the tenth embodiment, the RF tag 301 outside the housing 104 may operate due to the radio waves leaking from the opening 110 to the outside of the housing 104.

The controller 201B of the reading apparatus 8 according to the tenth embodiment is different from the controller 201A of the reading apparatus 5 according to the sixth embodiment in that the controller 201B controls the front antenna 162. As for the control of the bottom antenna 160 and the side antenna 161, the operation of the controller 201B is the same as that of the controller 201A.

The controller 201B includes a transmission/reception part 214B, a determination part 215B, an acquisition part 216B, and an interface (I/F) 217B. The transmission/reception part 214B controls the front antenna 162 in addition to the bottom antenna 160 and the side antenna 161. The transmission/reception part 214B causes each of the bottom antenna 160, the side antenna 161, and the front antenna 162 to radiate a circularly polarized radio wave, or to radiate a radio wave while switching between a horizontally polarized wave and a vertically polarized wave when a linearly polarized wave is used. When the bottom antenna 160, the side antenna 161, and the front antenna 162 receive a response radio wave, the transmission/reception part 214B obtains information including the tag ID from the response radio wave.

The transmission/reception part 214B may cause the bottom antenna 160, the side antenna 161, and the front antenna 162 to radiate radio waves at different timings, or may cause the bottom antenna 160, the side antenna 161, and the front antenna 162 to radiate radio waves at the same time when mutual interferences of radio waves radiated by the bottom antenna 160, the side antenna 161, and the front antenna 162 can be ignored.

The radio wave radiated by the front antenna 162 leaks from the opening 110 to the outside of the housing 104 over the upper end of the left side portion 122A (that is, the upper end of the upper part 1223), the upper end of the back portion 123B, and the upper end of the right side portion 124. However, the upper end of the upper part 1223, the upper end of the back portion 123B, and the upper end of the right side portion 124 are higher than the top of the front antenna 162. The radio wave radiated by the front antenna 162 is attenuated when it reaches the upper end of the upper part 1223, the upper end of the back portion 123B, and the upper end of the right side portion 124. Therefore, the intensity of a radio wave that is radiated by the front antenna 162 and leaks from the opening 110 to the outside of the housing 104 is reduced. In the reading apparatus 8, even if the RF tag 301 is operated by the radio wave which leaks over the upper end of the upper part 1223, the upper end of the back portion 123B, and the upper end of the right side portion 124 from the opening 110 to the outside of the housing 104, the determination part 215B can determine that the RF tag 301 is located outside the housing 104 based on the RSSI or the intensity of the response radio wave obtained from the response radio wave transmitted by the RF tag 301.

The acquisition part 216B identifies each of the RF tags 301 based on the tag IDs included in information of the RF tags 301 obtained from the response radio waves received by the bottom antenna 160, the side antenna 161, and the front antenna 162, and acquires information of each of the RF tags 301. For example, when the determination part 215B determines that the RF tag 301 is inside the housing 104 (that is, inside the housing space), the acquisition part 216B acquires information read from the RF tag 301. As a result, the reading apparatus 8 can acquire information of the RF tag 301 inside the housing space. The I/F 217B transmits information of each RF tag 301 acquired by the acquisition part 216B to an external apparatus (for example, a checkout apparatus or the like), and receives an instruction of an operation to the reading apparatus 8 from the external apparatus.

The acquisition part 216B may also acquire information about the RF tag 301 outside the housing 104, and the I/F 217B may transmit information of the RF tag 301 to the external apparatus along with information indicating whether the RF tag 301 is inside the housing 104 or the RF tag 301 is outside the housing 104.

Eleventh Embodiment

Figure 34:
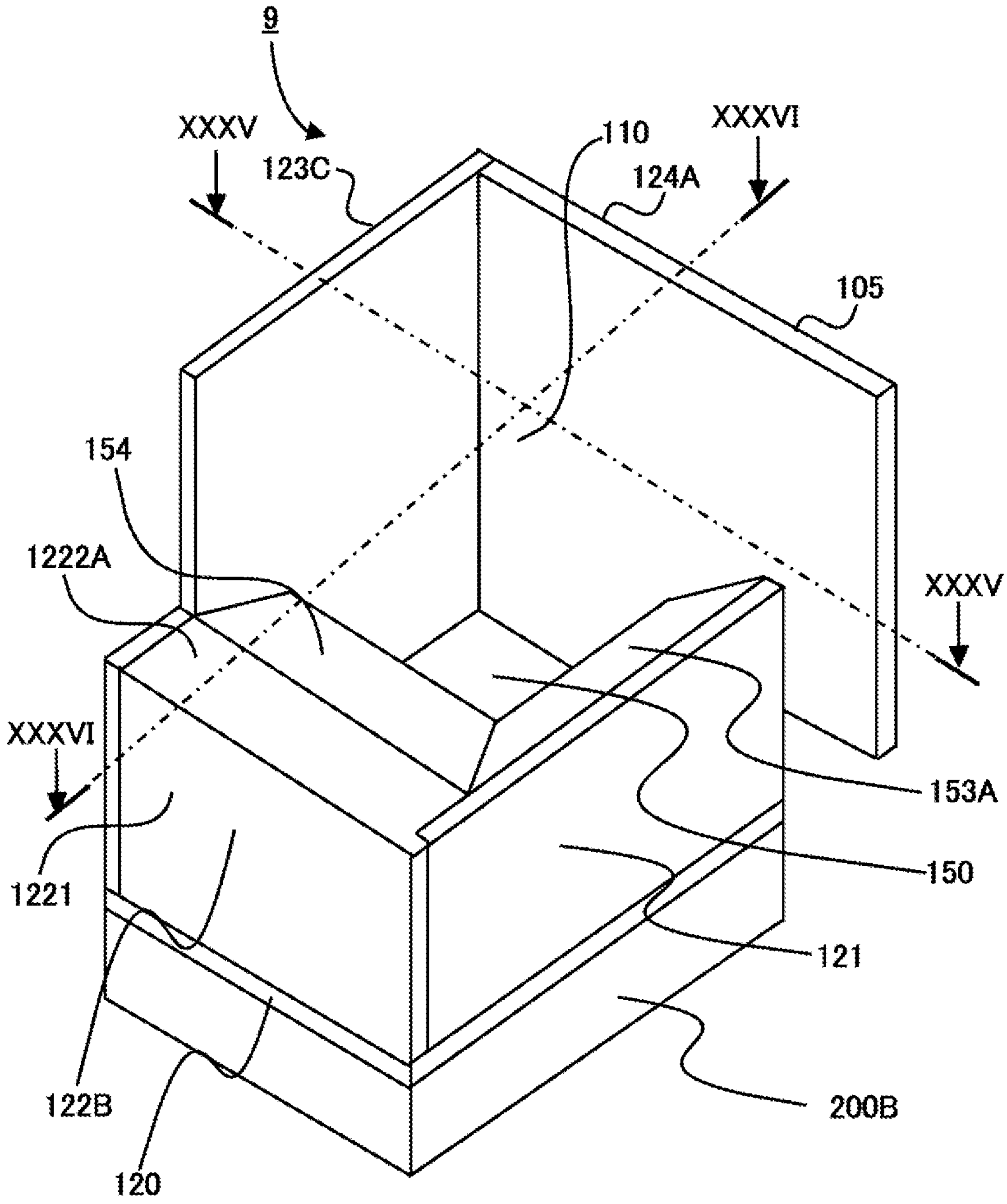
FIG. 34 is a perspective view of an example of a reading apparatus for reading information from an RF tag according to the eleventh embodiment.
Figure 35:
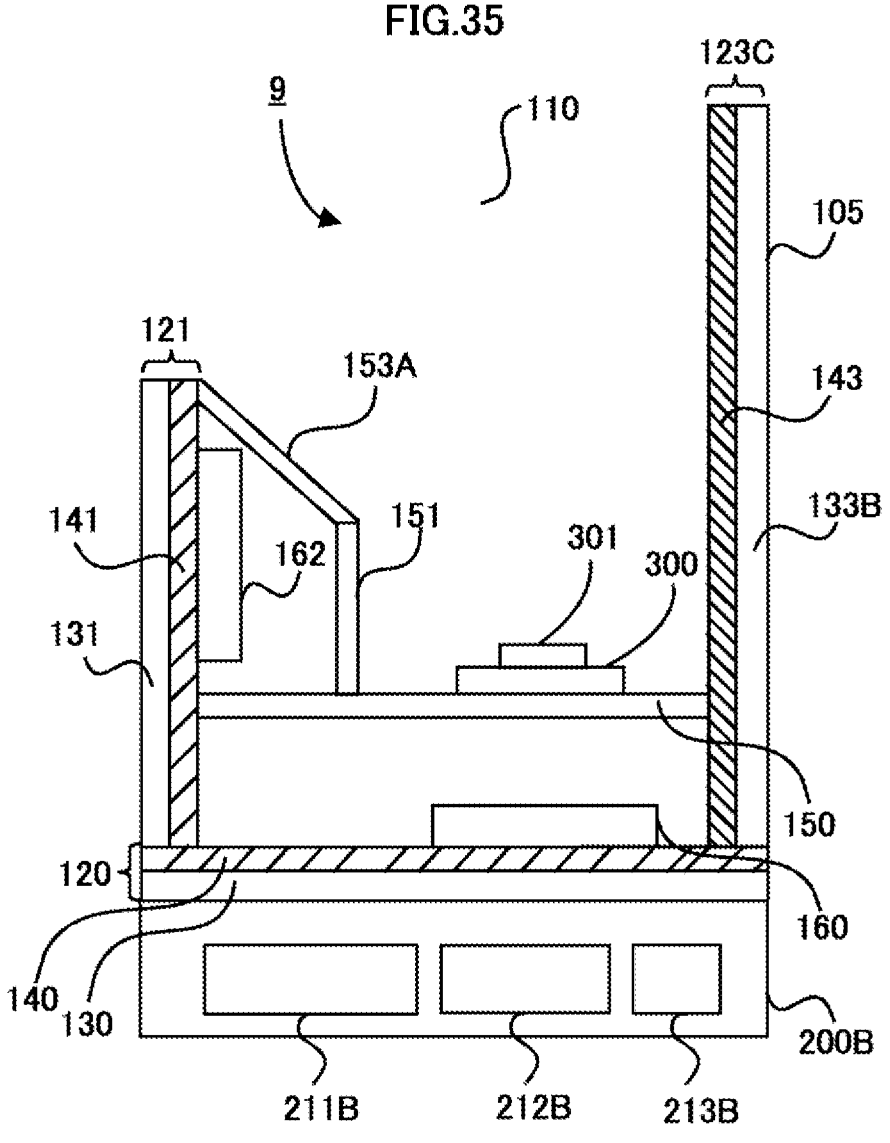
FIG. 35 is a sectional view taken along line XXXV-XXXV in FIG. 34.
Figure 36:
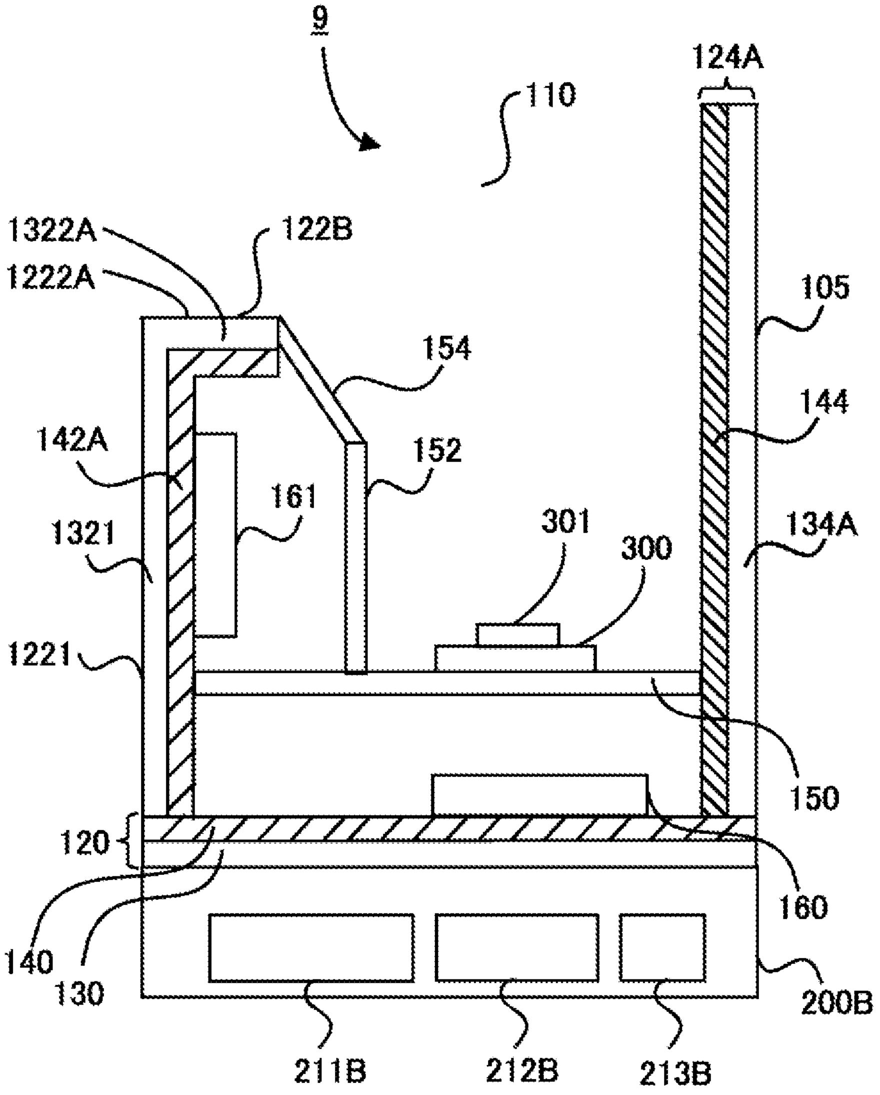
FIG. 36 is a sectional view taken along line XXXVI-XXXVI in FIG. 34.
Figure 37:
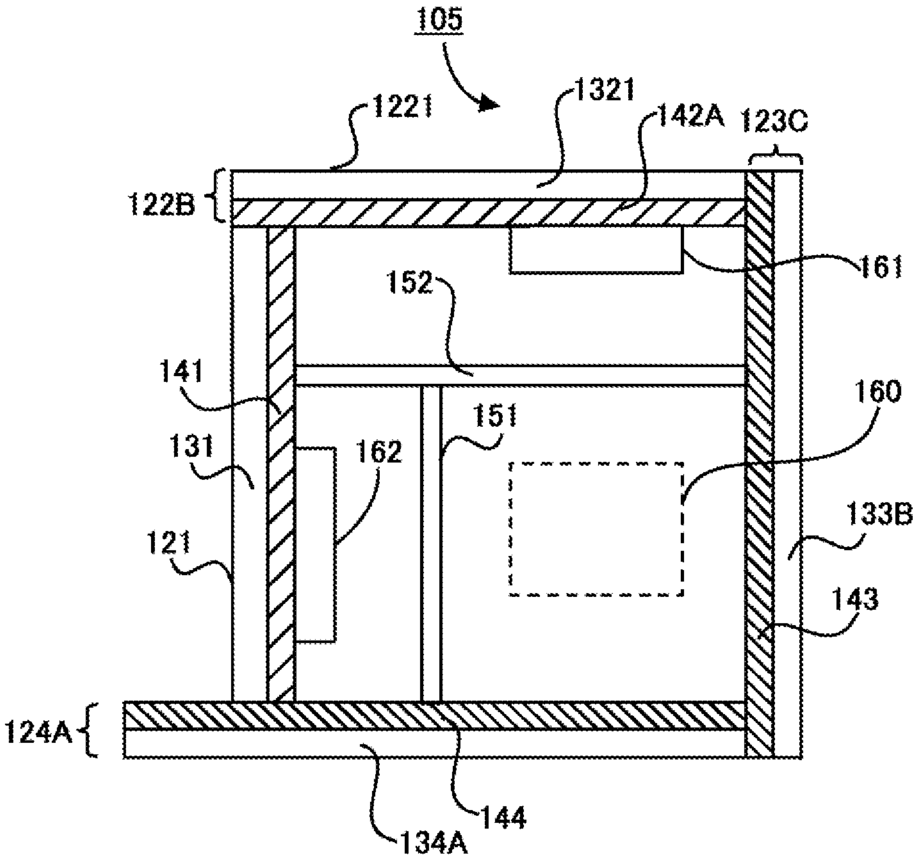
FIG. 37 is a plan view of an example of a housing in the reading apparatus shown in FIG. 34.

FIG. 34 is a perspective view of an example of a reading apparatus 9 for reading information from an RF tag 301 according to the eleventh embodiment. FIG. 35 is a sectional view taken along line XXXV-XXXV in FIG. 34. FIG. 36 is a sectional view taken along line XXXVI-XXXVI in FIG. 34. FIG. 37 is a plan view of an example of a housing 105 in the reading apparatus 9 shown in FIG. 34. The reading apparatus 9 according to the eleventh embodiment is obtained by adding a front antenna 162 to the reading apparatus 6 according to the seventh embodiment. The reading apparatus 9 includes a housing 105 and the controller 200B.

The configuration of the controller 200B in the reading apparatus 9 according to the eleventh embodiment is the same as that of the controller 200B in the reading apparatus 7 according to the ninth embodiment. The transmission/reception part 211B of the controller 200B causes the bottom antenna 160, the side antenna 161, and the front antenna 162 to radiate radio waves with the intensity at which the RF tag 301 outside the housing 105 does not operate.

As shown in FIGS. 34 to 37, the housing 105 includes the top portion, the bottom portion 120, the front portion 121, the left side portion 122B, the back portion 123C, the right side portion 124A, the placement plate 150, the front housing limiting plate 151, the side housing limiting plate 152, the front guide portion 153A, the side guide portion 154, the bottom antenna 160, the side antenna 161, and the front antenna 162. The housing 105 of the reading apparatus 9 according to the eleventh embodiment is different from the housing 103 of the reading apparatus 6 according to the seventh embodiment in that the front antenna 162 is included. In other respects, the configuration of the housing 105 according to the eleventh embodiment is the same as that of the housing 103 according to the seventh embodiment. The differences between housing 105 and housing 103 are described below.

The front antenna 162 is located on the inner surface of the front portion 121 at a position at which a radio wave with high intensity is radiated toward the housing space and a radio wave with lower intensity than the intensity of the radio wave radiated toward the housing space is radiated toward the second attenuation space between the left side portion 122B and the side housing limiting plate 152. The front antenna 162 radiates a radio wave toward the back portion 123C to communicate with the RF tag 301 and receives a response radio wave transmitted by the RF tag 301. The front antenna 162 is, for example, a planar antenna or a sheet antenna. For example, the front antenna 162 radiates a circularly polarized radio wave or radiates a radio wave while switching between a horizontally polarized wave and a vertically polarized wave when a linearly polarized wave is used.

The upper end of the back portion 123C and the upper end of the right side portion 124A are higher than the top of the front antenna 162. In this embodiment, the back portion 123C and the right side portion 124A do not have an antenna for radiating a radio wave to communicate with the RF tag 301.

The controller 200B of the reading apparatus 9 according to the eleventh embodiment is different from the controller 200A of the reading apparatus 6 according to the seventh embodiment in that the controller 200B controls the front antenna 162. In other respects, the operation of the controller 200B in the reading apparatus 9 is the same as that of the controller 200A in the reading apparatus 6. The configuration of the controller 200B in the reading apparatus 9 according to the eleventh embodiment is the same as that of the controller 200B in the reading apparatus 7 according to the ninth embodiment. However, the propagation of the radio wave radiated by the front antenna 162 differs due to the difference in the configuration of the housing 105 and the configuration of the housing 104. This difference will be described below.

The radio wave radiated toward the back portion 123C by the front antenna 162 propagates while spreading through the second attenuation space between the left side portion 122B and the side housing limiting plate 152. A space between the right end of the middle part 1222A and the side housing limiting plate 152 is included in the second attenuation space. The radio wave radiated toward the back portion 123C by the front antenna 162 is attenuated while propagating through the space between the right end of the middle part 1222A and the side housing limiting plate 152. When the lower part 1221 and the middle part 1222A include the radio wave shielding layer 142A, the radio wave is diffracted at the right end of the middle part 1222A in the left side portion 122B and leaks to the left side of the housing 105. The transmission/reception part 211B causes the front antenna 162 to radiate a radio wave with the intensity at which the RF tag 301 outside the housing 105 does not operate due to the radio wave that leaks to the left side of the housing 105.

On the other hand, when the lower part 1221 and the middle part 1222A do not contain the radio wave shielding layer 142A, that is, when the lower part 1221 and the middle part 1222A include only the flat plate 1321 and the flat plate 1322A, for example, transmission/reception part 211B causes the front antenna 162 to radiate a radio wave with the intensity at which the RF tag 301 outside the housing 105 does not operate due to the radio wave that is radiated by the front antenna 162 and reaches the right end of the middle part 1222A.

The radio wave radiated toward the back portion 123C by the front antenna 162 leaks from the opening 110 to the outside of the housing 105 over the upper end of the back portion 123C and the upper end of the right side portion 124 (that is, the periphery of the opening 110). However, the upper end of the back portion 123C and the upper end of the right side portion 124A are higher than the top of the front antenna 162. The radio wave radiated by the front antenna 162 is attenuated when it reaches the upper end of the back portion 123 C and the upper end of the right side portion 124A. The transmission/reception part 211B causes the front antenna 162 to radiate a radio wave with the intensity at which the RF tag 301 outside the housing 105 does not operate due to the radio wave that is radiated by the front antenna 162 and leaks from the upper end of the back portion 123C and the upper end of the right side portion 124A to the outside of the housing 105.

In the reading apparatus 9, the radio wave radiated by the front antenna 162 is attenuated while propagating through the space between the right end of the middle part 1222A and the side housing limiting plate 152. And the radio wave radiated by the front antenna 162 is attenuated when it reaches the upper end of the back portion 123C and the upper end of the right side portion 124A because the upper ends of these portions are higher than the top of the front antenna 162. Therefore, the intensity of the radio wave that is radiated by the front antenna 162 and leaks from the opening 110 to the outside of the housing 105 is low. This allows the reading apparatus 9 to acquire information of the RF tag 301 inside the housing space.

In the present embodiment, an example in which the left side portion 122B does not have the upper part 1223 was shown. However, the left side portion 122B may have the upper part 1223 in addition to the lower part 1221 and the middle part 1222A. Further, the left side portion 122B may not have the middle part 1222A. That is, the left side portion 122B may be formed only by the lower part 1221.

Twelfth Embodiment

The reading apparatus according to the twelfth embodiment is not shown in the figure. It includes a housing 105 and a controller 201B. The configuration of the housing 105 is the same as that of the housing 105 in the reading apparatus 9 according to the eleventh embodiment. The configuration of the controller 201B is the same as that of the controller 201B in the reading apparatus 8 according to the tenth embodiment.

In the reading apparatus 9 according to the eleventh embodiment, the RF tag 301 outside the housing 105 does not operate due to the radio waves that are radiated by the bottom antenna 160, the side antenna 161, and the front antenna 162 and leak from the opening 110 to the outside of the housing 105. On the other hand, each radio wave output of the bottom antenna 160, the side antenna 161, and the front antenna 162 in the reading apparatus according to the twelfth embodiment is larger than that of the reading apparatus 9 according to the eleventh embodiment, respectively. In the reading apparatus according to the twelfth embodiment, the RF tag 301 outside the housing 105 may operate due to the radio waves that are radiated by the bottom antenna 160, the side antenna 161, and the front antenna 162 and leak from the opening 110 to the outside of the housing 105. When the response radio wave of the RF tag 301 is received, the determination part 215B determines whether the RF tag 301 is inside or outside housing 105 based on the RSSI included in the response radio wave or the intensity of the response radio wave.

Figure 38A:
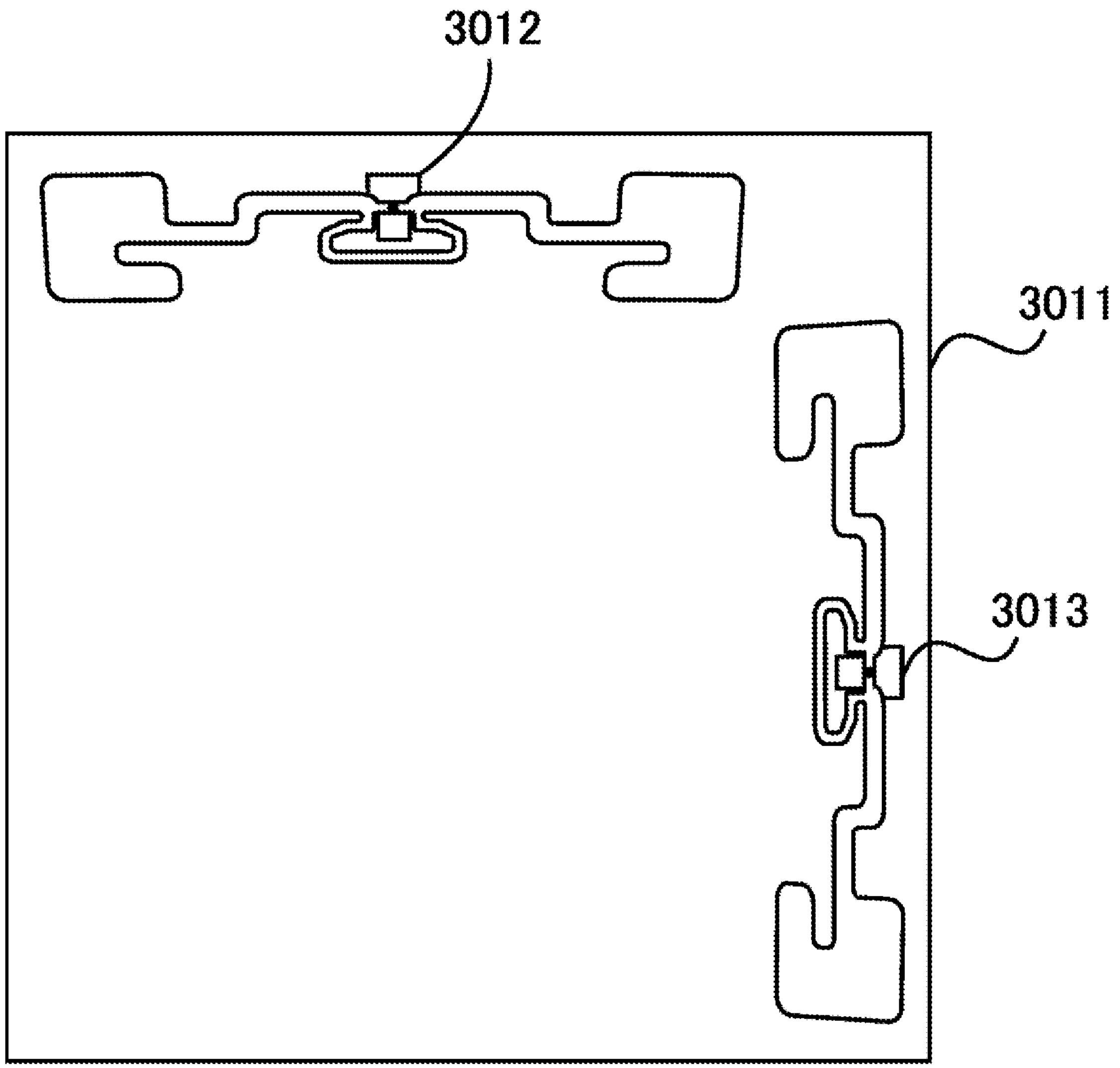
FIG. 38A is a plan view of an example of an RF tag sheet containing double RF tags.
Figure 38B:
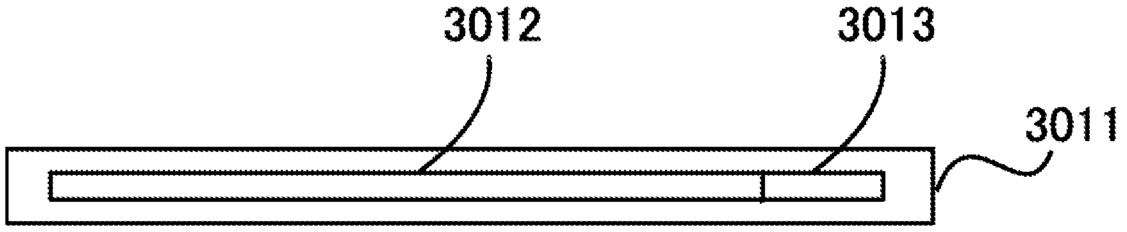
FIG. 38B is a front view of the RF tag sheet shown in FIG. 38A.

FIG. 38A is a plan view of an example of an RF tag sheet 3011 containing double RF tags 3012, 3013. FIG. 38B is a front view of the RF tag sheet 3011 shown in FIG. 38A. The RF tag sheet 3011 includes the RF tag 3012 and the RF tag 3013. The RF tag 3012 and the RF tag 3013 are sandwiched by thin hard papers from the front surface and the back surface. The hard papers allow radio waves to pass through. The RF tag 3012 and the RF tag 3013 are passive. The RF tag 3012 and the RF tag 3013 are arranged in an L-shape so as not to overlap. The longitudinal direction of the RF tag 3012 and the longitudinal direction of the RF tag 3013 are perpendicular to each other.

For example, when six RF tag sheets 3011 are located parallel to the bottom antenna 160 in the housing space and they overlap each other vertically as with the six RF tags 301 in FIG. 32, the acquisition part 200A, 201A in the reading apparatus 4, 5, 6 of the fifth to eighth embodiments can acquire the information of each RF tag 3012 and/or each RF tag 3013 included in each RF tag sheet 3011 from the response radio waves transmitted by the six RF tag sheets 3011. In other words, the acquisition part 200A, 201A in the reading apparatus 4, 5, 6 of the fifth to eighth embodiments can acquire the information of each RF tag 3012 and/or each RF tag 3013 included in each RF tag sheet 3011 from the response radio waves received by the bottom antenna 160 and the side antenna 161, regardless of the directions of the RF tag sheets 3011.

In the housing 104 of the reading apparatus 7 according to the ninth embodiment and the reading apparatus 8 according to the tenth embodiment, the other end of the right side portion 124 is fixed to the other end of the front portion 121. However, similarly to the housing 105 of the reading apparatus 9 according to the eleventh embodiment and the reading apparatus according to the twelfth embodiment, also in the housing 104, the other end of the right side portion 124 may protrude by a predetermined length toward the front side from the front portion 121, and the other end of the front portion 121 may be fixed between the other end and one end of the right side portion 124.

In the housing 105 of the reading apparatus 9 according to the eleventh embodiment and the reading apparatus according to the twelfth embodiment, the other end of the right side portion 124A protrudes by a predetermined length toward the front side from the front portion 121, and the other end of the front portion 121 is fixed between the other end and one end of the right side portion 124A. However, similarly to the housing 104 of the reading apparatus 7 according to the ninth embodiment and the reading apparatus 8 according to the tenth embodiment, also in the housing 105, the other end of the right side portion 124A may be fixed to the other end of the front portion 121.

In the reading apparatus according to the present disclosure, the configuration in which the RF tag 301 outside the housing does not operate and does not transmit a response radio wave, and the configuration in which the RF tag 301 outside the housing operates and transmits a response radio wave, but the determination part determines that the RF tag 301 is located outside the housing based on the RSSI or the intensity of the response radio wave can be combined as appropriate. For example, the configuration in which the RF tag 301 outside the housing does not transmit a response radio wave to the radio wave radiated by the bottom antenna 160, and the configuration in which the RF tag 301 outside the housing does transmit a response radio wave to the radio waves radiated by the front antenna 162 and side antenna 161 but the determination part determines that the RF tag 301 is outside can be combined.

In the above-described embodiments, examples in which one bottom antenna is located on the bottom portion have been described. However, two or more bottom antennas may be located on the bottom portion. Similarly, two or more front antennas may be located on the front portion, and two or more side antennas may be located on the left side portion.

In the above-described embodiments, examples in which the front portion, the left side portion, the back portion, and the right side portion are each flat plates have been described. However, they may be curved plates, for example.

In the above-described embodiments, examples in which the left side portion is the first side portion in the present disclosure and the right side portion is the second side portion in the present disclosure have been described. However, the right side portion may be the first side portion in the present disclosure and the left side portion may be the second side portion in the present disclosure.

Further, in the above-described embodiments, examples in which the reading apparatus and the RF tag communicate with each other using radio waves in the UHF band of frequencies 860-960 MHz have been described. However, the reading apparatus and the RF tag may communicate with each other using radio waves in the other frequencies.

In the above-described embodiments, a commodity has been described as an example of an article. However, an article is not limited to a commodity and may be the other article such as a sample, a document, and a medicine. The reading apparatus according to the present disclosure can be used not only for a self-checkout machine but also for other applications.

As described above, according to the present disclosure, in the reading apparatus that has the opening in the top portion of the housing and reads information from a passive RF tag inside the housing in a state where the opening is open, it is possible to prevent that the reading apparatus accidentally reads information from an RF tag outside the housing due to diffraction of radio waves at the periphery of the opening.

Further, in the reading apparatus according to the present disclosure, the upper end of the front portion is lower than the upper end of the left side portion and the upper end of the right side portion. However, even if the side antenna radiates a strong radio wave, the radio wave that leaks from the opening to the outside of the housing over the upper end of the front portion is weak. Therefore it is possible to prevent that the reading apparatus accidentally reads information from the RF tag outside the housing due to the radio wave that is radiated by the side antenna.

Since the upper end of the front portion in the housing is low, an article and a shopping basket are easily taken in and out of the housing from the front side of the reading apparatus. By providing the front guide portion and the side guide portion on the front portion and the left or right side portion of the housing, respectively, an article and a shopping basket can be taken in and out of the housing more easily.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus reading information from a passive RF tag comprising a housing accommodating an article to which the RF tag is attached;

the housing comprising:

a top portion having an opening through which can take the article in and out of the housing;

a bottom portion;

a front portion having no antenna for communicating with the RF tag;

a first side portion having one end fixed to one end of the front portion, and having no antenna for communicating with the RF tag;

a back portion being opposed to the front portion, having one end fixed to the other end of the first side portion, including a radio wave absorbing layer, having no antenna for communicating with the RF tag, and having a higher upper end than an upper end of the front portion;

a second side portion being opposed to the first side portion, having one end and the other end fixed to the other end of the back portion and the other end of the front portion, respectively, including a radio wave absorbing layer, having no antenna for communicating with the RF tag, and having a higher upper end than the upper end of the front portion;

a first housing limiting portion dividing the inside of the housing into a first attenuation space incapable of accommodating the article between the front portion and the first housing limiting portion, and a housing space capable of accommodating the article between the first housing limiting portion and the back portion; and a bottom antenna located on the upper surface of the bottom portion at a position at which a radio wave with high intensity is radiated toward the housing space and a radio wave with lower intensity than the intensity of the radio wave radiated toward the housing space is radiated toward the first attenuation space.

2. The reading apparatus according to claim 1, wherein the first side portion includes a radio wave absorbing layer, and has a higher upper end than the upper end of the front portion; and information can be acquired from the RF tag inside the housing space, because the radio wave radiated by the bottom antenna is attenuated while propagating through the first attenuation space, and the radio wave radiated by the bottom antenna is attenuated when it reaches the upper end of the first side portion, the upper end of the back portion, and the upper end of the second side portion.

3. The reading apparatus according to claim 1, further comprising:

a second housing limiting portion dividing the inside of the housing into a second attenuation space incapable of accommodating the article between the first side portion and the second housing limiting portion, and the housing space between the second housing limiting portion and the second side portion, wherein the bottom antenna is located at a position at which a radio wave with lower intensity than the intensity of the radio wave radiated toward the housing space is radiated toward the second attenuation space; and information can be acquired from the RF tag inside the housing space, because the radio wave radiated by the bottom antenna is attenuated while propagating through the first attenuation space and the second attenuation space, and the radio wave radiated by the bottom antenna is attenuated when it reaches the upper end of the back portion and the upper end of the second side portion.

4. The reading apparatus according to claim 1, further comprising:

a third housing limiting portion dividing the inside of the housing into a space incapable of accommodating the article between the bottom portion and the third housing limiting portion, and the housing space over the third housing limiting portion.

5. A reading apparatus reading information from a passive RF tag comprising a housing accommodating an article to which the RF tag is attached;

the housing comprising:

a top portion having an opening through which can take the article in and out of the housing;

a bottom portion including at least one of a radio wave absorbing layer and a radio wave reflecting layer;

a front portion having no antenna for communicating with the RF tag;

a first side portion having one end fixed to one end of the front portion;

a back portion being opposed to the front portion, having one end fixed to the other end of the first side portion, including a radio wave absorbing layer, having no antenna for communicating with the RF tag, and having a higher upper end than an upper end of the front portion;

a second side portion being opposed to the first side portion, having one end fixed to the other end of the back portion, including a radio wave absorbing layer, having no antenna for communicating with the RF tag, and having a higher upper end than the upper end of the front portion;

a first housing limiting portion dividing the inside of the housing into a first attenuation space incapable of accommodating the article between the front portion and the first housing limiting portion, and a housing space capable of accommodating the article between the first housing limiting portion and the back portion;

a second housing limiting portion dividing the inside of the housing into a second attenuation space incapable of accommodating the article between the first side portion and the second housing limiting portion, and the housing space between the second housing limiting portion and the second side portion;

a bottom antenna located on the upper surface of the bottom portion at a position at which a radio wave with high intensity is radiated toward the housing space and a radio wave with lower intensity than the intensity of the radio wave radiated toward the housing space is radiated toward the first attenuation space; and a side antenna located on the inner surface of the first side portion at a position at which a radio wave with high intensity is radiated toward the housing space and a radio wave with lower intensity than the intensity of the radio wave radiated toward the housing space is radiated toward the first attenuation space.

6. The reading apparatus according to claim 5, wherein the first side portion contains a lower part standing vertically from an edge of the bottom portion, having the side antenna, and including at least one of a radio wave absorbing layer and a radio wave reflecting layer, a middle part including at least one of a radio wave absorbing layer and a radio wave reflecting layer, and an upper part standing vertically from an upper end of the second housing limiting portion, including a radio wave absorbing layer, and has a higher upper end than the upper end of the front portion; and information can be acquired from the RF tag inside the housing space, because the radio wave radiated by the bottom antenna is attenuated while propagating through the first attenuation space, and the radio wave radiated by the bottom antenna is attenuated when it reaches the upper end of the upper part, the upper end of the back portion, and the upper end of the second side portion.

7. The reading apparatus according to claim 5, wherein the first side portion contains a lower part standing vertically from an edge of the bottom portion and having the side antenna, and has a predetermined gap between an end part of the first side portion opposite the second housing limiting portion and the second housing limiting portion;

the bottom antenna is located at a position at which a radio wave with lower intensity than the intensity of the radio wave radiated toward the housing space is radiated toward the second attenuation space; and information can be acquired from the RF tag inside the housing space, because the radio wave radiated by the bottom antenna is attenuated while propagating through the first attenuation space and the space between the end part of the first side portion and the second housing limiting portion in the second attenuation space, and the radio wave radiated by the bottom antenna is attenuated when it reaches the upper end of the back portion and the upper end of the second side portion.

8. The reading apparatus according to claim 5, wherein the other end of the second side portion is fixed to the other end of the front portion;

the upper end of the back portion and the upper end of the second side portion are higher than the top of the side antenna; and information can be acquired from the RF tag inside the housing space, because the radio wave radiated by the side antenna is attenuated while propagating through the first attenuation space, and the radio wave radiated by the side antenna is attenuated when it reaches the upper end of the back portion and the upper end of the second side portion.

9. The reading apparatus according to claim 5, wherein the other end of the second side portion protrudes further to the front side from the front portion by a predetermined distance, and the other end of the front portion is fixed between one end and the other end of the second side portion;

the upper end of the back portion and the upper end of the second side portion are higher than the top of the side antenna; and information can be acquired from the RF tag inside the housing space, because the radio wave radiated by the side antenna is attenuated while propagating through the first attenuation space, the other end of the second side portion protrudes further to the front side from the front portion by a predetermined distance, and the radio wave radiated by the side antenna is attenuated when it reaches the upper end of the back portion and the upper end of the second side portion.

10. The reading apparatus according to claim 5, further comprising:

a third housing limiting portion dividing the inside of the housing into a space incapable of accommodating the article between the bottom portion and the third housing limiting portion, and the housing space over the third housing limiting portion.

11. A reading apparatus reading information from a passive RF tag comprising a housing accommodating an article to which the RF tag is attached;

the housing comprising:

a top portion having an opening through which can take the article in and out of the housing;

a bottom portion including at least one of a radio wave absorbing layer and a radio wave reflecting layer;

a front portion;

a first side portion having one end fixed to one end of the front portion;

a back portion being opposed to the front portion, having one end fixed to the other end of the first side portion, including a radio wave absorbing layer, having no antenna for communicating with the RF tag, and having a higher upper end than an upper end of the front portion;

a second side portion being opposed to the first side portion, having one end fixed to the other end of the back portion, including a radio wave absorbing layer, having no antenna for communicating with the RF tag, and having a higher upper end than the upper end of the front portion;

a first housing limiting portion dividing the inside of the housing into a first attenuation space incapable of accommodating the article between the front portion and the first housing limiting portion, and a housing space capable of accommodating the article between the first housing limiting portion and the back portion;

a second housing limiting portion dividing the inside of the housing into a second attenuation space incapable of accommodating the article between the first side portion and the second housing limiting portion, and the housing space between the second housing limiting portion and the second side portion;

a bottom antenna located on the upper surface of the bottom portion at a position at which a radio wave with high intensity is radiated toward the housing space and a radio wave with lower intensity than the intensity of the radio wave radiated toward the housing space is radiated toward the first attenuation space;

a side antenna located on the inner surface of the first side portion at a position at which a radio wave with high intensity is radiated toward the housing space and a radio wave with lower intensity than the intensity of the radio wave radiated toward the housing space is radiated toward the first attenuation space; and a front antenna located on the inner surface of the front portion.

12. The reading apparatus according to claim 11, wherein the first side portion contains a lower part standing vertically from an edge of the bottom portion, having the side antenna, and including at least one of a radio wave absorbing layer and a radio wave reflecting layer, a middle part including at least one of a radio wave absorbing layer and a radio wave reflecting layer, and an upper part standing vertically from an upper end of the second housing limiting portion, including a radio wave absorbing layer, and has a higher upper end than the upper end of the front portion;

information can be acquired from the RF tag inside the housing space, because the radio wave radiated by the bottom antenna is attenuated while propagating through the first attenuation space, and the radio wave radiated by the bottom antenna is attenuated when it reaches the upper end of the upper part, the upper end of the back portion, and the upper end of the second side portion;

the upper end of the upper part, the upper end of the back portion, and the upper end of the second side portion are higher than the top of the side antenna; and information can be acquired from the RF tag inside the housing space, because the radio wave radiated by the front antenna is attenuated when it reaches the upper end of the upper part, the upper end of the back portion, and the upper end of the second side portion.

13. The reading apparatus according to claim 11, wherein the first side portion contains a lower part standing vertically from an edge of the bottom portion and having the side antenna, and has a predetermined gap between an end part of the first side portion opposite the second housing limiting portion and the second housing limiting portion;

the bottom antenna is located at a position at which a radio wave with lower intensity than the intensity of the radio wave radiated toward the housing space is radiated toward the second attenuation space;

information can be acquired from the RF tag inside the housing space, because the radio wave radiated by the bottom antenna is attenuated while propagating through the first attenuation space and the space between the end part of the first side portion and the second housing limiting portion in the second attenuation space, and the radio wave radiated by the bottom antenna is attenuated when it reaches the upper end of the back portion and the upper end of the second side portion;

the front antenna is located at a position at which a radio wave with high intensity is radiated toward the housing space and a radio wave with lower intensity than the intensity of the radio wave radiated toward the housing space is radiated toward the second attenuation space;

the upper end of the back portion and the upper end of the second side portion are higher than the top of the front antenna; and information can be acquired from the RF tag inside the housing space, because the radio wave radiated by the front antenna is attenuated while propagating through the space between the end part of the first side portion and the second housing limiting portion in the second attenuation space, and the radio wave radiated by the front antenna is attenuated when it reaches the upper end of the back portion and the upper end of the second side portion.

14. The reading apparatus according to claim 11, wherein the other end of the second side portion is fixed to the other end of the front portion;

the upper end of the back portion and the upper end of the second side portion are higher than the top of the side antenna; and information can be acquired from the RF tag inside the housing space, because the radio wave radiated by the side antenna is attenuated while propagating through the first attenuation space, and the radio wave radiated by the side antenna is attenuated when it reaches the upper end of the back portion and the upper end of the second side portion.

15. The reading apparatus according to claim 11, wherein the other end of the second side portion protrudes further to the front side from the front portion by a predetermined distance, and the other end of the front portion is fixed between one end and the other end of the second side portion;

the upper end of the back portion and the upper end of the second side portion are higher than the top of the side antenna; and information can be acquired from the RF tag inside the housing space, because the radio wave radiated by the side antenna is attenuated while propagating through the first attenuation space, the other end of the second side portion protrudes further to the front side from the front portion by a predetermined distance, and the radio wave radiated by the side antenna is attenuated when it reaches the upper end of the back portion and the upper end of the second side portion.

16. The reading apparatus according to claim 11, further comprising:

a third housing limiting portion dividing the inside of the housing into a space incapable of accommodating the article between the bottom portion and the third housing limiting portion, and the housing space over the third housing limiting portion.

* * * * *